United States Patent
Barber et al.

(10) Patent No.: US 9,052,942 B1
(45) Date of Patent: Jun. 9, 2015

(54) STORAGE OBJECT DELETION JOB MANAGEMENT

(71) Applicant: Amazon Technologies, Inc., Reno, NV (US)

(72) Inventors: Jeffrey Michael Barber, Seattle, WA (US); Praveen Kumar Gattu, Redmond, WA (US); Derek Ernest Denny-Brown, II, Seattle, WA (US); Carl Yates Perry, Seattle, WA (US); Christopher Henning Elving, Sunnyvale, CA (US)

(73) Assignee: Amazon Technologies, Inc., Reno, NV (US)

( * ) Notice: Subject to any disclaimer, the term of this patent is extended or adjusted under 35 U.S.C. 154(b) by 215 days.

(21) Appl. No.: 13/715,883

(22) Filed: Dec. 14, 2012

(51) Int. Cl.
| G06F 9/46 | (2006.01) |
| G06F 7/00 | (2006.01) |
| G06F 9/45 | (2006.01) |
| G06F 15/16 | (2006.01) |

(52) U.S. Cl.
CPC ........................................ *G06F 9/46* (2013.01)

(58) Field of Classification Search
None
See application file for complete search history.

(56) References Cited

U.S. PATENT DOCUMENTS

| 6,263,360 | B1 * | 7/2001 | Arnold et al. ................. 709/203 |
| 6,754,681 | B2 * | 6/2004 | Brodersen et al. .................... 1/1 |
| 7,007,048 | B1 | 2/2006 | Murray et al. |
| 7,711,711 | B1 | 5/2010 | Linnell et al. |
| 7,716,180 | B2 | 5/2010 | Vermeulen et al. |
| 7,958,093 | B2 | 6/2011 | Anderson et al. |
| 7,979,649 | B1 | 7/2011 | Thiam et al. |
| 7,987,325 | B1 | 7/2011 | Patil et al. |
| 8,006,061 | B1 | 8/2011 | Chatterjee et al. |
| 8,600,948 | B2 * | 12/2013 | Kilday .......................... 707/661 |
| 2003/0041280 | A1 * | 2/2003 | Malcolm et al. ................... 714/4 |
| 2003/0135523 | A1 * | 7/2003 | Brodersen et al. ............ 707/201 |
| 2005/0132010 | A1 | 6/2005 | Muller |
| 2006/0259901 | A1 | 11/2006 | Kaplan |
| 2007/0050662 | A1 * | 3/2007 | Malcolm et al. ................... 714/4 |
| 2007/0061359 | A1 * | 3/2007 | Kilday ....................... 707/103 R |
| 2007/0078978 | A1 * | 4/2007 | Arnold et al. ................. 709/224 |
| 2007/0271350 | A1 * | 11/2007 | Kazar et al. .................... 709/214 |
| 2007/0299879 | A1 | 12/2007 | Dao et al. |
| 2008/0005164 | A1 * | 1/2008 | Yee et al. .................... 707/104.1 |

(Continued)

OTHER PUBLICATIONS

U.S. Appl. No. 13/715,898, filed Dec. 14, 2012, Jeffrey Michael Barber et al.

(Continued)

*Primary Examiner* — Adam Lee
(74) *Attorney, Agent, or Firm* — Robert C. Kowert; Meyertons, Hood, Kivlin, Kowert & Goetzel, P.C.

(57) ABSTRACT

Methods and apparatus for storage object deletion job management are disclosed. A storage medium stores program instructions that when executed on a processor, identify, during a particular deletion execution iteration, a particular deletion job object stored at a multi-tenant storage service, wherein the particular deletion job object indicates a collection of storage objects that are eligible for deletion from the storage service in accordance with specified deletion criteria. The instructions determine, based on a job validity criterion, whether deletion operations corresponding to the particular deletion job object of the one or more deletion job objects are to be scheduled. If the job object is validated, the instructions initiate a deletion operation for storage objects indicated in the particular deletion job object.

21 Claims, 22 Drawing Sheets

(56) References Cited

U.S. PATENT DOCUMENTS

| | | |
|---|---|---|
| 2008/0177802 A1 | 7/2008 | Haye et al. |
| 2008/0177810 A1 | 7/2008 | Devarakonda et al. |
| 2008/0263112 A1 | 10/2008 | Shaath et al. |
| 2009/0177680 A1* | 7/2009 | Johnson et al. ............... 707/102 |
| 2009/0234880 A1* | 9/2009 | Madhavarapu et al. .. 707/103 R |
| 2010/0153397 A1* | 6/2010 | Barabas et al. ............... 707/737 |
| 2010/0241637 A1* | 9/2010 | Kissner et al. ................ 707/752 |
| 2010/0332401 A1 | 12/2010 | Prahlad et al. |
| 2011/0029729 A1 | 2/2011 | Zwisler et al. |
| 2011/0137966 A1* | 6/2011 | Srinivasan et al. ........... 707/828 |
| 2011/0225361 A1 | 9/2011 | Resch et al. |
| 2011/0276539 A1 | 11/2011 | Thiam |
| 2011/0302212 A1* | 12/2011 | Agrawal et al. ............... 707/793 |
| 2011/0314069 A1 | 12/2011 | Alatorre et al. |
| 2012/0173488 A1 | 7/2012 | Spielberg et al. |
| 2012/0233418 A1 | 9/2012 | Barton et al. |
| 2012/0260264 A1* | 10/2012 | Inagaki et al. ................ 719/316 |
| 2012/0331016 A1* | 12/2012 | Janson et al. ................. 707/809 |
| 2013/0013570 A1* | 1/2013 | Yamakawa .................... 707/679 |
| 2013/0046799 A1* | 2/2013 | Hale et al. ..................... 707/805 |
| 2013/0262403 A1* | 10/2013 | Milousheff et al. ........... 707/691 |
| 2014/0019934 A1* | 1/2014 | Schlarb et al. ................ 717/104 |

OTHER PUBLICATIONS

U.S. Appl. No. 13/715,889, filed Dec. 14, 2012, Jeffrey Michael Barber et al.

U.S. Appl. No. 13/715,867, filed Dec. 14, 2012, Jeffrey Michael Barber et al.

U.S. Appl. No. 13/715,863, filed Dec. 14, 2012, Jeffrey Michael Barber et al.

U.S. Appl. No. 13/715,844, filed Dec. 14, 2012, Jeffrey Michael Barber et al.

U.S. Appl. No. 13/715,850, filed Dec. 14, 2012, Jeffrey Michael Barber et al.

* cited by examiner

1002

```
PUT /?scheduledDelete HTTP/1.1
Host: bucketname.servicename.webserver.com
Date: Date
Authorization: Signature
<sDConfiguration>
   <Rule>
      <ID>xxxx</ID>
      <Prefix>prefix1/abc</Prefix>
      <Status>Enabled</Status>
      <DeletionCriterion>
         <Type>ElapsedTimeSinceCreation</Type>
         <Units>Days</Units>
         <Count>10</Count>
      </DeletionCriteria>
   </Rule>
   <Rule>
    <ID>yyyy<ID>
      <Prefix>prefix1/klm</Prefix>
      <Status>Enabled</Status>
      <DeletionCriterion>
         <Type>ElapsedTimeSinceLastAccess</Type>
         <Units>Weeks</Units>
         <Count>26</Count>
      </DeletionCriteria>
   </Rule>
</sDConfiguration>
```

*FIG. 10*

STORAGE OBJECT DELETION JOB MANAGEMENT

BACKGROUND

Computing applications typically rely on some type of storage medium for the persistent storage of various kinds of application data. For example, common office applications and multimedia applications generate and use application data of various types and formats, such as documents, spreadsheets, still images, audio and video data, among others. Frequently, such data is stored for repeated access or use on behalf of a user, or for shared use by multiple users such as employees of a particular department of a business organization. Users may wish to store and work with a number of documents or other data over a period of time, and may expect that the data will be readily available in a predictable state when needed. In many computing systems, the storage medium used by applications for persistent application data storage is most commonly a magnetic fixed drive or "hard" drive, although optical and solid-state storage devices are also used. Such devices are either integrated within a computer system that executes the applications or accessible to that system via a local peripheral interface or a network. Typically, devices that serve as application storage are managed by an operating system that manages device-level behavior to present a consistent storage interface, such as a file system interface, to various applications needing storage access.

This conventional model of application storage presents several limitations. First, it generally limits the accessibility of application data. For example, if application data is stored on the local hard drive of a particular computer system, it may be difficult to access by applications executing on other systems. Even if the data is stored on a network-accessible device, applications that execute on systems outside the immediate network may not be able to access that device. For example, for security reasons, enterprises commonly restrict access to their local area networks (LANs) such that systems external to the enterprise cannot access systems or resources within the enterprise. Thus, applications that execute on portable devices (e.g., notebook or handheld computers, personal digital assistants, mobile telephony devices, etc.) may experience difficulty accessing data that is persistently associated with fixed systems or networks.

The conventional application storage model also may fail to adequately ensure the reliability of stored data. For example, conventional operating systems typically store one copy of application data on one storage device by default, requiring a user or application to generate and manage its own copies of application data if data redundancy is desired. While individual storage devices or third-party software may provide some degree of redundancy, these features may not be consistently available to applications, as the storage resources available to applications may vary widely across application installations. The operating-system-mediated conventional storage model may also limit the cross-platform accessibility of data. For example, different operating systems may store data for the same application in different, incompatible formats, which may make it difficult for users of applications executing on one platform (e.g., operating system and underlying computer system hardware) to access data stored by applications executing on different platforms.

To address some of these limitations, in recent years some organizations have taken advantage of virtualization technologies and the falling costs of commodity hardware to set up large-scale network-accessible multi-tenant storage services for many customers with diverse needs, allowing various storage resources to be efficiently, reliably and securely shared by multiple customers. For example, virtualization technologies may allow a single physical storage device (such as a disk array) to be shared among multiple users by providing each user with one or more virtual storage devices hosted by the single physical storage device, providing each user with the illusion that they are the sole operators and administrators of a given hardware storage resource. Furthermore, some virtualization technologies may be capable of providing virtual resources that span two or more physical resources, such as a single large virtual storage device that spans multiple distinct physical devices.

The pace at which data is generated for storage in such network-accessible storage services has been accelerating rapidly. In at least some cases, the rate at which an organization's data set grows may eventually lead to unsustainable storage costs, even if the per-unit costs of storage at the storage services remain low or even decrease over time. In addition to cost considerations, there may be other reasons (such as legal or regulatory requirements, or even performance considerations related to searching and finding data objects efficiently within a growing data set) to constrain or limit the rate at which an organization's data accumulates within a storage service.

BRIEF DESCRIPTION OF DRAWINGS

FIG. 10 illustrates example elements of a storage object deletion policy that may be specified by a client using a programmatic interface, according to at least some embodiments.

Figure 1:
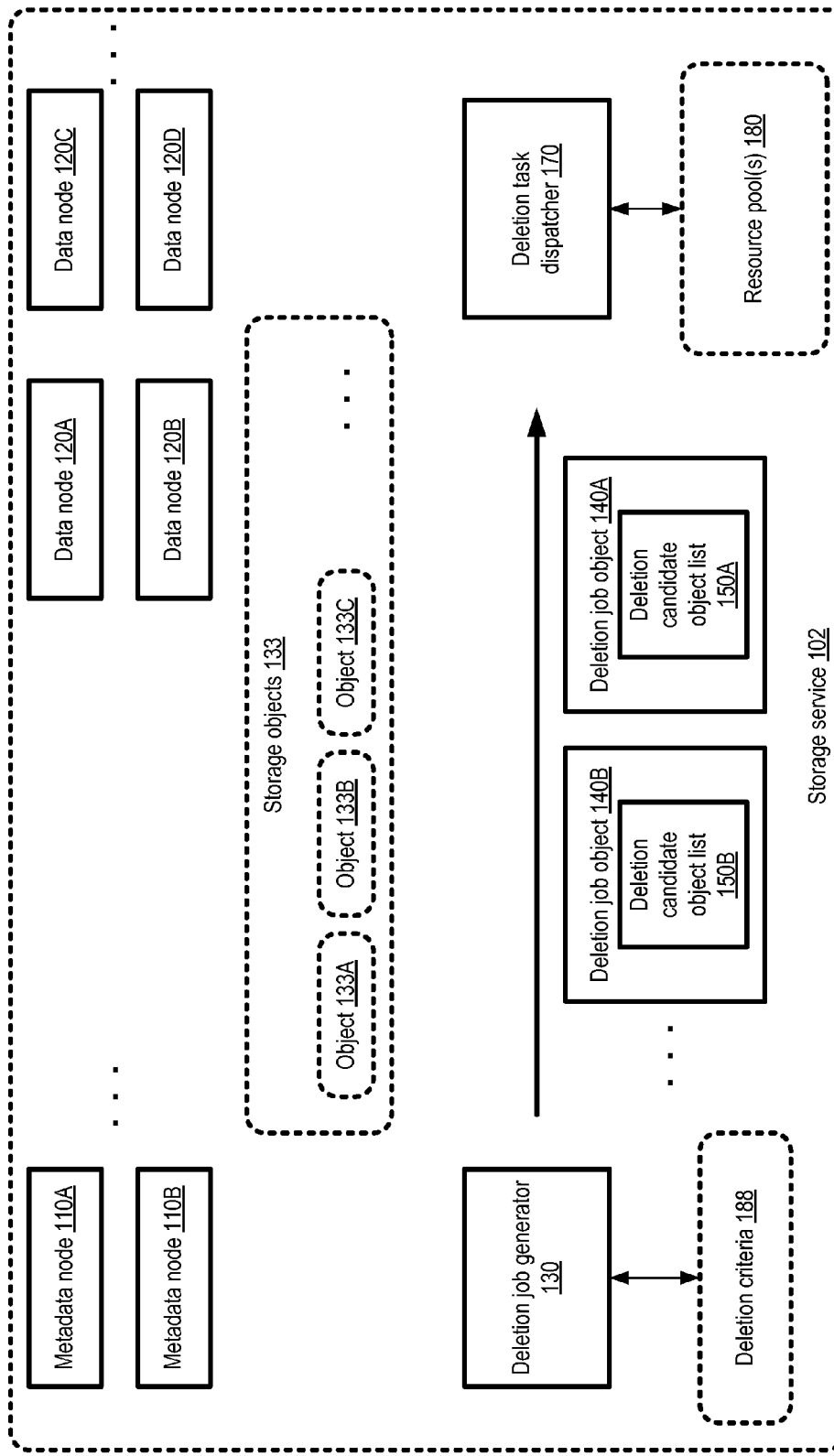
FIG. 1 illustrates an example system environment, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for managing aspects of scheduled deletions of client-generated storage objects stored within multi-tenant network-accessible storage services are described. Support for scheduled deletions, such as via the use of various types of data expiration policies in some embodiments, may allow some organizations to limit, at least to some extent, the rate at which their data storage costs increase, and may also help in compliance with various regulations regarding data retention periods in at least some embodiments. Networks set up by an entity such as a company or a public sector organization to provide one or more multi-tenant services (such as various types of cloud-based storage) accessible via the Internet and/or other networks to a distributed set of clients may be termed provider networks in this document. The term "multi-tenant" may be used herein to refer to a service that is designed to implement application and/or data virtualization in such a manner that different client entities are provided respective customizable, isolated views of the service, so that one client to whom portions of the service functionality are being provided using a given set of underlying resources may not be aware that the set of resources is also being used for other clients. A given provider network may include numerous data centers (which may be distributed across different geographical regions) hosting various resource pools, such as collections of physical and/or virtualized storage devices, computer servers, networking equipment and the like, needed to implement, configure and distribute the infrastructure and services offered by the provider.

In at least some embodiments, a storage service offered by a provider network may include a differential priority model for scheduled deletions. Clients in such embodiments may be allowed to specify various criteria or policies to be used to determine when, or under what conditions, a particular set of storage objects is to be removed from the service. For example, a client may wish to define a policy according to which storage objects within a specified directory or logical container should be deleted one year after it was created. The service may be designed with the assumption that the operations performed for such removals are generally to be considered lower in priority than operations performed in response to incoming client input/output (I/O) requests (such as reads or writes, to which clients typically want responses as soon as possible). Accordingly, in such embodiments, the service components and methodologies used for scheduled deletions may be designed with a goal of minimizing the impact of the scheduled deletions (which may be considered "background" activity) on the responsiveness of "foreground" client requests. At the same time, the operator of the provider network may wish to ensure that storage objects that a client wishes to have removed from the service under a given set of conditions is in fact logically and/or physically removed fairly quickly after the set of conditions is reached. Thus, the service may have to balance the goals of providing efficient and highly responsive support for client I/O requests, and at the same time, promptly deleting objects when the applicable deletion criteria are met. In at least some embodiments, scheduled deletions may be implemented in batches or iterations as described below in further detail—e.g., components of the storage service may be configured to periodically discover which objects are eligible for deletion, schedule asynchronous deletion jobs or tasks for batches or groups of objects, assign resources for executing the deletion operations, and then sleep or remain dormant until the next iteration of scheduled deletes is to be performed. The jobs may themselves be stored as first-class storage objects within the service in at least some embodiments (e.g., as objects to which the same kinds of read and write operations can generally be performed as are possible on customer-created storage objects), as described below in further detail. Implementing such an iterative or batched approach may be beneficial for a number of reasons in such embodiments: e.g., in increasing the throughput at which scheduled deletions can be performed, and in meeting the design goal of minimizing impact on foreground client activity. (It is noted that foreground client activity may also include deletions in various embodiments—e.g., a client may submit a foreground request to delete a storage object immediately, which may be handled at a higher priority than a background deletion scheduled in accordance with an object expiration policy).

A storage service being implemented within a provider network may serve organizations of widely different sizes (e.g., with varying numbers of individual users, and/or varying rates of storage object generation) in at least some embodiments. Object deletion policies being implemented on behalf of a large customer C1 may result in large numbers of objects being candidates for deletion in a given time window or deletion iteration, while fewer objects of a smaller customer C2 may be candidates for deletion in that same time window or iteration. If insufficient resources are available to delete all the objects for all the customers within a desired amount of time, and especially if such resource constraints are a frequent occurrence during many iterations, a "client fairness" or "customer fairness" policy may be implemented in some embodiments to ensure that deletion operations of smaller clients can make progress even if larger clients may typically have far more objects eligible for deletion.

According to one such embodiment, a system may comprise computing devices that implement a network-accessible multi-tenant storage service for storage objects owned by a plurality of clients, in which storage objects owned by a given client are stored within a logical container associated with that client. A hierarchy of logical containers may be implemented in some embodiments, such as one or more "buckets" owned by the client, where each bucket is divided into subcomponents called "partitions" based on partition size limits and/or on the identifiers of the storage objects, and where each partition may be further divided into lower-level containers such as "bricks" as described below in further detail. The computing devices may identify a set of storage objects of the storage service to be deleted in accordance with one or more deletion criteria, and generate one or more deletion job objects, where each deletion job object includes an indication (such as a list of identifiers or keys) of a subset of the set of storage objects. (Deletion job objects may be referred to herein simply as "jobs".) The computing devices may further be configured to determine, for a particular deletion job object, a logical container count indicative of a number of distinct logical containers whose storage objects are indicated in that particular deletion job object. For example, in one implementation in which a container hierarchy with buckets and partitions are used, the logical container count may represent the number of distinct buckets whose objects are included in the job, while in another implementation, the logical container count may correspond to the number of distinct partitions whose objects are included. The logical container count may serve as a representation or approximation of the number of different clients whose objects are included within a given job object in at least some embodiments.

When assigning resources for the deletion operations corresponding to the particular deletion job object, the logical container count, and/or the identity of the clients that own the distinct logical containers represented in the count, may be taken into consideration in such embodiments. Thus, for example, in one implementation, no more than N worker threads from a pool of worker threads may be assigned for deletion jobs whose logical container count (or distinct client count) is one, and no more than M worker threads may be assigned for deletion jobs whose logical container count (or distinct client count) exceeds one. Different amounts of resources, or different pools of resources, may thus be utilized depending on the logical container count in such implementations. In another implementation, the number of worker threads or other resources assigned to a given job from various pools may be determined in proportion to the logical container count. In one implementation, the number of worker threads may be assigned based on the following logic (a) a given client C1 may be assigned no more than N worker threads in total to work on any number of jobs that only include client C1's objects and (b) any job that includes objects belonging to logical containers of several clients may be assigned worker threads from a pool of M worker threads designated specifically for multiple-client jobs. In this latter implementation, the number of threads that can work on client C1's exclusive jobs (i.e., jobs whose store objects belong exclusively to a single logical container owned by C1), no matter how many such exclusive jobs C1 has, is limited to N. In contrast, a small customer C2, who may not have enough objects scheduled for deletion to fill up a single job (or whose objects are distributed into jobs in such a way that no one job contains exclusively C2's objects), is ensured that at least a pool of M threads is available for multi-client jobs. The relative numbers of threads (M versus N) for the different types of jobs may differ in different implementations and may be tunable in some implementations; in one simple implementation, for example, M may be set equal to N. After the resources have been assigned to the particular job object based at least in part on the logical container count, deletion operations for the objects indicated in the particular job object may be initiated using the resources. In some embodiments, the number of distinct clients whose objects are included in a given job may be used as a factor in assigning resources, without necessarily determining the number of distinct logical containers.

In various embodiments, different criteria may be used to determine which set of objects is to be deleted from the storage service during a given iteration of scheduled deletion activities. The criteria for deleting a particular storage object may include, for example, any combination of: the time that has elapsed since the object was created, the time since the object was most recently modified, the time since the object was last accessed, or how frequently the object is accessed or modified. In at least some implementations, a client-specified object expiration policy or retention policy (which may in turn specify one or more of the criteria listed above in some cases) may be used for identifying candidate objects for deletion. In some embodiments, the client-specified policy may itself be stored as a first-class object within the storage service, as described below in further detail. A programmatic interface such as a web page or an application programming interface (API) may be implemented to enable clients to submit the policy and/or the deletion criteria in one embodiment.

In at least some embodiments, the storage service may comprise a plurality of nodes or hosts, some of which (termed "data nodes" herein) are designated primarily to store the data of the client's storage objects, while others (termed "metadata nodes" herein) are designated primarily to store metadata (such as index entries or records mapping keys or identifiers of the storage objects to the locations of the corresponding data nodes). Multiple metadata nodes may comprise a particular storage object's metadata entries (e.g., replicas or copies of metadata may be maintained for durability or availability reasons, or the metadata for a client's storage objects may be distributed across multiple nodes without replication) in some implementations, and similarly, in some embodiments multiple data nodes may be used for storing the contents of the object. The deletion of a particular storage object may comprise a plurality of distinct lower-level operations in some embodiments—one or more logical and/or physical metadata deletion operations directed to entries or records at a metadata node or nodes, and one or more logical and/or physical storage space release operations at a data node or nodes. It is noted that at least in some embodiments, the storage service may store several different kinds of entries or records that collectively may be referred to as metadata for the storage objects, including for example classification information identifying the type of the objects, usage history for the objects, as well as index entries identifying locations of the objects' data, and that not all of the metadata entries or records may be deleted as part of scheduled deletion operations in such embodiments. The storage space release operations may be performed asynchronously with respect to the metadata deletion operations in at least some embodiments; for example, a deletion request for a keymap entry of an object may trigger an asynchronous operation to delete the corresponding data contents of the object and release the storage space used for the data. The worker threads mentioned above may be configured to initiate metadata deletion operations for objects indicated in the deletion jobs in such embodiments, with the storage release operations being implemented asynchronously (e.g., by other components of the storage service than the worker threads) at some point after the metadata deletions have been initiated.

In some embodiments, especially if the storage space release operations are asynchronous with respect to metadata I/O operations, the metadata nodes may typically represent the performance bottleneck for storage operations in general (i.e., for the combination of the foreground client I/O operations and the background scheduled deletions). In some such embodiments, the storage service may accordingly attempt to throttle or adjust the rate at which metadata deletions corresponding to scheduled deletes are attempted, e.g., based on performance or other metrics obtained from the metadata nodes. According to at least one such embodiment, a system may include computing devices that implement a network-accessible multi-tenant storage service for storage objects owned by a plurality of clients. The devices may identify a set of storage objects of the storage service to be deleted in accordance with one or more deletion criteria (such as the criteria described above), wherein a deletion of a given storage object from the storage service comprises a metadata deletion operation and a storage release operation asynchronous with respect to the metadata deletion operation. The devices may initiate, corresponding to each storage object of one or more storage objects of the set, a respective metadata deletion operation to delete a metadata entry (e.g., an entry specifying a data storage location of the storage object), and determine whether a performance metric associated with at least one metadata deletion operation corresponding to a particular storage object meets a threshold criterion. For example, in one implementation a response time metric for a metadata deletion may be compared to a threshold value. In response to a determination that the performance metric meets the threshold criterion, initiation of an additional metadata deletion operation corresponding to another storage object may be delayed by a particular amount of time. Thus, in such an embodiment, the times at which at least some of the metadata deletion operations corresponding to a given job object are initiated may be adjusted based on metrics obtained from a metadata node or nodes.

The exact amount of the delay to be introduced before initiating a given set of subsequent metadata deletion operations may be determined according to various policies or formulas in different embodiments—e.g., delays may be dynamically computed as a function of response time metrics obtained from a metadata node, or a fixed delay interval may be used, or delays that include a randomly-selected time period may be used. In one implementation, for example, the delay D may be computed based on a recent metadata deletion response time metric R and a jitter factor J (which may be randomly generated), such that $D=R^k+J$, where k is an exponent factor. In some embodiments, the delay may be determined based at least in part on an identification of the client or customer that owns the storage object(s) whose metadata is to be deleted in the subsequent, yet-to-be-initiated operations. For example, in one implementation, in another approach to client/customer fairness, the storage service may use a different formula to determine a delay for a given client C1's metadata deletion operation if this is the first such delay to be applied to C1 in a given iteration of deletion operations, than if other C1 metadata deletion operations have already been delayed during the iteration. In order to attempt to avoid neglecting smaller clients' deletions, a shorter delay may be used for clients with fewer objects in the job being considered than for clients with exclusive jobs or larger numbers of objects in the job in some implementations. In some embodiments, metrics associated with foreground metadata operations (i.e., operations performed at metadata nodes in response to foreground client I/O requests) may be used, in addition to or instead of, using metrics associated with background deletions. In addition to or instead of response times, other performance metrics such as CPU or I/O utilization measures may be used in some embodiments. Error count metrics, or other metrics that are not purely performance measurements, may be used in other embodiments. In at least some embodiments, the storage service may include multiple replicas or copies of a given storage object with respective metadata nodes, e.g., in accordance with a durability goal, and the performance metric associated with a metadata deletion attempted for a particular one of the replicas may be used to determine whether delays need to be introduced for subsequent metadata deletions. In such replication scenarios, subsequent metadata deletions may be directed to either the same replica, or to a different replica, based at least in part on the metric in some embodiments.

In some embodiments, as mentioned above, deletion job objects may be stored within the storage service, e.g., in special logical containers designated for internally-generated (as opposed to customer-created) storage objects. According to one such embodiment, computing devices configured to implement the storage service may identify a set of client-owned storage objects of the storage service to be deleted in accordance with an object retention policy or other criteria, and store one or more deletion job objects within the storage service in accordance with a priority-based object naming policy. A job may comprise up to a maximum number of identifiers of storage objects in some implementations. For example, with a maximum job size of 100,000 objects and a total of 1,150,000 deletion candidate objects found during a given cycle of candidate discovery, 12 job objects may have to be created (11 with 100,000 object identifiers each, and one with 50,000 object identifiers). The maximum job size or object count may be selected based on a variety of factors—e.g., based on the overhead associated with managing the job objects themselves within the storage service. In some implementations, the job size may be tunable, and may be adjusted based on such factors as the amount of measured storage, computing and/or networking resource overhead that can be attributed to job object management. The priority-based object naming policy may result in a selection of logical container names for the job objects that indicates the relative priorities of different jobs. In one implementation, for example, the names of the logical containers (such as buckets) may include strings or encodings of the expiration times or dates of the objects included in the jobs stored in the logical container, or the times at which the corresponding iteration of candidate discovery operations was conducted. For example, a bucket that includes the string "2012-07-31-0800" may be used to store jobs that were generated as a result of a deletion candidate discovery iteration that began at 08:00 GMT on Jul. 31, 2012. The encoded timing information may serve as a priority indicator in some such embodiments, with the earlier-created buckets being considered higher priority. In other embodiments, priorities may be indicated in the names or keys of the job containers, or the jobs themselves, without using timestamps.

In at least some embodiments, one component (which may be termed a "deletion job generator" herein) or set of components of the storage service may be responsible for identifying objects that should be deleted, and generating and storing the deletion job objects. The deletion job generator may alternate between periods of inactivity, and active periods during each of which it performs a candidate discovery iteration to finds the set of objects that are currently eligible for deletion from the storage service, generates jobs listing the identified objects and stores the jobs. Another component (which may be termed a "deletion task dispatcher" herein) may be responsible for identifying resources such as worker threads to be assigned for implementing the deletion operations indicated in the job objects, assigning the resources, and monitoring the success or failure of the delete operations. The deletion task dispatcher may operate asynchronously with respect to the deletion job generator in some embodiments, e.g., the task dispatcher may perform its operations in iterations (which may be termed "execution iterations" herein) that are scheduled independently of the candidate discovery iterations of the job generator. In a given execution iteration in such an embodiment, the task dispatcher may identify (e.g., using its knowledge of the priority-based object naming policy for job containers) a set of jobs for which deletion operations are to be initiated. The task dispatcher may use a job validity criterion (such as an indication of how long ago a given job was generated) to determine whether a given job remains valid, i.e., whether deletion operations for a given job still need to be scheduled during the current iteration. If the job is valid (e.g., if the job object itself has not expired in accordance with a job expiration criterion), the dispatcher may add, to a collection or list of tasks awaiting implementation, a task object indicating at least one storage object of the given deletion job object. If the job is not valid, the job may be discarded and/or removed from the storage service in some embodiments. The collection of tasks may be implemented as a "waiting-for-execution" task queue or list in some implementations. A set of resources assigned to the job (such as one or more worker threads) by the dispatcher may initiate deletion operations for the task object, e.g., after removing the task from the "waiting-for-execution" queue and placing it in an "in-progress" queue. Different mappings between job objects and task objects may be implemented in various embodiments—e.g., in some embodiments a single task may be used for all the deletion candidate objects indicated in a given job object, in other embodiments tasks may be sized dynamically based on various factors such as the number of worker threads available or the utilization levels at one or more metadata nodes.

Depending on various constraints, such as a limit on the maximum size of "waiting-for-execution" queue, the number of worker threads available, and so on, the task dispatcher may validate and assign resources to as many of the job objects as it can accommodate during a given execution iteration in some embodiments. In at least some circumstances, the task dispatcher may not be able to assign resources to all the eligible jobs during the iteration, so that a given storage object O1 that should ideally have been deleted before the next discovery iteration remains in the storage service at the time that the next discovery iteration begins. In at least some embodiments, the deletion job generator may simply add such a storage object O1 to a new job during the next discovery iteration, without, for example, checking whether a job that lists O1 already exists in the storage service. The deletion job generator may, in such embodiments, rely on the job validity checking performed by the task dispatcher to avoid duplicate deletion operations—e.g., if O1 was included in an old job J1 as well as a new job J2, the old job J1 may be assumed to have expired by the time J2 is considered for dispatch.

In at least some embodiments, the collection of tasks to be implemented (e.g., the "waiting-for-execution" task list or queue) may be organized as an ordered list, i.e., tasks may be taken off the list based on an order determined by the dispatcher. For example, in one embodiment, the dispatcher may generate a universally unique identifier (UUID) for each task, and tasks may be implemented by worker threads in lexicographic or numerical UUID order. In one implementation, a random string or numerical value may be generated for inclusion (e.g., as a prefix used for ordering) in UUIDs, so that, for example, the order in which the dispatcher validates jobs may not correspond exactly with the order in which the corresponding deletion operations are eventually performed. In some embodiments, worker threads may notify the task dispatcher as deletion operations are completed (or as deletion operations fail), so that the dispatcher can determine when all the deletion operations that were to be initiated for a given job have been completed. In one embodiment, the dispatcher may initiate a deletion of the job object from the storage service after ascertaining that all the deletion operations of the job have been initiated.

Service level agreements for various attributes of the storage service, such as performance, availability or uptime, durability and the like may be supported in different embodiments. According to one embodiment, the service may support a desired level of durability (such as 99.999999999% durability, which corresponds to an average annual expected loss of 0.000000001% of objects stored in the service) by storing redundant copies or replicas of storage objects (including redundant copies of both metadata and data). Respective replicas of a given storage object may be stored in geographically separated locations in some embodiments—e.g., replica R1 of object O1 may be stored in a data center DC1, replica R2 in a different data center DC2, and so on. For performance and/or other reasons, the replicas of a given storage object may not be completely identical at a given point in time in some embodiments—e.g., an update may be applied to one replica R1 some time before the update is applied to replica R2. A number of different approaches may be used to resolve potential or real update conflicts that may result from the distributed, asynchronous design of the storage system in various embodiments. For example, protocols that rely on modification sequence numbers (MSNs) to resolve conflicts may be used in some embodiments, where if two apparently conflicting update operations for the same object identifier or key are detected, the operation with the more recent (higher) MSN is determined to be the "winner"—i.e., the operation with the higher MSN is accepted as the valid operation to resolve the conflict. A protocol that relies on reconciliation based on MSN comparisons may be used for eventual replica synchronization in at least some embodiments, as described below in further detail. In at least some embodiments, MSN-based conflict resolution protocols may be used independently of (e.g., prior to) reconciliation, for example whenever a decision as to whether a particular update associated with a key is to be "committed" is to be made, the service may check whether records for any other conflicting updates for the same key have a more recent sequence number, and the update with the more recent MSN may "win". In one embodiment, MSN-based conflict resolution may be used even if reconciliation techniques of the kinds described below are not used.

In at least some embodiments in which sequence-number based protocols are used for resolving update conflicts, conditional scheduled delete operations may be supported. In one such embodiment, for example, an apparently completed deletion of an expired storage object with a particular key or identifier may be canceled or undone in the event that later analysis indicates that the owner of the object decided to store a different value for the same key after the expiration of the object. According to such an embodiment, computing devices may implement a distributed multi-tenant storage service, in which a protocol based at least in part on respective sequence numbers associated with modification operations is used to resolve update conflicts associated with storage objects that are replicated in the storage service. The devices may store, as part of a conditional deletion record associated with a key identifying a particular storage object of the storage service, where the particular storage object has been identified as a candidate for removal from the storage service, a deletion sequence number derived at least in part from a particular modification sequence number associated with the particular storage object. For example, in one implementation, a deletion sequence number that is slightly higher than the creation sequence number (i.e., the sequence number obtained when the object was created) may be stored in the conditional deletion record. The devices may later determine, in accordance with the conflict resolution protocol, whether an additional modification sequence number larger than the deletion sequence number has been generated in response to a client request to store a value associated with the key. In response to a determination that an additional modification sequence number has been generated in response to a client request, the removal of the particular storage object from the storage service may be canceled (e.g., the object may be retained in the storage service with the value indicated in the client's store request).

A sequence number generator component of the storage service may be responsible for assigning sequence numbers to client-initiated modification requests, with a minimum difference "deltaClient" between successive sequence numbers for client requests, in some embodiments. In such an embodiment, for example, no matter how quickly after a given client modification request M1 (with a sequence number SN-1 assigned to it) a subsequent client modification request M2 is received, the sequence number SN-2 assigned to M2 must differ from SN-1 by at least "deltaClient". In at least some embodiments, the deletion sequence number used for the conditional delete may be obtained by adding a special "deltaMin" value to the creation sequence number of the storage object, such that any client store operation for the same key that occurred after the creation of the object would have a higher sequence number than the deletion sequence number (i.e., "deltaMin" is less than "deltaClient"). Using such an approach, the storage service may attempt to ensure that newly-stored client data for a given key is not permanently lost from the storage service, despite the possibility of a scheduled deletion that may have occurred at very near the time that the client submitted the store request. Examples and further details regarding conditional deletes are provided below with respect to FIGS. 19, 20 and 21.

Example System Environment

FIG. 1 illustrates an example system environment, according to at least some embodiments. As shown, system 100 may include various components of a distributed, network-accessible multi-tenant storage service 102. The storage service 102 may comprise a plurality of storage objects 133 (such as objects 133A, 133B, and 133C) whose contents are stored at a plurality of data nodes 120, such as data nodes 120A-120D. Certain types of metadata for the storage objects 133, such as location information indicating which data node(s) 120 contain the data of a given storage object 133, may be stored in a plurality of metadata nodes 110, such as metadata nodes 110A and 110B in the depicted embodiment. In at least some implementations, the metadata and/or the data for the objects 133 may be distributed across different data centers, which may in turn be located in different geographical regions or even in different countries. Either the data, the metadata, or both the data and the metadata corresponding to a given object 133 may be replicated at multiple nodes of storage service 102 in the depicted embodiment, e.g., in accordance with a durability policy or a high-availability policy being implemented for the object 133. Different sets of storage objects 133 may have different numbers of replicas in at least some embodiments, e.g., one client of the storage service may require a higher level of durability than another client, resulting in a higher replication count of the first client's data objects than the replication count of the second client's data objects. In some embodiments, the storage objects 133 may be identified using respective unique keys or identifiers. The storage nodes at which the data or values corresponding to a given key may be identified using metadata elements called locators in such embodiments. Each of the metadata nodes 110 may include a plurality of keymap entries in some embodiments, where each keymap entry comprises a key for a storage object 133 and a list of one or more locators, with each locator indicating a data node 120 at which one replica of the data of the storage object 133 is stored. A creation of an object 133 in the depicted embodiment may involve at least one metadata entry creation at a metadata node 110, and at least one allocation of storage space at a data node 120. Similarly, a deletion of a given data object 133 may involve at least one metadata entry deletion at a metadata node 110 and at least one de-allocation or release of storage space at a data node 120. As described in greater detail below, the release of storage space may be asynchronous with respect to the deletion of the metadata entry or entries in at least some embodiments.

Storage service 102 may support scheduled delete operations in accordance with client-specified policies in the depicted embodiment. Over time, at least a subset of the objects 133 may become eligible for automated deletion from the storage service 102, e.g., in accordance with various kinds of deletion criteria 188 indicated in the client-specified policies. Deletion criteria 188 for a given object or set of objects may be specified in some embodiments at the time that the object is created: for example, a client that owns object 133A may indicate an expiration policy according to which the maximum time that object 133A is to be retained is a year after its creation. In some embodiments a client may modify the deletion criteria for a storage object 133 as desired. Deletion criteria 188 for an object 133 may be based on any combination of a number of different factors in various embodiments, such as the time that has elapsed since the object was created, the time that has elapsed since the object was last modified or read, the frequency of accesses or modifications of the object, or other considerations such as the total number of objects owned by the client reaching a certain threshold, the size of the object. In at least some embodiments the storage service may provide default expiration/retention policies or deletion criteria, specified in service level agreements with the clients. In at least some implementations, programmatic interfaces such as APIs or web pages may be provided to allow clients to specify deletion criteria or policies, and in some embodiments such policies may themselves be stored (as additional storage objects 133) within the storage service 102.

In the embodiment depicted in FIG. 1, a deletion job generator 130 of the storage service 102 may be responsible for determining, e.g., as part of a discovery iteration, whether any of the storage objects 133 are eligible for deletion in accordance with the deletion criteria 188 at a given point in time. The terms "deletion-eligible objects" or "deletion candidates" may be used herein to indicate the storage objects 133 that meet applicable deletion criteria, and for which deletion operations such as keymap entry deletions should accordingly be scheduled. If any deletion-eligible objects are found, the deletion job generator 130 may create one or more deletion job objects 140 (such as job objects 140A and 140B), and distribute the deletion candidates into respective lists 150 that are indicated in each of the job objects 140 (such as deletion candidate object list 150A of job object 140A, and deletion candidate object list 150B of job object 140B). A deletion task dispatcher 170 may be responsible for assigning resources selected from one or more resource pools 180 (such as one or more pools of worker threads) to implement deletion operations (e.g., metadata entry deletions and/or storage release operations) corresponding to the job objects 140.

The operations of the deletion job generator 130, the deletion task dispatcher 170, and/or the resources assigned to implement the deletion operations, may all be mutually asynchronous in at least some embodiments. For example, in one implementation, a candidate discovery iteration may be conducted by deletion job generator 130 once every day, say at 02:00 AM in a given time zone. Continuing the example, during one such candidate discovery iteration, job generator 130 may identify 505,000 storage objects (owned by various clients with respective deletion criteria 188 in effect) that are eligible for deletion. The deletion job generator may determine that each job object 140 is to include at most 20,000 candidate objects in its candidate list. Thus, the 505,000 objects may be distributed among 26 deletion job objects, with 20,000 objects included in the candidate object lists of each of the first 25 deletion job objects and 5,000 objects in the $26^{th}$ job's list. In at least some embodiments, the job objects 140 may also be stored as first-class objects 102 within the storage service 102.

The deletion task dispatcher 170 may be activated for an execution iteration at 04:00 AM in this example, e.g., in accordance with a schedule that differs from the schedule of the deletion job generator in some embodiments. In other embodiments, an execution iteration of deletion task dispatcher may be scheduled in response to a determination that at least a threshold number of jobs 140 are awaiting implementation, or based on other factors such as whether sufficient resources are available for starting deletion operations. The deletion task dispatcher 170 may identify the set of job objects (which may include just the 26 jobs generated in the last candidate discovery iteration, more than 26 jobs because some jobs have been left over from previous discovery iterations, or less than 26 jobs based on a determination that some of the jobs are no longer valid for implementation) for which deletion operations are to be implemented during its current execution cycle. The deletion task dispatcher 170 may in some embodiments determine which (or how many) resources are to be assigned from pool(s) 180 to a given job based on a fairness policy that attempts to allow clients with small numbers of deletion candidate objects to make progress even if other clients have very large numbers of deletion candidate objects, as described below in further detail. In some embodiments a single pool of worker threads may be implemented, and different numbers of threads may be assigned to a given job based on whether the job lists candidates of one client only, or whether the job lists candidates owned by multiple clients. In one embodiment, the names or identifiers assigned to job objects may provide an indication of the clients whose objects are included in the job, or an indication of how many clients' objects are listed in the job, and the names or identifiers may be used to assign resources in accordance with the fairness policy. For example, if all the objects listed in a job J1 belong to client C1, the string "Client-C1" may be included in J1's name or identifier in such an embodiment. In contrast, if more than one client's objects are included in job J1, J1's identifier may indicate that multiple clients are represented by including the string "Multi-client", or by excluding the "Client-" string and simply using a randomly-generated identifier. In this example, all Client-C1 jobs may collectively be assigned no more than N worker threads, while multi-client jobs may be assigned M worker threads in an attempt to ensure that clients with smaller numbers of deletion candidates are provided at least some resources for their deletions. The deletion task dispatcher 170 may map the deletion candidate object lists of a given job object 140 to one or more task objects (each of which contains a list of objects to be deleted) that are then placed in a list or queue of waiting-for-execution tasks in some embodiments. The number of deletion candidates included in a given task may vary according to various factors in different implementations; for example, in one implementation a 1:1 mapping may be used between jobs and tasks, so that all the candidate objects of a given job are listed in a corresponding task. An assigned worker thread or other resource may then obtain a task from the waiting-for-execution queue or list and initiate at least the corresponding metadata deletion operations directed to one or more metadata nodes 110 in such embodiments. In some embodiments, the worker threads (and/or the dispatcher 170) may insert delays between at least some of the metadata deletion operations based on one or more metrics, such as the responsiveness of the metadata node(s). A given job object 140 may be deleted after attempts to delete at least the metadata entries for all its deletion candidates have been initiated in some embodiments. In at least some embodiments in which multiple replicas of storage objects 133 are maintained in the storage service 102, and a sequence-number based protocol is used to resolve update conflicts between replicas, at least some of the metadata deletion operations initiated by resources from pools 180 may be conditional, i.e., the deletions may not be committed or considered final until processing associated with the protocol is completed, as also described below in further detail.

Figure 2A:
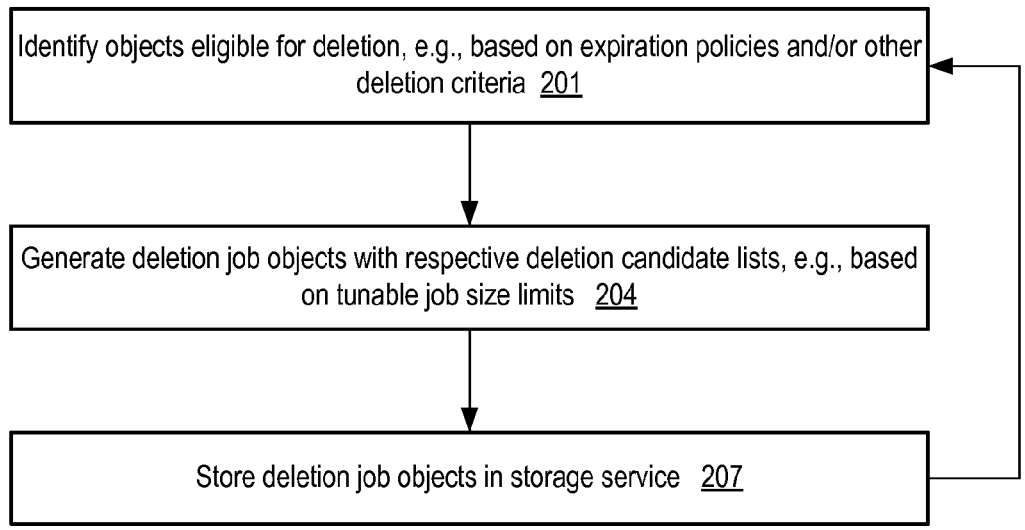
FIG. 2A provides an overview of operations that may be performed by a deletion job generator of a storage service, according to at least some embodiments.
Figure 2B:
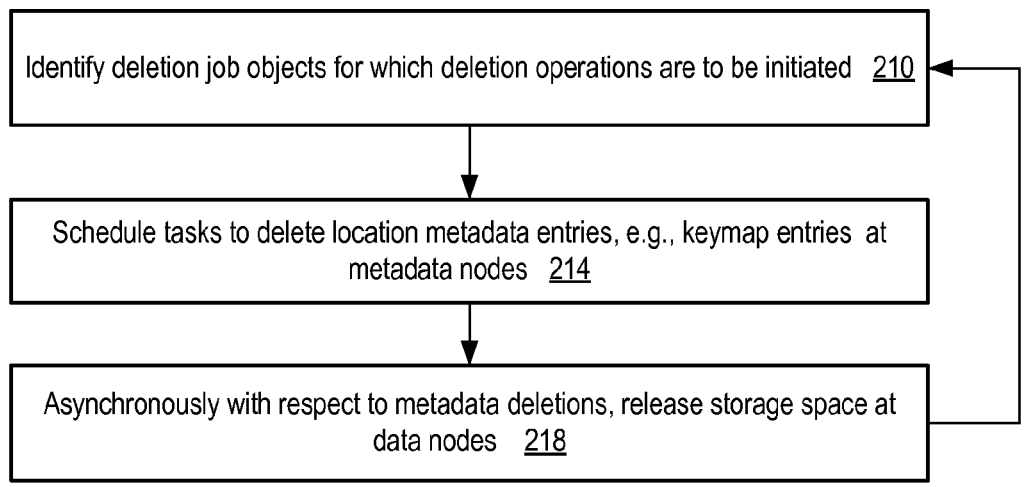
FIG. 2B provides an overview of operations that may be performed by a deletion task dispatcher of a storage service, according to at least some embodiments.

FIG. 2A provides an overview of some of the operations that may be performed by a deletion job generator 130 of a storage service 102 according to at least some embodiments, while FIG. 2B provides an overview of some of the operations that may be performed by a deletion task dispatcher 170 of a storage service 102, according to at least some embodiments. In the embodiments depicted in FIGS. 2A and 2B, both the deletion job generator 170 and the deletion task dispatcher may be activated periodically, perform a cycle or iteration of operations, and then become dormant or sleep until the next iteration is to begin. The deletion job generator 130 may be configured to start a candidate discovery iteration shown in FIG. 2A independently of exactly when the deletion task dispatcher 170 is to start its next deletion execution iteration, or when the previous deletion execution iteration occurred. Similarly, deletion task dispatcher 170 may be configured to start a deletion execution iteration shown in FIG. 2B independently of exactly when the deletion job generator 170 performed its most recent candidate discovery iteration, or when the next candidate discovery iteration may be performed.

As shown in element 201, the job generator 170 may identify objects 133 to be deleted in accordance with various deletion criteria 188. One or more deletion job objects 140 with respective deletion candidate lists 150 may then be generated, with the number of distinct jobs being based at least in part on a tunable job size limit in some embodiments (element 204). The deletion job objects may be stored within the storage service 102, e.g., in logical components such as buckets whose names are determined in accordance with a priority-based naming policy in some implementations. The naming policy (according to which a container name or a job name may include, for example, a string indicative of an object expiration date or time) may be used by the deletion task dispatcher 170 to determine which set of jobs to examine in the storage service during a given deletion task execution iteration. At least in some embodiments, when including a given object 133 as a deletion candidate in a job 140, the deletion job generator 130 may do so regardless of whether the same object was already included as a deletion candidate during a previous discovery iteration. The job generator may thus be able to avoid the overhead of checking whether duplicate deletion candidates are included in previously-created jobs, and may be able to rely on the deletion task dispatcher to discard old jobs that may have contained duplicates, or rely on idempotency of deletion operations in the storage service.

During a given deletion execution iteration, the task dispatcher may be configured to identify deletion job objects for which deletion operations are to be initiated (element 210 of FIG. 2B). Some pending jobs may be rejected in some embodiments, e.g., in accordance with validation criteria such as how long ago the jobs were created by the job generator. For the deletion job objects found valid, the task dispatcher 170 may schedule corresponding tasks to delete location metadata entries (e.g., keymap entries at one or more metadata nodes 110), as shown in element 214. The tasks may be scheduled, for example, by placing task objects in a queue, and activating or assigning resources such as worker threads to initiate the metadata deletions in some embodiments. Storage space of the storage objects may be released at data nodes 120 asynchronously with respect to the metadata deletions in the depicted embodiment (element 218). The asynchronous storage release operations may be initiated by other components (i.e., other than the worker threads responsible for metadata deletion) of the storage service 102 in some embodiments—e.g., in one embodiment, whenever a given keymap entry is deleted, corresponding tasks to release storage space (and/or perform other modifications such as consolidating freed storage) indicated by the locators in the keymap entry may be queued for later implementation.

Overview of Storage Service User Interface and Storage Model

Figure 3:
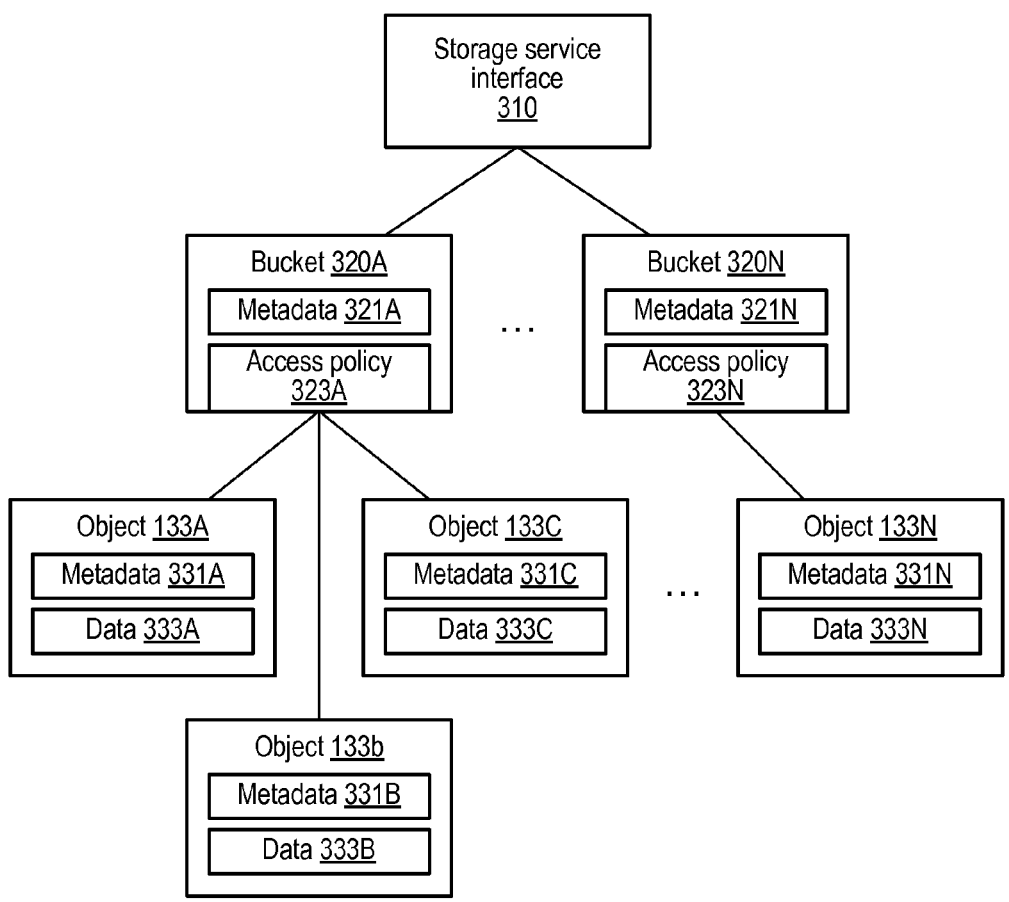
FIG. 3 illustrates an example of a storage model that may be supported by a storage service, according to at least some embodiments.

FIG. 3 illustrates an example of a storage model that may be supported by a storage service 102, according to at least some embodiments. In the illustrated model, storage service interface 310 is provided as a client- or user-facing interface to the storage service 102. According to the model presented to a user by programmatic interface 310, the storage service may be organized as an arbitrary number of top-level logical containers called buckets 320A-320N accessible via interface 310. Each bucket 320 may be configured to store an arbitrary number of objects 133A-N, which in turn may store data specified by a user of the storage service. In at least some embodiments, buckets may be further subdivided into lower-level containers, as described below in greater detail.

In some embodiments storage service interface 310 may be configured to support interaction between the storage service 102 and its users according to a web services model. For example, in one embodiment, interface 310 may be accessible by clients as a web services endpoint having a Uniform Resource Locator (URL), e.g., "http://<StorageServiceName>.<DomainName>.com", to which web services calls generated by service clients may be directed for processing. Generally speaking, a web service may refer to any type of computing service that is made available to a requesting client via a request interface that includes one or more Internet-based application layer data transport protocols, such as a version of the Hypertext Transport Protocol (HTTP) or another suitable protocol. Web services may be implemented in a variety of architectural styles in different embodiments, using a variety of enabling service protocols. For example, in a Representational State Transfer (REST)-style web services architecture, the parameters that are pertinent to a web services call (e.g., specifying the type of service requested, user credentials, user data to be operated on, etc.) may be specified as parameters to the data transport command that invokes the web services call to the web services endpoint, such as an HTTP GET or PUT command. In contrast to REST-style web services architectures, in some embodiments document-based or message-based web services architectures may be used. In such embodiments, the parameters and data pertinent to a web services call may be encoded as a document that may be transmitted to a web services endpoint and then decoded and acted upon by the endpoint. For example, a version of eXtensible Markup Language (XML) or another suitable markup language may be used to format the web services request document. In some embodiments, interface 310 may support interfaces other than web services interfaces, instead of or in addition to a web services interface. For example, a provider network may implement a storage service 102 for use by clients external to the enterprise, who may access the service via web services protocols, as well as users or components within the provider network, who may use a different type of interface (e.g., a proprietary interface customized for an intranet). In some such embodiments, the portion of interface 310 relating to client interaction (e.g., via web services protocols) may be bypassed by certain users or service components, such as deletion job generator 170 or deletion task dispatcher 170, that are internal to the storage service.

As shown in FIG. 3, interface 310 provides storage service users with access to buckets 320. Generally speaking, a bucket 320 may function as the root of an object namespace that is associated with a user of the storage service. For example, a bucket 320 may be analogous to a file system directory or folder. In some embodiments, individual buckets 320 may also form the basis for accounting for usage of the storage service. For example, a particular client user may be associated with one or more buckets 320 for billing purposes, and that user may be billed for usage of storage resources (e.g., storage of objects 133) that hierarchically reside within the namespace established by those buckets 320.

In the illustrated embodiment, each of buckets 320A-N includes associated metadata 321A-N as well as a respective access policy 323A-N. Generally speaking, metadata 321 may include any suitable metadata that may be used to describe aspects or properties of a given bucket 320. For example, metadata 321 may include information identifying the date of a bucket's creation, the identity of its creator, whether the bucket has any objects 133 associated with it, or other suitable information. In some embodiments, metadata 321 may include information indicative of usage characteristics of a bucket 320, such as the total size of objects 133 associated with bucket 320, access history of users with respect to bucket 320 and/or its associated objects 133, billing history associated with bucket 320, or any other suitable information related to current or historical usage of bucket 320. In one embodiment, each bucket 320 may be associated with a respective unique identifier, which may be specified by a user or automatically assigned by the storage service. The unique identifier may be stored within metadata 321 or as a separate property or field of bucket 320. In some embodiments, bucket metadata 321 may include an indication of one or more scheduled deletion policies to be applied to some or all of the storage objects of the bucket—for example, in embodiments in which the deletion policies are stored as objects in the storage service 102, object identifiers or keys of the deletion policy objects may be included in the bucket metadata. It is noted that in some embodiments, a given bucket 320 may not include explicit references, pointers or other information corresponding to the objects 133 associated with given bucket 320. Rather, as described in greater detail below, location and selection of objects 133 may be performed through the use of a separate metadata facility referred to as a keymap. An access policy 323 of a bucket 320 may include any information (such as credentials, roles or capabilities) needed to control access to objects 133 associated with the bucket.

In the illustrated embodiment, a given bucket 320 may be associated with one or more objects 133, each of which may include respective metadata 331 and data 333. Generally speaking, data 333 of an object 133 may correspond to any sequence of bits. The type of data represented by the bits stored within an object 133 may be transparent to the storage service 102. That is, the bits may represent text data, executable program code, audio, video or image data, or any other type of digital data, and the storage service may not necessarily distinguish among these various data types in storing and manipulating objects 133. Similar to metadata 321 associated with buckets 320, object metadata 331 may be configured to store any desired descriptive information about its corresponding object 133, including, for example, keymap-related metadata entries, conditional modification or deletion records with associated sequence numbers, creation or modification times, data types, usage history information and the like.

In one embodiment, individual objects 133 may be identified within the storage service using either of two distinct items of information: a key or a locator. Generally speaking, keys and locators may each include alphanumeric strings or other types of symbols that may be interpreted within the context of the namespace of the storage service as a whole, although keys and locators may be interpreted in different ways. In one embodiment, a key may be specified by a client at the time a corresponding object 133 is created within a particular bucket 320 (e.g., in response to a request by the client to store a new object). If no key is specified by the user, a key may be assigned to the new object 133 by the storage service. In such an embodiment, each respective key associated with objects 133 of a particular bucket 320 may be required to be unique within the namespace of that bucket 320. Generally speaking, a key may persist as a valid identifier through which a client may access a corresponding object 133 as long as the corresponding object exists within the storage service.

In one embodiment, a request by a client to access an object 133 identified by a key may be subjected to client authentication procedures, access control checks, and/or a mapping process (such as described in greater detail below) before the underlying data 333 of the requested object 133 is retrieved or modified. In contrast, the storage service may support an alternative method of accessing objects 133 by locators rather than keys. Generally speaking, a locator may represent a globally unique identifier of an object 133 among all objects 133 known to the storage service 102. That is, while a key may be unique to a namespace associated with a particular bucket 320, a locator may be unique within a global namespace of all objects 133 within all buckets 320. For example, a locator may include an alphanumeric string generated by the storage service to be unique among other locators. As described in greater detail below, in some embodiments, multiple instances of an object 133 may be replicated throughout the physical storage devices used to implement the storage service, for example to increase data redundancy and fault tolerance. In such embodiments, a unique locator may exist for each replicated instance of a given object 133. Further details regarding the use of locators in the context of keymap instances are also provided below.

Example Storage Service Architecture

Figure 4:
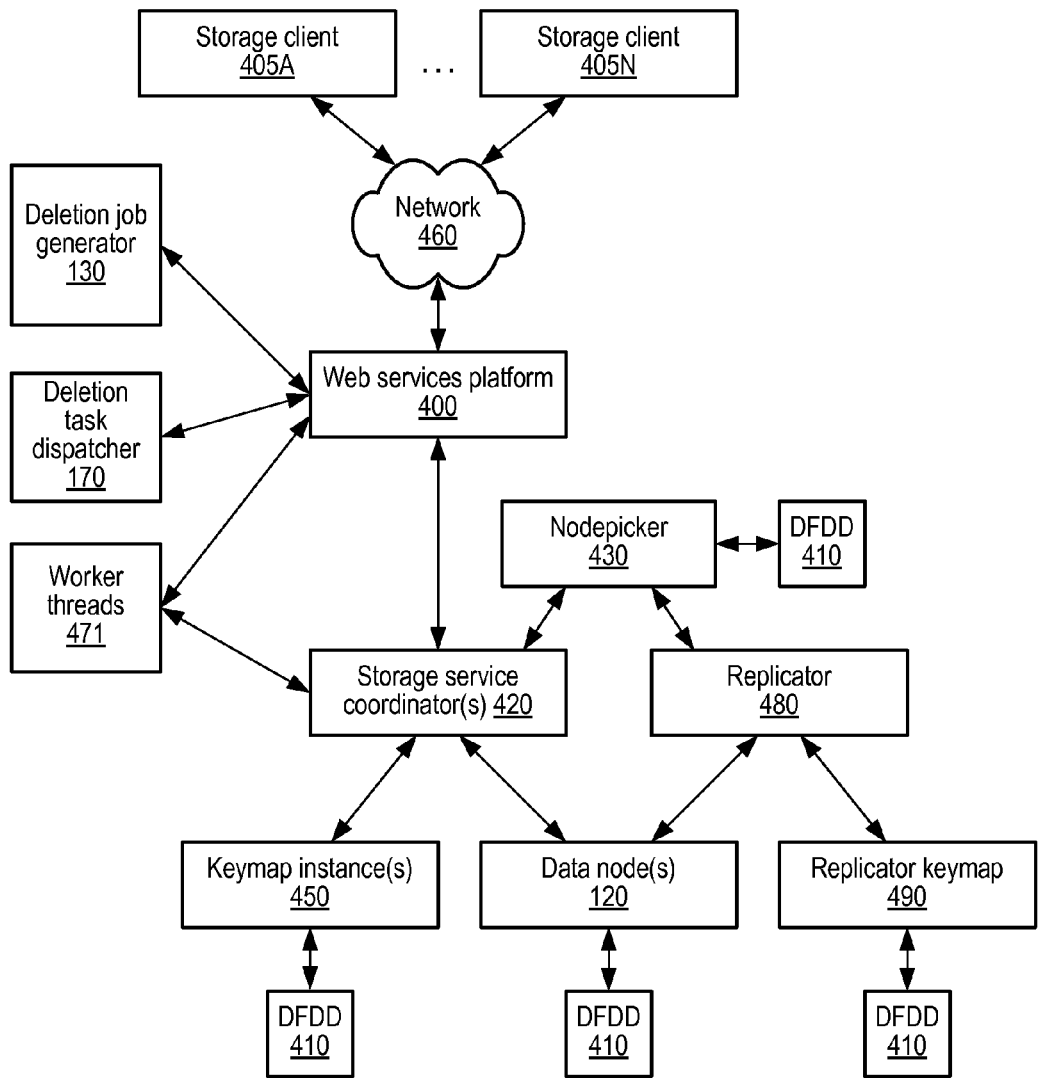
FIG. 4 illustrates an example of a storage service architecture, according to at least some embodiments.

FIG. 4 illustrates an example of an architecture of storage service 102, according to at least some embodiments. As shown, a number of storage clients 405A-N may be configured to interact with a web services platform 400 of a storage service 102 via a network 460. Web services platform 400 may be configured to interact with one or more instances of a storage service coordinator 420 (or simply, coordinator(s) 420). Storage service coordinators may interact with various components of the service 102 including deletion job generator 130, deletion task dispatcher 170, as well as keymap instances 450 and data nodes 120. Keymap instance(s) 450 may represent examples of the metadata nodes 110 of FIG. 1. Additionally, a replicator 480 may also be configured to interact with data nodes 120 as well as a replicator keymap instance 490. Coordinator(s) 420 and/or replicator 480 may interact with a nodepicker service 430. In the illustrated embodiment, each instance of nodepicker 430, keymap 450, data nodes 120 and the replicator keymap 490 may be associated with a respective instance of a discovery and failure detection daemon (DFDD) 410. DFDDs 410 may be responsible for keeping track, e.g., using periodic heartbeat messages or other mechanisms, of the state of the other components (e.g., whether a given node is responsive or unresponsive) and distributing such state information within the storage service as needed. It is noted that where one or more instances of a given component may exist, reference to that component below may be made in either the singular or the plural. However, usage of either form is not intended to preclude the other.

Storage clients 405 may encompass any type of client configurable to submit web services requests (such as the REST-style requests described above) to web services platform 400 via any suitable network 460 in the depicted embodiment. Web services platform 400 may be configured to implement one or more service endpoints configured to receive and process web services requests, such as requests to access or modify objects 133 stored by the storage service. For example, web services platform 400 may include hardware and/or software configured to implement the endpoint "http://<StorageServiceName>.<DomainName>.com", such that an HTTP-based web services request directed to that endpoint is properly received and processed. In one embodiment, web services platform 400 may be implemented as a server system configured to receive web services requests from clients 405 and to forward them to coordinator(s) 420 or to other components of the storage service for processing. In other embodiments, web services platform 400 may be configured as a number of distinct systems (e.g., in a cluster topology) implementing load balancing and other request management features configured to dynamically manage large-scale web services request processing loads.

Coordinators 420 may be configured to coordinate activity between web services platform 400 and other components of the storage service. In one embodiment, the primary responsibilities of coordinators 420 may include conducting read and write activity of object data 333 and metadata 331 for objects 133 in response to web services requests directed to those objects. For example, object read access may involve performing an access to a keymap instance 450 to retrieve locators that indicate the data nodes 120 where replicas of a given object 133 are stored, followed by performing an access to a particular data node 120 in order to read the requested data. Similarly, object creation or modification may involve storing a number of replicas of objects 133 to various data nodes 120 and updating keymap instance 450, if necessary, to reflect the locators of the created or modified replicas.

In some embodiments, coordinators 420 may be configured to perform these read and write operations to keymap instances 450 and data nodes 120. However, it is noted that in certain embodiments, coordinators 420 may not operate to create the full number of desired replicas of an object 133 at the time of its creation or modification. In some embodiments a write operation to an object 133 may be considered complete when coordinators 420 have completed writing a certain number of replicas of that object 133 (e.g., two replicas). Further replication of that object 133 may be completed as an out-of-band or asynchronous operation by replicator 480. That is, in such embodiments, the in-band or synchronous portion of the object creation or modification operation may include the generation of fewer than the total desired number of replicas of the affected object 133. It is noted that while coordinator 420 is illustrated as a distinct component from keymap instances 450, data nodes 120, and other system components, it is possible in some embodiments for an instance of coordinator 420 to be implemented together with another storage service component (e.g., as software components executable by a single computer system), including for example a deletion job generator 130 and/or a deletion task dispatcher 170. Thus, although the description herein may refer to coordinator 420 storing or retrieving data to or from a data node 120, a keymap instance 450, or another component, it is understood that in some embodiments such processing may occur within shared computing system resources. In the embodiment depicted in FIG. 4, deletion job generator 130, deletion task dispatcher 170, and worker threads 471 that may be assigned by deletion task dispatcher 170 to perform scheduled deletion operations may be configured to interact with one or more of the other components of the storage service to implement scheduled deletion policies. In some embodiments, the deletion job generator, the deletion task dispatcher, and/or the worker threads may use the same kinds of programmatic interfaces that are supported for external clients by web services platform 400 for at least some operations associated with scheduled deletes. In one embodiment, some or all of the components responsible for scheduled deletion operations may communicate directly with coordinators 420, or may interact directly with keymap instances 450 and/or data nodes 120 to accomplish at least some of their functions using internal interfaces that may not be available to external clients 405. Some components (such as worker threads 471) involved in scheduled deletions may use more than one type of interface—e.g., they may use the client-facing interfaces for some subset of their operations, and use internal or back-end interfaces for other operations. In at least some embodiments, the types of storage service operations requested by deletion job generator 130, deletion task dispatcher 170, or worker threads 471 from resource pool(s) 180 may be semantically and/or syntactically similar to the types of operations requested by clients 405A-405N. Accordingly, the deletion job generator 130, the task dispatcher 170, and the worker threads 471 may be termed "internal clients" of storage service 102, while clients 405A-405N may be termed "external clients" of the service.

As mentioned above, instances of objects 133 may be replicated across different data nodes 120, for example to increase the likelihood that object data will survive the failure of any given node 120 or its related infrastructure. Object replication within the storage service presents several opportunities for management and optimization that may be addressed in the illustrated embodiment by nodepicker 430 and replicator 480, as follows.

When coordinator 420 receives a request to write an object 133, it may correspondingly write object 133 to a given number of data nodes 120 before declaring the write to be complete. However, the number and particular selection of nodes 120 to which object 133 should be written may vary depending on a number of different storage policy considerations. For example, requiring that a certain minimum number of replicas (e.g., two or three) of object 133 have been successfully written before the write operation is considered to be completed may be prudent in order for the written data to be durable in view of possible failures. However, it may also be desirable to ensure that the data nodes 120 chosen to store the minimum number of replicas are distributed among different possible loci of failure. For example, data nodes 120 that are located in the same data center may be more likely to fail concurrently (e.g., due to a catastrophic failure such as a natural disaster, power failure, etc.) than nodes that are geographically separated. Nodepicker 430, which may be referred to generically as storage node selection logic, may be configured as a service accessible by coordinator 420 and replicator 480 that, in one embodiment, may implement algorithms for selecting data nodes 120 for object read and write operations (including operations for scheduled deletions, initiated for example by worker threads 471 on behalf of the deletion task dispatcher) such that various storage policies are satisfied. For example, in the case of writing/deleting an object 133, nodepicker 430 may operate to develop a write plan, or a particular sequence of data nodes 120 to which the object 133 should be written, or from which the object 133 should be deleted. In developing a particular plan, nodepicker 430 may be configured to ensure that the plan has a reasonable chance of succeeding—for example, that the data nodes 120 specified in the write plan are in fact operational and are expected to have sufficient storage resources available to accept the object 133—and that the write plan, if completed, would satisfy all storage policies pertinent to write operations. Write storage policies taken into account by the nodepicker may include a durability policy (e.g., if the write plan successfully completes, instances of object 133 will be stored on at least N different data nodes), a locality policy (e.g., if possible, the write plan will give preference (e.g., in number) to data nodes 120 in an area local to the requesting coordinator 420), a load balancing policy (e.g., attempt to equalize write request traffic among nodes 120), and so on. In some embodiments, nodepicker 430 may also assist coordinators 420 in reading objects 133, e.g., by identifying the node 120 that may offer the best read performance available to the reading coordinator 420. To develop write plans and to advise coordinators 420 with respect to object read operations, nodepicker 430 may be configured to monitor the state of nodes 120, e.g., with respect to their operational status and available resources. In one embodiment, nodepicker 430 may be configured to interact with an instance of DFDD 110 in order to identify the nodes 120 within the storage service that are currently operational.

As mentioned above, the reliability and availability of object data may be increased by replicating objects 133 throughout the storage service. For example, distributing instances or replicas of objects 133 within a geographically-dispersed system may improve the performance of similarly-dispersed clients 405 that attempt to access such objects 133 by possibly locating some object instances closer to such clients. (It is noted that in the context of object replication, the terms "instance" and "replica" may be used interchangeably herein.) Further, object replication may generally decrease the chances of data loss resulting from destruction of a particular object instance. However, it may be the case in some embodiments that at a given point in time, the number of valid replicas of an object 133 may be less than a desired or target number of replicas. For example, a replication storage policy to be enforced across the storage service may specify that a particular target number of replicas of each object 133 (e.g., 3 or any other suitable number) should exist at any given time. However, for a given object 133, the actual number of valid replicas might be less than the target number, for a variety of reasons. For example, a previously valid replica may become inaccessible due to a failure of the device on which it was stored. Alternatively, in some embodiments the number of instances of an object 133 that are written by a coordinator 420 may be less than the target number of replicas for that object 133. For example, as described above, the instances may be written according to a write plan specified by nodepicker 430, which may take into account a durability policy that requires fewer instances than the target number.

In one embodiment, replicator 480 may operate to examine objects 133 to determine whether the number of valid replicas of each object satisfies a target number (e.g., whether the number of replicas is at least the target number at the time the determination is made). Specifically, in one embodiment, replicator 480 may be configured to continuously iterate over records specifying the number and location of instances of each object 133. For example, replicator 480 may reference the replicator keymap 490, which, like keymap instances 450 described in greater detail below, may be configured to store mappings between object keys and corresponding locators identifying replicated object instances. (In other embodiments, replicator 480 may consult one of keymap instances 450 rather than a dedicated instance of the keymap.) In some embodiments, it is contemplated that multiple instances of replicator 480 may be configured to concurrently examine different portions of the keymap space, which may reduce the overall amount of time required to examine the status of all objects 133 managed by the storage service. If replicator 480 determines that the target number of valid replicas is not satisfied for a given object 133, it may be configured to write additional replicas of the given object 133, in a manner similar to coordinator 420 performing a write operation to the given object 133. In some embodiments, replicator 480 or an analogous component of storage service 102 may also be configured to ensure that, in response to a scheduled deletion operation or a client-requested immediate deletion operation, all the replicas of a storage object are eventually deleted, even if only a subset of replicas is deleted initially by a coordinator 420.

As mentioned above, the overall reliability of storage of an object 133 may be increased by storing replicas of object data, for example within different areas or data centers. However, it is noted that in some embodiments, each replica need not correspond to an exact copy of the object data. In one embodiment, an object 133 may be divided into a number of portions or "shards" according to a redundant encoding scheme (such as a parity, error correction code or other scheme), such that the object data may be recreated from fewer than all of the generated portions. For example, using various schemes to generate N portions from an object 133, the object data may be recreated from any N–1 of the portions, any simple majority of the N portions, or other combinations of portions according to the encoding scheme. In such an embodiment, the replicas of object 133 may correspond to the generated portions, or certain combinations of the portions. Such an approach may provide effective fault tolerance while reducing data storage requirements in comparison to storing multiple complete copies of the object data. It is noted that in some embodiments, certain objects 133 need not be stored with any degree of replication or fault tolerance at all. For example, a client may request that an object 133 be stored with minimal fault tolerance, possibly at lower cost than for a higher degree of fault tolerance.

Generally speaking, keymap instances 450 may provide records of the relationships between keys of objects 133 and locators of particular instances or replicas of objects 133. In storing such records, keymap instances 450 also reflect the degree to which objects 133 are replicated within the storage service (e.g., how many instances of an object 133 exist, and how they may be referenced). Data nodes 120 may generally provide storage for individual instances of objects 133 as identified by locators. However, a given data node 120 may be unaware of the state of an instance with respect to any other data nodes 120, or of the relationship between an instance's locator and the key of its corresponding object 133. That is, generally speaking, the state information maintained by keymap instances 450 may be transparent to data nodes 120. In the depicted embodiments, DFDD instances 410 may operate to detect and communicate state information regarding the operational status of data nodes 120 and/or keymap instances 450 (and replicator keymap 490, if implemented), such that clients of DFDD 410 such as coordinators 420 and replicator 480 may obtain an accurate, though possibly delayed view of the detected status. It is noted that although the various components of the storage service illustrated in FIG. 4 are shown as distinct entities, in at least some embodiments some or all of the illustrated components may be implemented at a single computer server and/or as respective modules of a single software program. In some embodiments, multiple instances of deletion job generator 130 and/or deletion task scheduler 170 may be implemented.

Keymap Entries

Figure 5:
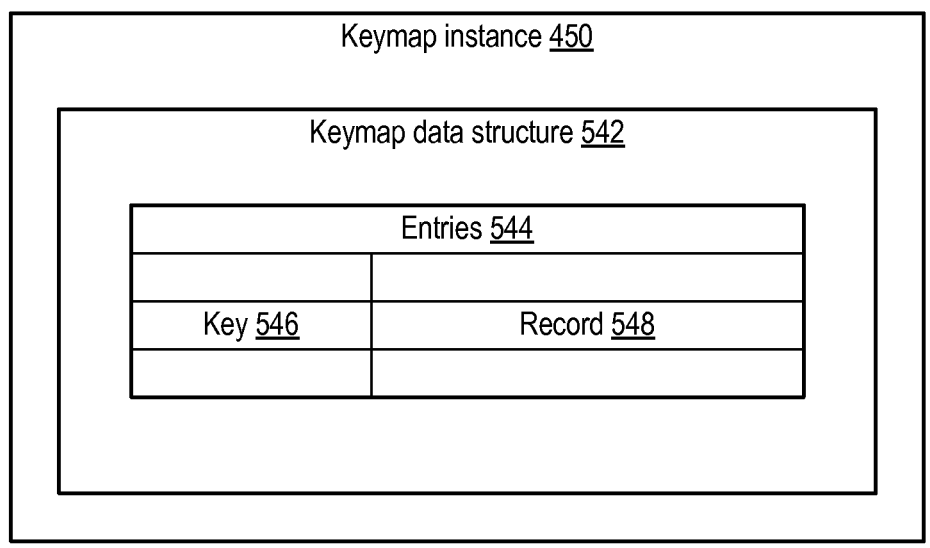
FIG. 5 is a block diagram illustrating a set of keymap instance data structures, according to at least some embodiments.

In one embodiment, a given keymap instance 450 may be configured to store details of relationships between various keys and associated locators within one or more tables or any other suitable type of data structure. FIG. 5 is a block diagram illustrating a set of keymap instance data structures, according to at least some embodiments. As shown in FIG. 5, a keymap instance 450 may include a keymap data structure 542 having a number of entries 544. Each entry includes a respective key 546 as well as an associated record 548. Record 548 may generally include the locator(s) corresponding to a given key 544, but may include other information as well. For example, one embodiment of record 548 may be structured as follows:

```
struct KeyRecord{
    int16_t version;
    int16_t storageClass;
    int64_t creationDate;
    int64_t objectSize;
    uint32_t crc32;
    int8_t numLocators;
    struct locator{
    int64_t nodeID;
    int64_t objectIndex;
    } replicas [ ];
}
```

While this example data structure is expressed using the syntax of the C programming language, it may be implemented using any suitable language, representation or format. Alternative embodiments of record 548 may include more, fewer or different fields than those shown. In some instances, record 548 may be referred to as an "inode," drawing on the similarity of purpose of record 548 in organizing a storage space to the inode structure employed in certain types of Unix file systems. However, the use of the term "inode" in the present context is not intended to invoke specific details of the implementation or use of inodes within file systems or other storage contexts. For fault tolerance and increased processing throughput for keymap client requests, multiple replicas of keymap data may be deployed in a distributed fashion within the storage service 102 in various embodiments.

In the above embodiment, record 548 includes seven particular elements. The 16-bit version element may be used to store a unique identifying value that is particular to the format of record 548. For example, different versions of record 548 may be used in different implementations of keymap instance 450, and in some embodiments the records 548 stored within a given keymap instance 450 may be heterogeneous. The version element may be used to distinguish between different versions of record 548 so that other elements of the record may be properly decoded and used.

The 16-bit storageClass element may be used to store an indication of the storage class of the object 133 corresponding to a record 548. Generally speaking, a given storage class of an object may identify storage characteristics and/or policies that may be common to other members of the given storage class, but may differ from members of other storage classes. For example, a "high reliability" storage class and a "low reliability" storage class may be defined for a given implementation of the storage service. Objects 133 that are members of the high reliability storage class may be replicated to a greater degree than objects 133 that are members of the low reliability storage class, thus decreasing the sensitivity to loss of an individual replica, possibly in exchange for a higher usage cost than is assessed for members of the low reliability storage class. Numerous other possible types and combinations of storage classes are possible and contemplated.

The 64-bit creationDate element may be used to store an indication of the date and time the corresponding object 133 was created within the storage service. This element may be formatted in any suitable manner. For example, the date and time may be explicitly encoded as distinct fields within the element, or a single number representing the number of elapsed time units (e.g., seconds, milliseconds, etc.) since a common point of reference. In some embodiments, the creationDate element may include additional fields configured to indicate the date and time of last modification of any aspect of the corresponding object 133, although in other embodiments a last modification element may be included as a distinct element within record 548.

The 64-bit objectSize element may be used to store an indication of the size of the corresponding object, e.g., in bytes. In some embodiments, this element may reflect the size of both object data and metadata, while in other embodiments these may be stored as distinct fields. The 32-bit crc32 element may be used to store an indication of the Cyclic Redundancy Check (CRC) checksum computed for the object data and/or metadata according to any suitable checksum algorithm. For example, the checksum may be included to verify data integrity against corruption or tampering. In other embodiments, any suitable type of hash or signature computed from object data and/or metadata may be used in addition to or in place of the CRC checksum.

The 8-bit numLocators element may be used to store an indication of the number of locators included within record 548 within the replicas[ ] array. Within this array, each locator is stored as a 64-bit nodeID element as well as a 64-bit object index value, where the object index indicates a position of the object's data within a data node 120. In some embodiments, locators may be stored as single elements within the replicas[ ] array.

In one embodiment, keymap instance 450 may be configured to provide a keymap API to a keymap client, such as a coordinator 420, a deletion job generator 130, a deletion task dispatcher 170, or a worker thread 471 assigned to perform scheduled delete operations on keymap entries. For example, a controller 420 may be configured to use the API to store, retrieve, delete or perform other operations on records 548 associated with entries 544 managed by the keymap instance 450, in response to deletion task dispatcher 170, deletion job generator 130, or external clients 405. In one embodiment the keymap API may support put, get and delete operations on keymap entries 544. In one such embodiment, a keymap entry put operation, which may also be generically referred to as a keymap store operation or a keymap write operation, may specify the key 546 and record 548 to be stored within a keymap entry 544. In one embodiment, a put operation that specifies a key 546 for which an entry 544 already exists may replace the record 548 associated with the existing entry 544 with the record specified as an argument or parameter of the put operation. Upon completion on a given keymap instance 450, a keymap put operation may return to the requester a status indication, such as whether the operation succeeded or failed, and what type of failure occurred (if any), for example.

A keymap entry get operation, which may also be generically referred to as a keymap read or retrieval operation, may in one embodiment specify a key as a parameter. Upon completion, a keymap get operation may return to the requesting client the record 548 of the keymap entry 544 associated with the requested key, if such an entry exists. If no corresponding entry 544 exists, an indication to that effect may be returned to the requesting client.

In one embodiment, a keymap entry delete operation (e.g., a delete operation issued by a worker thread 471 implementing scheduled deletes on behalf of a deletion task dispatcher as described below) may be configured to operate similarly to a put operation, except that the requester need not specify a record to write to the entry. Upon completion on a given keymap instance 450, a keymap delete operation may return to the requesting client a status indication similar to that of the keymap put operation. The keymap API may also support other types of operations in various embodiments, such as list operations or count operations.

In some circumstances, different keymap clients may seek to modify the same keymap entry 544. For example, in response to various client- or system-driven operations, two different coordinators 420 may attempt to concurrently change the contents of a given record 548 (e.g., to add, delete or modify locators of replicas), or one may attempt to modify a record 548 while another attempts to delete the corresponding entry 544. In order to provide a consistent method for resolving concurrent requests to a given keymap entry 544, in one embodiment the keymap API may require that at least those keymap operations that update or modify keymap state (e.g., keymap put and delete operations) have an associated sequence number. In some embodiments a sequence number generator component of the storage service 102 may automatically generate a sequence number for each modification operation. The sequence number generator may be implemented, for example, as a service accessible to various external clients 405 and/or internal clients such as deletion task dispatchers 170 or worker threads 471. A web service request addressed to a particular URL supported by the storage service 102 may be used to obtain a sequence number in some embodiments. The sequence number may for example be based on a timestamp (based on either a local clock at one of the clients or service nodes, or on a global clock maintained by the service) in some implementations. For example, a 64-bit number or a 128-bit number may be used as a sequence number in some implementations, with some bits of each sequence number being set to the number of seconds or milliseconds since a reference point in time (e.g., Jan. 1, 1970 at midnight, Greenwich Mean Time, a reference time employed by many versions of Unix and Linux), and other bits being generated at random. In at least some embodiments, the sequence number generator may ensure that any two sequence numbers generated on behalf of clients 405 (i.e. clients that are not components of the storage service 102) must differ by at least a minimum quantity, while components of the storage service may be able to obtain and use sequence numbers that do not have such a minimum-difference property enforced. As described below in further detail, in at least some embodiments, conditional delete operations may be implemented using such properties of sequence numbers.

Keymap instance 450 may then be configured to resolve conflicting updates to an entry 544 by comparing the sequence numbers (e.g., numerically or lexicographically) and consistently picking one of the operations on the basis of the comparison (e.g., the operation with the highest sequence number among a conflicting set of update operations may supersede operations with lower sequence numbers). In at least some embodiments, the provided sequence number may be stored in the modified keymap entry 544 along with the modified record 548 for synchronization recovery, as described in greater detail below. For example, in some embodiments, a record of a conditional deletion operation for a given key 546, with a deletion sequence number obtained using a technique described below in further detail with respect to FIG. 20 and FIG. 21, may be stored in a keymap entry 544. Provided the resolution of the sequence number is high, the chance of collision among different sequence numbers provided by different keymap clients for the same keymap entry 544 may be low. However, if a collision were to occur, keymap instance 450 may be configured to resolve the collision using any suitable, consistent technique.

Keymap Scalability

Figure 6:
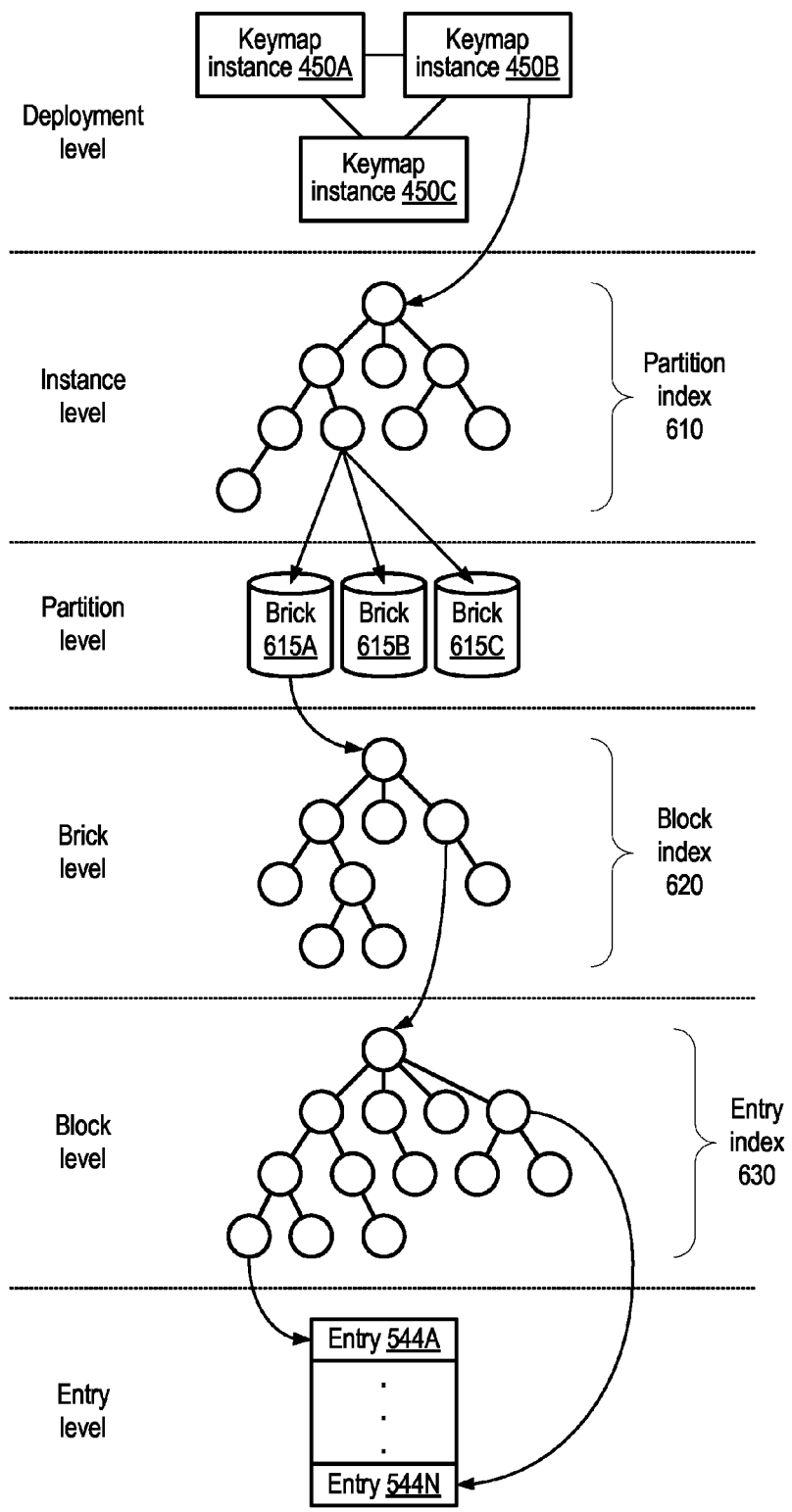
FIG. 6 illustrates a keymap hierarchy that may be implemented according to at least some embodiments.

The storage service 102 may have to support a large number of objects 133 (e.g., millions or billions of objects 133 totaling terabytes or petabytes of storage, or beyond) on behalf of a large number of clients in some embodiments. Accordingly, the implementation of the keymap entries may be required to scale correspondingly in capacity. Scalability of keymap functionality may be improved in some environments by introducing levels of hierarchy within keymap instances 450. FIG. 6 illustrates a keymap hierarchy that may be implemented according to at least some embodiments. Five levels of an example hierarchy are shown—the deployment level, the partition level, the brick level, the block level, and the entry level.

A keymap deployment may comprise a number of keymap instances 450 (e.g., 450A, 450B and 450C) collectively capable of managing keymap entries for a plurality of clients with a plurality of buckets. In at least some embodiments, the keymap instances of a given deployment may be configured to exchange keymap information in accordance with a synchronization or reconciliation protocol to propagate updates and resolve any update conflicts. Each keymap instance 450 of a deployment may be implemented using one or more computer hosts or servers in one embodiment. In at least some embodiments, some hosts of a keymap instance may be located at a different data center than other hosts of the same keymap instance. A given computer system or host being used for a keymap instance may support other components of the storage service in some embodiments, e.g., several of the components shown in FIG. 4 (including for example both a keymap instance 450 and a data node 120) may be incorporated within the same server.

The set of keymap entries of buckets managed by a given keymap instance 450 may be divided into logical containers called partitions in some embodiments, with a partition index being generated, as shown in FIG. 6. Partition boundaries may be determined based on, for example, a limit on the number of keys that can be included per partition. With a partition size limit of 1,000,000 objects, for example, and alphanumeric keys being used, the keys of a given keymap instances may be arranged in lexicographical order, with the first million being placed in the first partition, the second million in the second partition, and so on. Other approaches may be used to partitioning keymap entries in other embodiments. Partitions may be further subdivided into containers called bricks (e.g., bricks 615A, 615B or 615C), and bricks into blocks, with each block comprising a respective number of keymap entries 544, and appropriate indexes being set up at each level of the hierarchy as shown in FIG. 6. In at least some embodiments, a type of data structure called a stratified unbalanced tree (or trie) may be used for indexing at one or more levels of the hierarchy. Each keymap entry 544 may include a respective key 546, and a record 548 that may include a modification sequence number for a corresponding storage object modification operation in at least some embodiments.

Some of the hierarchical layers in the embodiment of FIG. 6 may be configured to provide redundancy (e.g., the keymap instances 450 within the deployment level may be replicated, or bricks 615 may be replicated at the partition level) while other layers may be configured to provide scalability. For example, the distribution of indexing across multiple distinct levels (e.g., partition index 610, block index 620 and entry index 630) may facilitate scaling of the data structure by allowing each portion of the index to grow in a manageable way as the number of entries 544 to be indexed within the keymap deployment increases. In other embodiments, more or fewer levels of hierarchy as well as different combinations of redundant and non-redundant levels may be employed.

Figure 7:
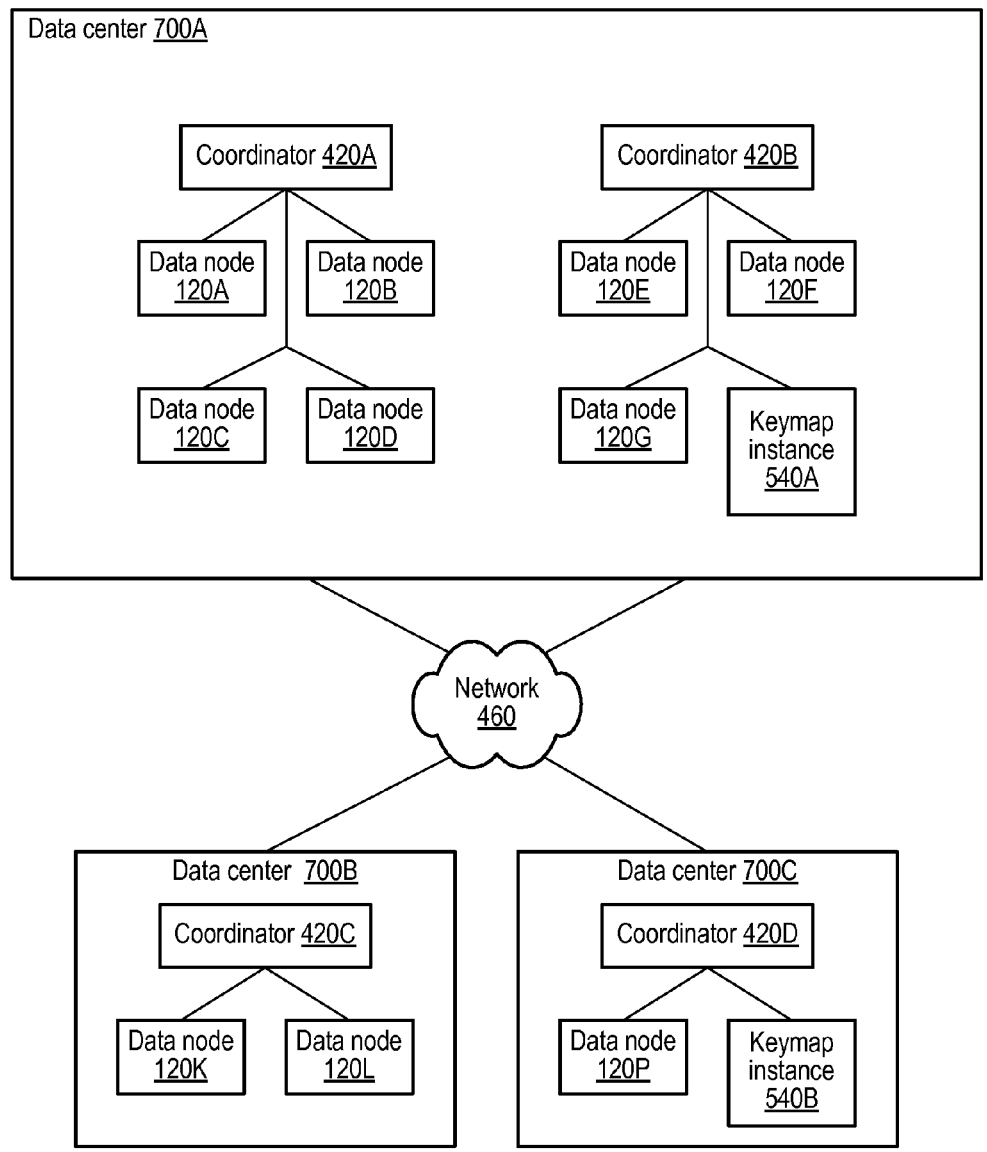
FIG. 7 illustrates an example of a physical deployment of components of a storage service across multiple data centers, according to at least some embodiments.

FIG. 7 illustrates an example of a physical deployment of components of a storage service 102 across multiple data centers 700, according to at least some embodiments. Three data centers 700A, 700B and 700C are shown. Each data center may include some combination of the components of the storage service 102 illustrated in FIG. 4. Data center 700A comprises two coordinator nodes 420A and 420B, with each coordinator configured to interact with a set of data nodes 120 and/or metadata nodes 110 such as keymap instances 450. Some data centers, such as data center 700B may include data nodes but may not have any keymap instance nodes; other data centers, such as 700A and 700C may have both keymap instances and data nodes, while other data centers may have only keymap nodes. Some data centers may not even include coordinator nodes in one embodiment, and a remote coordinator node at another data center may be enabled to initiate storage service operations at such a data center in such an embodiment. In general, an arbitrary distribution or mapping of the components to data centers, and to hosts or servers within the data centers, may be permissible in at least some embodiments. The various components of the storage service may communicate via network 460 as needed across data center boundaries, e.g., to resolve update conflicts, increase or decrease replication levels of storage objects 133, move data or metadata from one data center to another, or to perform various types of storage management operations.

Synchronization Protocols

Keymap entries may be replicated in some embodiments at one or more levels of the kinds of keymap hierarchies shown in FIG. 6, and/or at various nodes and physical locations in distributed physical deployments of the kind shown in FIG. 7. Any of a number of techniques for replica synchronization or conflict resolution may be implemented in such embodiments. In one embodiment, synchronization of replicas may be performed using a suitable version of a quorum protocol. Generally speaking, an update or modification of replicas of keymap data (including keymap entry put and delete operations) performed according to a quorum protocol may be deemed complete with respect to a requesting client when the modification has been durably (e.g., completely and persistently) performed with respect to at least a quorum number of replicas. Similarly, a keymap entry get operation performed according to a quorum protocol may be deemed complete when the same data has been read from at least a quorum number of replicas. In some embodiments, the quorum number may be defined as a simple majority of the number of replicas present, while in other embodiments arbitrary degrees of supermajority may be employed. It is noted that a quorum protocol operation may fail to complete if the quorum requirement is not met. However, if the quorum number of replicas is smaller than the total number of replicas, the probability of a given quorum protocol operation failing may be less than that of an atomic protocol operation, which effectively requires a consensus among replicas rather than a quorum. It is noted that quorum protocols other than the one described herein may be employed by keymap instances 450 in some embodiments. For example, a multi-phase commit protocol such as Paxos or two-phase commit may be employed to implement quorum-type keymap semantics.

In the course of normal operation of read and update operations according to a quorum protocol, it is possible for an update to fail to be propagated to every replica, for example due to communication failures or failure of resources underlying a replica. In one embodiment, disagreement among replicas may be detected and repaired during a read operation. Specifically, if different values are detected among different replicas of a particular entry 544 during a keymap entry get operation, a keymap put operation may be generated to reconcile the difference. In one embodiment, the entry 544 used as the basis for the put operation may be the entry with the most recent (e.g., numerically or lexicographically highest) associated sequence number or timestamp among the different values read. Thus, discrepancies among replicas may be resolved "on the fly," e.g., as keymap entry get operations are processed, without requiring a distinct process or operation to repair the discrepancies.

Strong consistency protocols such as the above-described quorum protocols or atomic protocols may be employed when updating replicas to effectively prevent clients from observing replica inconsistency or to prevent such inconsistency from arising at all. However, in a distributed context where access latency of different replicas may vary, sometimes considerably, strong consistency protocols may have a high performance cost. For example, for an atomic or quorum protocol, the time required for operation completion may be a function of the time required to complete the operation with respect to the slowest of all the replicas or of the quorum number of replicas, respectively. In addition, depending on the locality and temporal sequence of storage service operations, the likelihood of an inconsistency being encountered by a given internal or external client may not be very high in at least some embodiments.

Figure 8A:
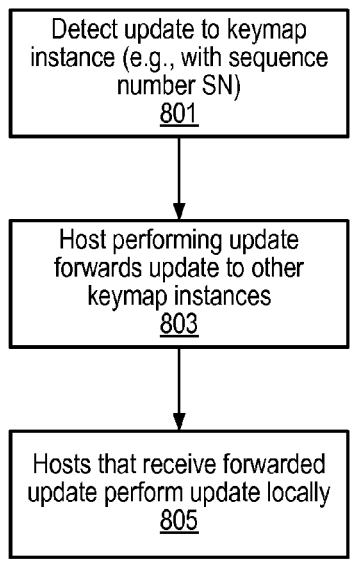
FIG. 8A is a flow diagram illustrating aspects of update propagation operations that may be implemented in at least some embodiments.
Figure 8B:
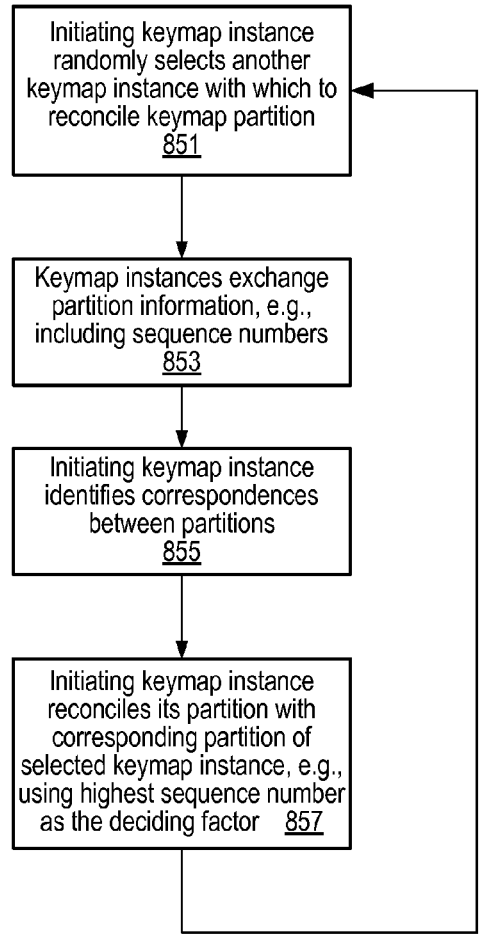
FIG. 8B is a flow diagram illustrating aspects of reconciliation operations that may be implemented in at least some embodiments.

In some embodiments keymap instances 450 may accordingly employ a relaxed synchronization protocol that strives to converge keymap instances 450 to a consistent state, but which may allow some degree of inconsistency among keymap instances 450 at any given time. Such a synchronization protocol may provide better overall performance for the majority of internal or external clients for which stricter synchronization may be unnecessary. In some embodiments, relaxed synchronization protocols among keymap instances 450 may include a combination of different synchronization tasks that may independently carry out different aspects of the synchronization process. FIG. 8A is a flow diagram illustrating aspects of update propagation tasks that may be implemented as part of such a relaxed synchronization protocol according to at least some embodiments. FIG. 8B is a flow diagram illustrating aspects of reconciliation operations that may be implemented as part of the relaxed synchronization protocol in such an embodiment.

As shown in element 801 of FIG. 8A, an update to one of keymap instances 450 may be detected with a particular sequence number SN. For example, a keymap instance 450 may receive and complete a keymap entry put or delete operation according to a quorum protocol as described above. The keymap instance 450 that processed the keymap update may then forward the update operation to each other keymap instance 450 provisioned within the storage service (element 803). For example, if keymap instance 450A processed a keymap entry put operation, it may forward the operation including arguments, parameters, sequence number, etc. to keymap instances 450B and 450C. In one embodiment, the forwarding may be performed without verification or acknowledgement. Any suitable forwarding strategy may be used in various embodiments, such as concurrent broadcast from the originating keymap instance 450 to multiple other instances, sequential forwarding from the originating keymap instance to other instances, tree-based strategies, etc.

Those keymap instances that receive the forwarded operation may perform the update operation locally (block 805). For example, if keymap instance 450B successfully receives a keymap entry put operation forwarded from instance 450A, it may perform the operation as if it had received the operation from any internal or external keymap client. If the put operation successfully completes, keymap instances 450A and 450B may be synchronized with respect to the put operation.

Generally speaking, it may be expected that forwarding keymap update operations as illustrated in FIG. 8A will succeed a majority of the time. Therefore, minimizing the overhead involved in forwarding such operations may decrease the time and/or bandwidth required to achieve synchronization among keymap instances 450 in a majority of cases. For example, eliminating acknowledgement responses or other types of protocol verification or handshaking from the forwarding process may free communications bandwidth for other uses, such as to support a larger scale of keymap implementation involving a greater degree of synchronization traffic. In many instances, the time required to propagate keymap updates throughout a keymap deployment (which may generally correspond to the window of potential inconsistency of replicas of a given keymap entry 544) may be limited to the communication latency required to forward the operation to associated keymap instances and the processing latency required for the instances to apply the forwarded operation. Frequently, this total time may be on the order of seconds or fractions of seconds.

In some cases, however, forwarding of keymap update operations among keymap instances 450 may fail. For example, a communication link failure may render one host or server on which a keymap instance is implemented unreachable from another, or may cause a forwarded operation to be lost, truncated or otherwise damaged in transit. Alternatively, a destination host may fail to receive or correctly process a properly forwarded update operation, for example due to transient hardware or software issues. If, as in one embodiment, no attempt is made on the part of an originating keymap instance to verify or assure that forwarded keymap update operations are successfully received and processed, forwarding failure of individual operations may result in inconsistency among keymap instances 450 with respect to certain entries 544.

Accordingly, in at least one embodiment a relaxed synchronization protocol among keymap instances 450 may include an anti-entropy or reconciliation task shown in FIG. 8B. This task may be referred to as an "anti-entropy" task in that generally, operation of the task may serve to reduce differences and increase similarities among different keymap instances 450, thus decreasing the overall entropy among keymap instances 450 that may be introduced by random or systemic failure of update propagation to properly synchronize instances. In the illustrated embodiment, as shown in element 851, an initiating keymap instance 450 may randomly select another keymap instance with which to perform a reconciliation of a particular partition, which as described above may include a number of replicated bricks 615 which may be resident on different hosts or servers.

The initiating keymap instance 450 may then exchange information about one or more partitions with the selected keymap instance (element 853). For example, copies of the partition index 610 maintained within each instance (which may include sequence numbers for various modification operations of objects 133 included in the partitions) may be exchanged. The exchanged partition indexes may in turn identify those bricks 615 that are defined within each instance. Based on the exchanged partition information, the initiating keymap instance 450 may then identify correspondences between partitions in the two instances (element 855) and may reconcile each partition within the initiating keymap instance 450 with a corresponding partition within the selected keymap instance 450 (element 857), e.g., using the modification sequence numbers to resolve conflicts. For example, as described previously, each partition within a given keymap instance 450 may be replicated across a number of bricks 615. In one embodiment, the initiating keymap instance 450 may be configured to direct a particular brick 615 within a partition (which may be referred to as the "lead brick") to communicate with a corresponding or "peer" brick 615 of a corresponding partition within the selected keymap instance 450 in order to reconcile differences between the partitions. In one embodiment, reconciliation of two bricks 615 may involve the bricks exchanging information about differences in the keymap entries 544 included in each brick 615, and then propagating the most current information within each keymap instance 450. For example, if one brick 615A determines on the basis of sequence number or timestamp information that its version of an entry 544 is more current than that of a peer brick 615B, it may communicate the entry data to the peer brick 615B. Subsequently, the peer brick 615B may perform a keymap entry put operation (e.g., according to a quorum protocol as described in detail above) to update its copy of the entry 544.

Once partition reconciliation between the two keymap instances 450 has completed, operation may continue from element 851 where the reconciliation process is initiated again with respect to another random keymap instance 540. In various embodiments, each keymap instance 540 may be configured to perform this process at predetermined or dynamically determined intervals. For example, reconciliation may occur at a static rate of once per minute, or at intervals determined according to a random or other statistical probability distribution. In some embodiments, reconciliation may be performed after a certain number of keymap accesses have occurred, or after access to certain individual ones, types or groups of keymap entries has been detected.

The methods of update propagation and reconciliation or anti-entropy shown in FIGS. 8A-8B may operate in a complementary fashion. Under the majority of circumstances, update propagation may satisfactorily synchronize different keymap instances 450 within a deployment. In those instances where keymap inconsistencies arise due to the failure of update propagation, the anti-entropy task may generally operate to reconcile such inconsistencies. It is noted that in some embodiments, execution of the anti-entropy task may not guarantee that two keymap instances 450 are precisely synchronized in their entirety. However, in one embodiment the anti-entropy task may be implemented to guarantee that its operation will not increase the degree of inconsistency between two keymap instances 450. Thus, over repeated applications, the anti-entropy task may facilitate convergence of keymap instances 450. It is also noted that in at least some embodiments in which protocols reliant on modification sequence numbers are used to resolve update conflicts, it may be the case that the conflicts are resolved prior to reconciliation; e.g., the storage service may be able to compare two update records for the same key with different modification sequence numbers at the same node or replica, and reject the update with the lower sequence number, without having to wait for the reconciliation process to resolve the conflict. In some embodiments, reconciliation operations of the kind illustrated in FIG. 8B may not be implemented, but comparisons of modification sequence numbers may still be used to resolve update conflicts.

As indicated above, storage services with characteristics similar to those illustrated in FIG. 3-FIG. 8B may be configured in some embodiments to implement scheduled deletions of client-created objects, e.g., deletion operations that are initiated by internal components (such as worker threads 471 assigned by deletion task dispatcher 170) based on deletion policies or other criteria. Details of various aspects of scheduled deletion operations, e.g., in the context of the keymap-based storage service architecture described above, are provided below.

Interactions to Support Scheduled Deletions

Figure 9:
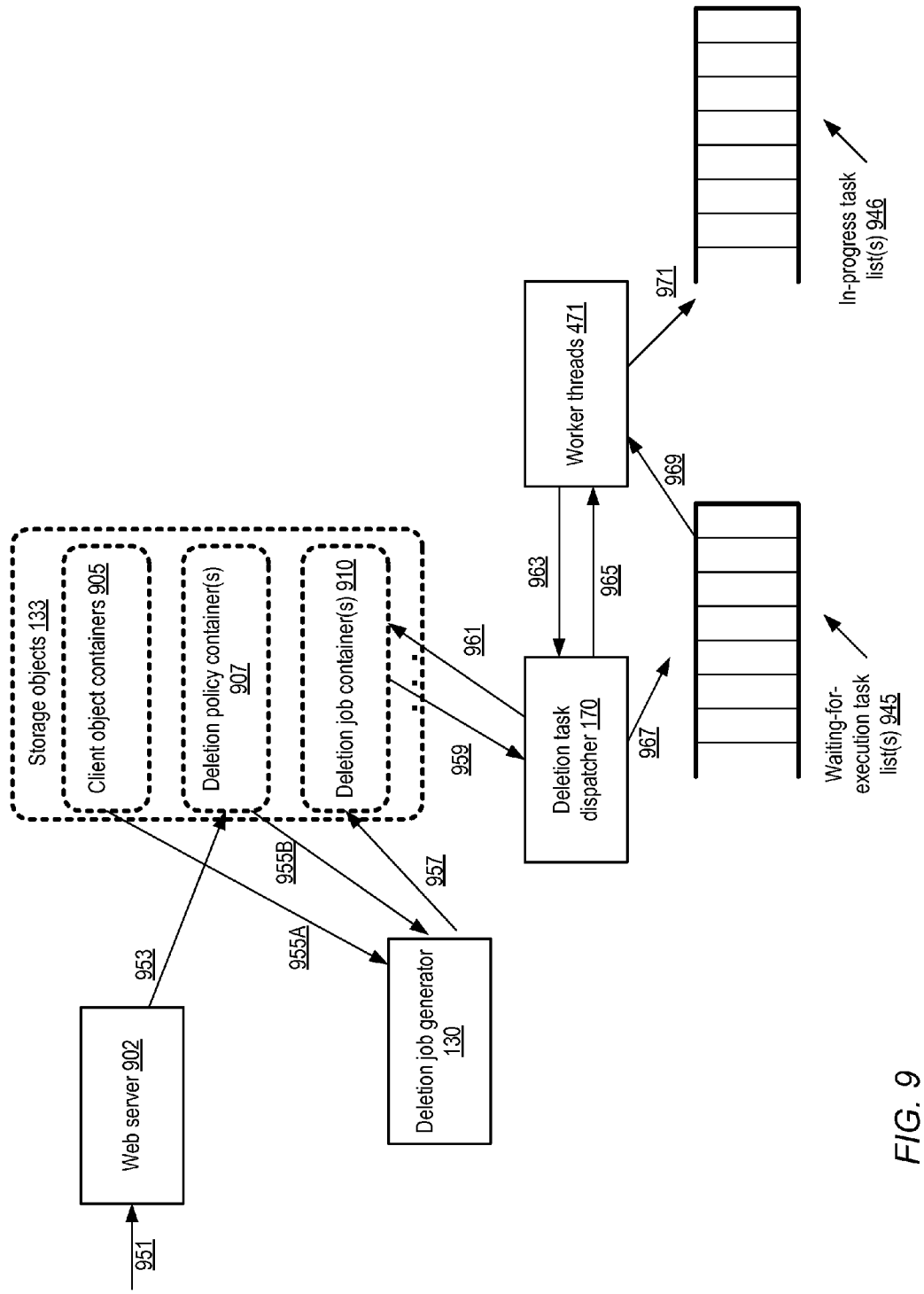
FIG. 9 illustrates interactions between storage service components configured to implement scheduled deletion operations, according to at least some embodiments.

FIG. 9 illustrates interactions between storage service components configured to implement scheduled deletion operations, according to at least some embodiments. In the depicted embodiment, storage service 102 may include several different logical containers to store objects involved in scheduled deletes. Client object containers 905 (such as buckets, or partitions or other lower-level containers within buckets) may be used to store client-created storage objects that may be deleted over time based on various deletion criteria. The deletion criteria themselves may be stored as first-class objects within the storage service (e.g., as objects which may generally be accessed using the same kinds of programmatic interfaces, such as the REST interfaces described earlier for reads, writes and deletes, that may be available for client-created objects), e.g., in deletion policy container(s) 907. In addition, deletion job objects 140 may be stored as first-class storage objects as well in some embodiments, e.g., in specially-named deletion job containers 910.

Several different types of storage service components may collectively be configured to implement delete operations based on the deletion policies. A web server component 902 may implement one or more programmatic interfaces enabling external clients 405 to specify or define deletion policies, as indicated by arrow 951. For example, one or more APIs (including for example REST APIs as described below with reference to FIG. 10) may be supported for deletion policy definitions in some embodiments. The policies received at the web server 902 may be validated, e.g., checked for syntactical correctness in accordance with a supported specification for deletion policies, and valid policies may be stored in deletion policy container(s) 907, as indicated by arrow 953.

One or more deletion job generators 130 may be configured to perform iterations of deletion candidate discovery, as indicated earlier. In at least one embodiment, deletion candidate discovery operations may be performed as part of a billing or accounting operation or iteration—e.g., the deletion job generator may be implemented as a module of an accounting component of the storage service. In such an embodiment, the accounting component may be configured to determine how much clients should be billed based on how many storage objects they have, how many I/O operations were performed and so forth, and the deletion candidate discovery iteration may be performed concurrently with, or as part of, a billing/accounting iteration. A deletion job generator may, during a given discovery iteration, read one or more deletion policy objects from container(s) 907 (arrow 955B), and then retrieve metadata (e.g., keys) associated with client-created objects (from client object containers 905) that are found to be eligible for deletion as per the policies (arrow 955A). Depending on the number of deletion-eligible candidates found, the deletion job generator(s) 130 may create a number of deletion job objects and store them in container(s) 910 (arrow 957). A deletion candidate discovery iteration may be initiated based on any combination of various factors in different embodiments—e.g., based on a predetermined schedule, based on performance or space utilization conditions in the storage service, based on a backlog of job objects with yet-to-be-deleted candidates, based on how long it took to complete previous iterations, and so on. For example, in one straightforward implementation, a deletion job generator may be configured to perform candidate discovery iterations once every 24 hours, so that an iteration may be started at, say, 2:00 AM every night. The number of deletion job objects that are created in a given iteration may depend on, for example, a maximum job size (i.e., a maximum number of deletion candidate objects that a given job is allowed to indicate), which may be tunable in some embodiments. For example, the overhead of job object storage, and/or the overhead of scheduling tasks to accomplish the desired deletions, may be among the factors considered when deciding how to distribute candidates among jobs in some embodiments.

In some embodiments, the names of the containers 910 in which jobs are stored may be determined using a priority-based naming scheme—e.g., a bucket name may include an indication of the priority of the objects indicated in the jobs of that bucket, relative to the priorities of other objects indicated in jobs of other buckets. In at least one implementation, the priority may be indicated by including a time indicator (e.g., a timestamp string indicating an object expiration time of at least one object in one job of the bucket) in the bucket's name and/or in the job name, such that it may be possible to sort deletion candidate objects based on their deletion priorities. In at least some embodiments, the storage service may enable clients to provide preferences regarding the priority of scheduled deletions of various objects—e.g., clients who consider it critical that an object be deleted within X minutes or hours of an expiration time may indicate a high priority P1, while other clients who may not consider the timeliness of the deletes as important may indicate a medium or low priority P2, and such priorities may also be indicated in the names of the buckets or jobs. In at least one embodiment, clients may be billed differently for higher-priority scheduled deletions than for lower-priority scheduled deletions.

Deletion task dispatchers 170 may also perform their functions in execution iterations separated by periods of sleep or dormancy in the depicted embodiment. Various factors may lead to the initiation of an execution iteration, such as a schedule, an indication that a threshold number of job objects are ready for execution, resource utilization or storage utilization levels of the service, and so on, in different embodiments. During a given execution iteration, a dispatcher 170 may examine some set of job objects in container(s) 910 (e.g., using the priority-based naming scheme to decide which jobs to examine first), as indicated by arrow 959. The dispatcher may reject certain job objects if they do not meet validity criteria in some embodiments—for example, jobs that were created more than X days ago may be rejected, on the assumption that any deletion candidates listed in those jobs would have been relisted by the deletion job generator 130 in a different, newer, job object. For a job object that is valid, the dispatcher may place one or more tasks on one or more waiting-for-execution task list(s) or queue(s) (arrow 967) in the depicted embodiment. The set of tasks listed or enqueued for a given job object (where the set of tasks may comprise just one task in one straightforward implementation, and more than one task in other implementations) may collectively contain indicators, such as keys, of all the candidate deletion objects of the job object. The mapping of deletion job objects to tasks (e.g., how many and which specific candidate objects should be included in a given task) may also be dynamically tuned or varied in some embodiments, depending on considerations such as resource availability, locality of the objects (e.g., objects that belong to the same brick or same partition may be placed in the same task in preference to other objects), etc. Tasks may be ordered within the waiting-for-execution list 945 using a variety of policies in different implementations, such as for example, being randomly positioned in the list, or being positioned in priority order.

One or more resources, such as worker threads 471, may be assigned for a job or for a set of jobs, as indicated by arrow 965. In some embodiments, the deletion task dispatcher may utilize a fairness policy (as described below in further detail) to assign resources to tasks, in an attempt to ensure that deletions of some clients' objects are not crowded out or delayed because other clients have large numbers of deletions pending. A worker thread may remove a task from a waiting-for-execution list or queue 945 (arrow 969), e.g., in first-in-first-out (FIFO) order or in some other order, and place it in an in-progress list or queue 946 (arrow 971) in the depicted embodiment. The worker thread may then initiate deletion operations (e.g., keymap entry deletion operations or other metadata deletion operations) for the objects in the task. In at least some embodiments, the worker threads may only be responsible for metadata deletion operations, with the storage space release operations for the objects being initiated asynchronously by other components such as coordinators 420. In other embodiments, worker threads may initiate both metadata deletions and storage space release operations. Worker threads may report the status of the deletion operations (e.g., whether the deletion succeeded or failed) to deletion task dispatcher 170 (arrow 963) in some embodiments. In some embodiments, the dispatcher 170 may periodically check the status of various deletion operations, e.g., by pinging or communicating with the worker threads.

Tasks that are completed successfully (i.e., if the metadata deletion operations indicated in the task are initiated without errors) may be discarded; tasks that did not succeed within a threshold amount of time may be placed back in the waiting-for-execution task lists in some embodiments, e.g., by the deletion task dispatcher 170 or by worker threads. In one embodiment, if a worker thread determines, in response to a requested metadata deletion operation, that the metadata entry for a given object has already been deleted or does not exist, the metadata deletion operation may be considered a success rather than a failure, so that deletion operations that may be attempted more than once do not result in large numbers of apparent errors. In other embodiments, deletion idempotency may not be desired, so that multiple attempts to delete the same object's metadata may be deemed errors. After metadata deletions of all the deletion candidates of a given job have been initiated, the deletion task dispatcher 170 may initiate the deletion of the job object itself from container 910 (arrow 961) in the depicted embodiment. In other embodiments, other components (such as the deletion job generators, which may also be configured to examine deletion job containers 910 for expired or eligible-for-deletion job objects) may be responsible for initiating deletion of job objects.

In the illustrated embodiment, the operations of the deletion job generators 130, the deletion task dispatchers 170, and/or the worker threads 471, may all be asynchronous and independent of the operations of the other components. For example, a deletion job generator 130, when considering whether to include an object 133 as a candidate for deletion in a job Jk, may not be concerned whether a previously-generated job Jf already indicates that same object as a candidate for deletion, and whether a deletion task dispatcher has already assigned resources for Jf's candidates or not. Similarly, the deletion task dispatcher may not be concerned about when the last discovery iteration was initiated, or when the next discovery iteration is going to be scheduled, or whether a given job object being validated or assigned resources contains candidates that are also in another job. Worker threads 471 may simply be configured to process the tasks in a particular waiting-for-execution queue, without any consideration of the iterations of the job generator or task dispatcher. This type of loose coupling between the various components may allow for cleaner, less complex implementations than if the various components needed to be aware of the operations of each other.

FIG. 10 illustrates example elements of a storage object deletion policy that may be specified by a client 405 using a programmatic interface, according to at least some embodiments. As indicated above, in some embodiments a web server 902 may be configured to receive deletion policy definitions from clients 405. In the embodiment depicted in FIG. 10, a client 405 may use a PUT request 1002 transmitted in accordance with a REST-style programmatic interface to define a scheduled deletion policy to be stored in the storage service for some set of objects for which the client has the required authorization. The depicted PUT request may be submitted using HTTP 1.1, as indicated near the top of the example request shown in FIG. 10, directed to an endpoint "bucketname.servicename.webserver.com" on a particular date indicated in the request. As shown, the request may include a signature in an "Authorization" field, which may be validated by the web server or by a different, authorization-related component of the storage service in various embodiments.

The deletion policy definition may comprise a plurality of rules in the depicted embodiment, each of which may be enforced on corresponding sets of objects. In the illustrated example, a rule with an identifier "xxxx" applies to objects whose identifiers begin with the string "prefix1/abc", while a second rule with an identifier "yyyy" applies to objects whose identifiers begin with the string "prefix1/klm". The prefixes may be specified relative to a bucket (e.g., bucketname.servicename.webserver.com) in some embodiments, and the rule may apply to all the objects whose keys match the specified prefix. A "Status" element in a rule definition may be used to indicate whether the rule is to be enabled as soon as possible (e.g., using the keyword "Enabled" as shown) or is merely to be stored in the service for later activation (in which case a keyword such as "Disabled" may be used instead). Different types of deletion criteria may be specified in the PUT requests for each rule—for example, for rule "xxxx", the keyword "ElapsedTimeSinceCreation" is used to indicate that the objects are to be deleted relative to when they were created, while for the rule "yyyy", the keyword "ElapsedTimeSince-LastAccess" is used to indicate that the corresponding objects are to be deleted relative to when they were last accessed (e.g., read or modified). For criteria such as those illustrated that are based on elapsed times, the units (e.g., "Days" or "Weeks") and the count (e.g., "10" for "Days" and "26 for "Weeks") may also be included in the PUT request. In some embodiments, the storage service may populate a deletion policy definition with a default value if it is not specified in the request—for example, if the count of days is not specified for an elapsed time since creation, a default value of 180 days (approximately 6 months) may be used.

Equitable Resource Allocation for Scheduled Deletions

Some clients 405 of a storage service 102 may have very large numbers (e.g., billions or more) of objects 133 in the service, while others may have far fewer objects stored. The total number of objects scheduled to be deleted in a given iteration for one client 405 may also differ substantially from the total number of objects to be deleted for other clients. Under at least some conditions, it may be the case that insufficient resources may be available during some task dispatcher execution iterations to complete all the deletion operations that are eligible for execution, and as a result some deletion operations may have to be deferred, e.g., until either more resources become available or until the next iteration is scheduled. The storage service 102 may attempt to ensure, using a variety of techniques in different embodiments, that scheduled deletions of clients that have a smaller number of deletion-eligible objects can be assigned at least some resources even if other clients have far more objects eligible for deletion. In at least some embodiments, techniques for improving the fairness of resource allocation for scheduled deletion may depend upon the mix of objects listed in the jobs, as described below.

Figure 11:
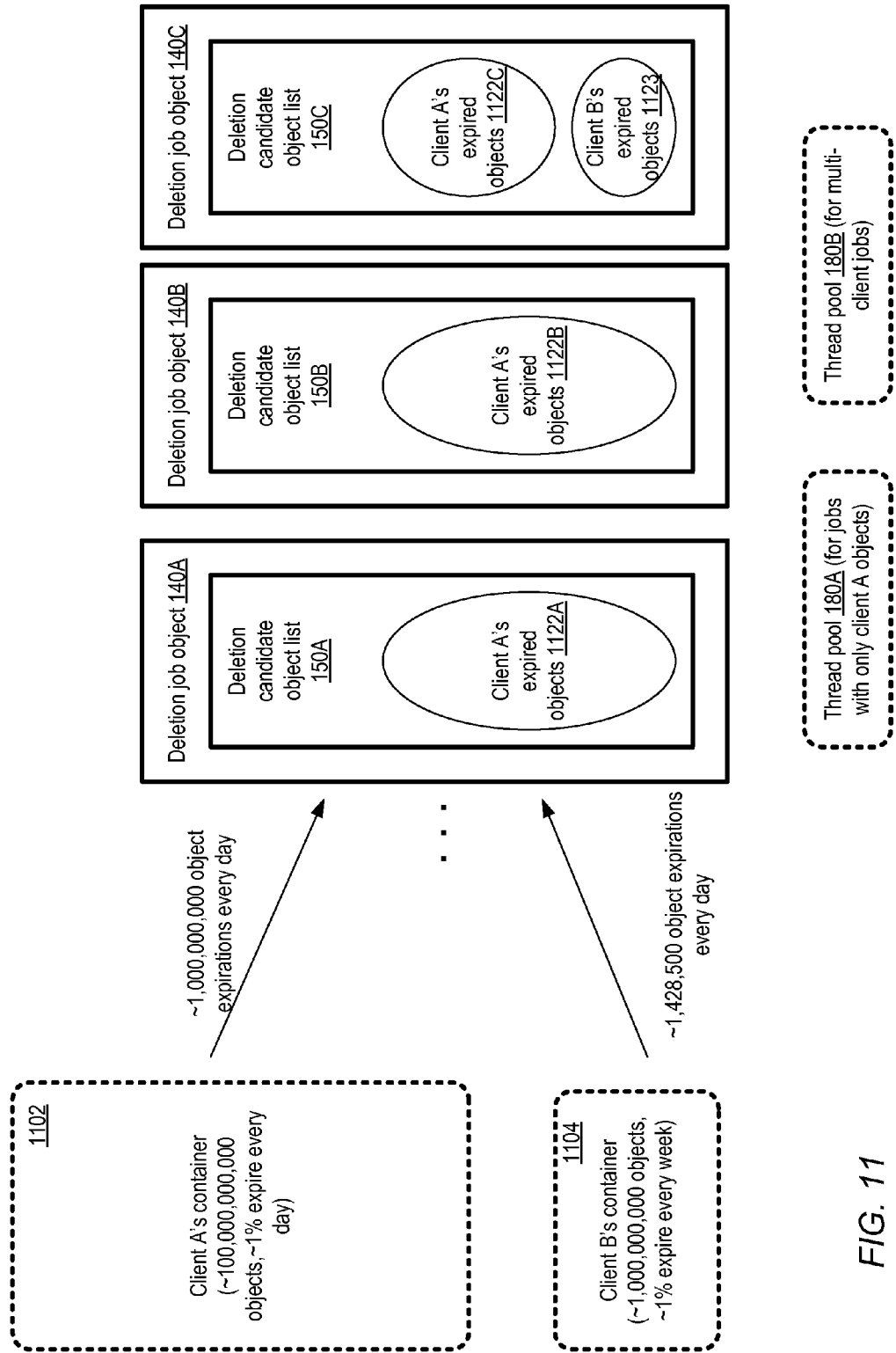
FIG. 11 illustrates an example scenario in which some job objects list deletion candidates owned by a single client, and at least one job object lists deletion candidates owned by multiple clients, according to at least some embodiments.

FIG. 11 illustrates an example scenario in which some job objects list deletion candidates owned by a single client, and at least one job object lists deletion candidates owned by multiple clients, according to at least some embodiments. For simplicity, a single logical container is shown for each of two clients, client A and client B (in practice, container size limits enforced by the storage service may result in multiple containers being set up for each client). Client A's container 1102 includes approximately 100,000,000,000 objects, of which approximately 1% expire every day in accordance with a deletion policy approved by client A. Client B's container 1104 includes approximately 1,000,000,000 objects, of which approximately 1% expire every week. Consequently, approximately 1,000,000,000 objects owned by client A become eligible for deletion every day, while only approximately 1,428,500 objects owned by client B become eligible for deletion every day.

Continuing the example, assume that (a) the deletion job generator 130 is configured to perform a deletion candidate discovery iteration once a day, (b) deletion candidates are assigned to job objects 140 independently of the client than owns the candidates, and (c) a single task is used for all the deletion operations of a given job object (i.e., there is a 1-to-1 correspondence between jobs and tasks) in the depicted embodiment. Accordingly, given the relative numbers of deletion-eligible objects of the two clients, some job objects such as 140A and 140B that are created by the job generator may include only candidate objects owned by client A, while others such as 140C may include candidate objects from both clients. In some implementations, the deletion task dispatcher 170 may be configured to assign resources to a given job (i.e., to a given task because of the 1-to-1 task-to-job correspondence) based on how many distinct clients (or distinct client containers) are represented in that given job.

In particular, in the embodiment depicted in FIG. 11, the task dispatcher 170 may use the following logic in assigning worker threads 471. Jobs 140 that only contain candidates owned by a single client (such as jobs 140A and 140B) may be assigned worker threads from a thread pool 180A specifically designated for that single client. The maximum number of threads in pool 180A may be limited to N threads, so that even if any given client such as client A has hundreds or thousands of exclusive jobs (i.e., jobs that list only candidates owned by client A), no more than N threads may be assigned to work on all those jobs. In contrast, jobs that include candidates owned by multiple clients, such as job 140C, may be assigned worker threads from one or more dedicated multi-client-job worker thread pools, such as pool 180B. If pool 180B has a limit of M threads (where M may be equal to N, or differ from N, in different implementations), for example, up to M threads may be allocated to work on the jobs associated with multiple clients. In this way, the storage service 102 may attempt to provide at least some resources for jobs that may contain "small" clients' deletion candidates, such as the candidates of client B. In one embodiment, an even simpler approach may be taken, in that distinct pools of resources may not be used—instead, for example, a single "global" pool of resources such as worker threads may be maintained, and the maximum number of resources assigned to a given job may be determined based on how many distinct clients (or distinct logical containers) are represented in the job. For example, the deletion task dispatcher may be configured to assign up to a maximum of N resources to any jobs that list candidates belonging only to a single client C1 in one implementation, while a maximum of M resources may be assigned to jobs that list candidates of more than one client. In at least some embodiments where a logical container hierarchy similar to that shown in FIG. 6 is employed, the assignment of resources to jobs may be based on the number of distinct logical containers (at some level of the hierarchy, such as partitions) whose objects are listed in a given job object.

It is noted that even in the approach described above, where resources are assigned for deletion operations based at least in part on the number of clients associated with a given job, it may be the case that a given large client (such as client A) may at least temporarily consume more than N resources (since multi-client job 140C may include a number of client A's candidates); however, one advantage of the approach is that at least eventually, some resources will be applied to client B's candidates. The technique may also be extremely simple to implement, and may result in less overhead (e.g., for job object management and/or for thread pool management) than techniques in which each job is limited to a single client's objects. For example, in an alternative approach in some embodiments where each job object is limited to a single client's candidates, and each client is provided a separate pool of worker threads, (a) the total number of jobs and pools may become quite large if there are numerous small clients and few large clients and (b) in many scenarios worker threads assigned to small clients may potentially be left idle, while jobs for large clients remain pending for execution.

Figure 12:
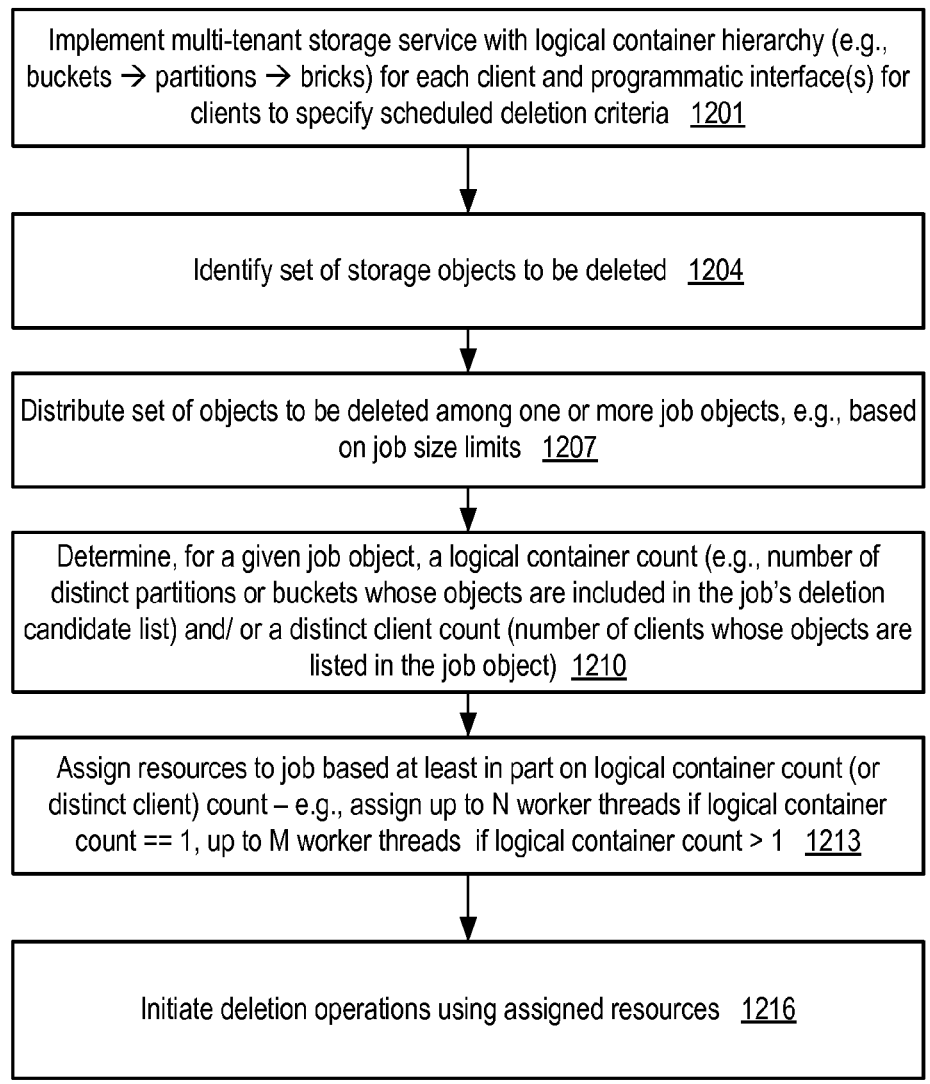
FIG. 12 is a flow diagram illustrating aspects of operations performed to implement an equitable resource allocation policy for scheduled deletes of different clients, according to at least some embodiments.

FIG. 12 is a flow diagram illustrating aspects of operations performed to implement an equitable resource allocation policy for scheduled deletes of different clients, according to at least some embodiments. As shown in element 1201, a multi-tenant storage service in which each client's objects are stored according to a logical container hierarchy may be implemented. A logical container hierarchy similar to that illustrated in FIG. 6 may be employed in some embodiments. One or more programmatic interfaces may be implemented to enable clients to specify deletion policies, e.g., including various types of deletion criteria to be used to identify candidate objects for scheduled deletions. Such criteria to be used for deleting a given object may be based, for example, on elapsed time since the object was created, elapsed time since the most recent object access or most recent modification, frequency of accesses of the object, or other client-specified policies. A set of objects to be deleted in accordance with deletion criteria may be identified (element 1204), e.g., as part of a candidate discovery iteration of a deletion job generator 130. One or more deletion job objects may be generated, and indications of the objects that are to be deleted may be distributed among the job objects (element 1207). In at least some embodiments, the job objects may themselves be stored in the storage service.

The logical container count (i.e., the number of distinct logical containers at some level of the hierarchy, such as at the partition or bucket level, whose objects are indicated in the job) for a given job may be determined (element 1210), e.g., by a deletion task dispatcher during an execution iteration. Some jobs may include objects from logical containers belonging to more than one client, for example, while other jobs may include only objects belonging to a container owned by a single client. As indicated earlier, in some embodiments the names or identifiers assigned to jobs may indicate the number of distinct clients or logical containers represented in the jobs. One or more resources, such as worker threads 471 configured to initiate metadata deletion operations for the storage objects, may be assigned to the given job, based at least in part on the logical container count (element 1213). For example, in one embodiment, up to N worker threads form a given pool (or from a global pool) of threads may be assigned if the logical container count is 1, while up to M threads may be assigned from a different pool (or from a global pool) may be assigned of the logical container count exceeds one. In some embodiments the number of distinct clients whose objects are listed in a job object may be used as a criterion for deciding which and/or how many resources are to be assigned. The logical container count may be computed as a way to determine the count of distinct clients, or as a substitute or surrogate for the number of clients, in some embodiments. Operations to delete the storage objects indicated as candidates in the job, such as keymap or index entry deletions or other metadata deletion operations, may be initiated using the assigned resources or by the assigned resources in the depicted embodiment (element 1216). In embodiments in which job objects are stored in the storage service, the job objects themselves may be deleted after their candidate objects are deleted. As indicated earlier, in at least some embodiments operations to release storage space, e.g., from data nodes 120, may be initiated asynchronously with respect to the metadata deletion operations. In some embodiments separate operations may be performed for logical and physical deletion of the metadata, and separate operations for logical and physical deletions of the storage space used for the data of a storage object. Both metadata and data may be logically deleted prior to physical deletion in such embodiments, and the logical deletion of the metadata may be asynchronous with respect to the logical deletion of the data and/or the physical deletion of the metadata and the data.

It is noted that any of several variations of the techniques described above for equitable resource allocation for deletion operations may be employed in different embodiments. For example, in some embodiments, the number of resources (such as worker threads) assigned to a job may be determined as a linear function of the number of clients whose objects are included in the job, so that if a job comprises objects of just one client, T threads may be assigned, but if a job comprises objects of three clients, 3T threads may be assigned. In other embodiments, deletion operations for the objects of a given job with C clients' objects may be ordered based at least in part on how many objects each of the C clients has in the job, with the clients with fewer objects being given priority over the clients with more objects, for example. Resources may be dynamically increased or reduced for a given job based on how many different clients' objects remain to be deleted within that given job in some implementations: for example, 2T threads may be assigned as long as objects of two clients remain, but if deletions for all the objects of one of the two clients have been completed, T threads may be reassigned to other jobs.

Backoff-Based Scheduling of Metadata Deletion Operations

As noted earlier, in many implementations, especially in scenarios in which the storage service 102 includes very large numbers of objects, the metadata nodes 110 (such as keymap instances 450 or coordinators 420) may often be the bottleneck resources in the system, i.e., among the different components in the storage service, the performance characteristics of the metadata nodes may most strongly influence the performance characteristics of the system as a whole. Accordingly, when issuing metadata deletion requests for storage objects 133 scheduled for deletions in accordance with various deletion policies, in some embodiments the storage service components involved may take various metrics of metadata node performance into account as described below. As noted earlier, in at least some embodiments, the scheduled delete operations may be considered low-priority or background operations relative to I/O requests received directly from external clients, and a scheduled deletion of a given storage object 133 may comprise at least one metadata entry deletion operation as well as at least one storage space release operation that is asynchronous with respect to the metadata deletion operation(s).

Figure 13A:
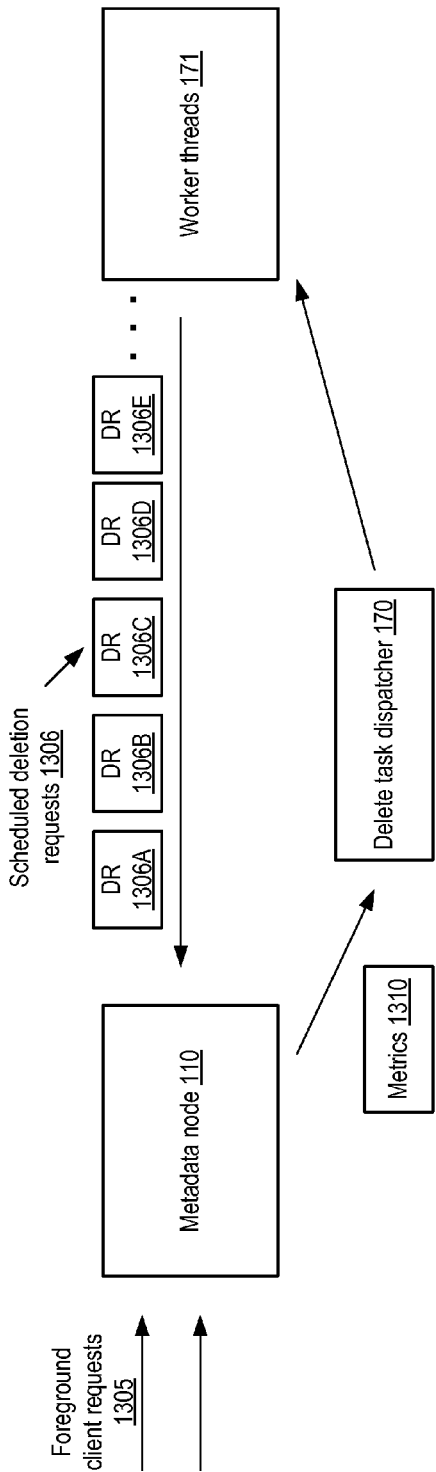
FIG. 13A illustrates a storage service component configured to obtain metrics from a metadata node to determine whether the rate at which metadata deletion requests are issued should be adjusted, according to at least some embodiments.
Figure 13B:
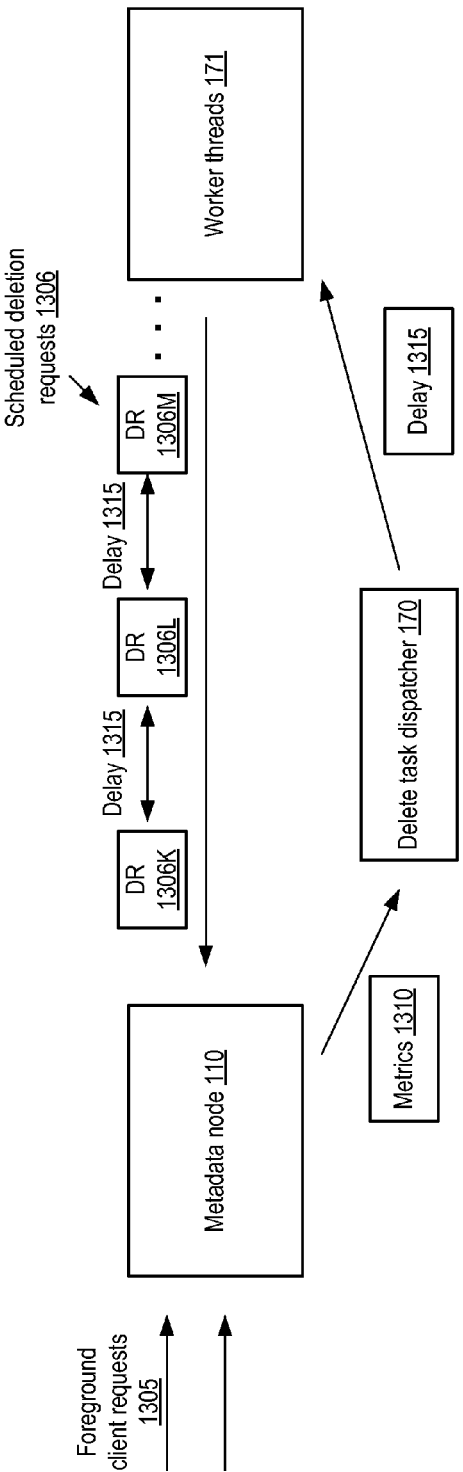
FIG. 13B illustrates storage service components configured to modify the rate at which metadata deletion requests are issued based on one or more metrics, according to at least some embodiments.

FIG. 13A illustrates a storage service component configured to obtain metrics from a metadata node 110 to determine whether the rate at which metadata deletion requests are issued should be adjusted, according to at least some embodiments, while FIG. 13B illustrates storage service components configured to modify the rate at which metadata deletion requests are issued based on one or more metrics, according to at least some embodiments. As shown, a metadata node 110 may be configured to respond to at least two types of requests: foreground client requests 1305, as well as scheduled metadata deletion requests 1306, such as requests 1306A-1306E issued by worker threads 471, which may in general have a lower priority than foreground requests 1305. The metadata deletion requests 1306 may be initiated by the worker threads in response to tasks being inserted in the waiting-for-execution task list(s) 945 by the task dispatcher 170. At least in some embodiments, during an initial period of a given execution iteration or for a given task, the metadata deletion requests 1306 may be issued as quickly as possible—e.g., a worker thread 471 may issue the next request 1306 as soon as the previous request completes.

In one embodiment, the deletion task dispatcher 170 may be configured to obtain one or more metrics 1310 from the metadata node 110. The metrics 1310 may include, for example, response times for some subset or all of the deletion requests 1306 issued over a given time period, throughput of the deletion requests 1306 over some time period, response times or throughputs of foreground client requests, CPU utilization at the metadata node, I/O or network utilization, queue lengths, or error counts (e.g., the fraction or number of client requests and/or deletion requests that do not succeed over a time period). In some embodiments, mean values of at least some of the metrics, computed over a time period, may be obtained, while in others, statistical measures other than mean values, such as standard deviations, ranges, or peak values may be obtained, or trends over time may be obtained.

The deletion task dispatcher 170 may be configured to determine, for at least one of the metrics 1310, whether the value of the metric exceeds a threshold level in the depicted embodiment. For example, in an embodiment in which metrics comprise response times for keymap entry deletions, the task dispatcher may determine whether the average response times for keymap entry deletions exceeds X seconds, or whether any given keymap entry deletion took longer than Y seconds. If the metric meets the threshold criterion, in at least some embodiments the task dispatcher 170 (and/or the worker threads 471) may decide to alter the rate at which deletion requests 1306 are sent to the metadata node 110. In the embodiment depicted in FIG. 13B, the deletion task dispatcher 170 may compute a delay 1315 to be introduced between subsequent deletion requests 1306. The worker threads 471 may be notified about the delay, and may consequently wait for an amount of time equal to the delay between successive requests 1306. In at least some embodiments, a formula may be used to determine the delay based at least in part on a metric obtained from the metadata node. For example, if a response time value (e.g., the mean response time over a time period) R was detected, in one implementation the delay may be computed using the formula "$D=R^k+J$", where D is the delay, k is an exponent factor which may be tunable, and J is a jitter term which may be randomly generated or selected from a range. In some embodiments, the dispatcher may notify worker threads to keep using the delay until further notice, e.g., until the dispatcher determines based on newly-obtained metrics that the delay should be changed or eliminated. In at least some embodiments, the worker threads themselves may obtain the metric, determine whether delays should be introduced, and if so, how long the delays should be. In other embodiments, the deletion task dispatcher may itself be configured to issue the metadata deletion requests 1306, i.e., without the participation of worker threads 471. In one embodiment, worker threads may obtain the metrics 1310 and provide them to the deletion task dispatcher, which may make the determination regarding whether delays are to be introduced. In one implementation, the delay may be dynamically adjusted as needed based on changes in the obtained metrics. The introduction of delays 1315 based on metrics 1310 may be termed "backoff-based scheduling" herein. In one embodiment, backoff-based scheduling may also be used for storage space release operations associated with scheduled deletes of storage objects 133.

Figure 14:
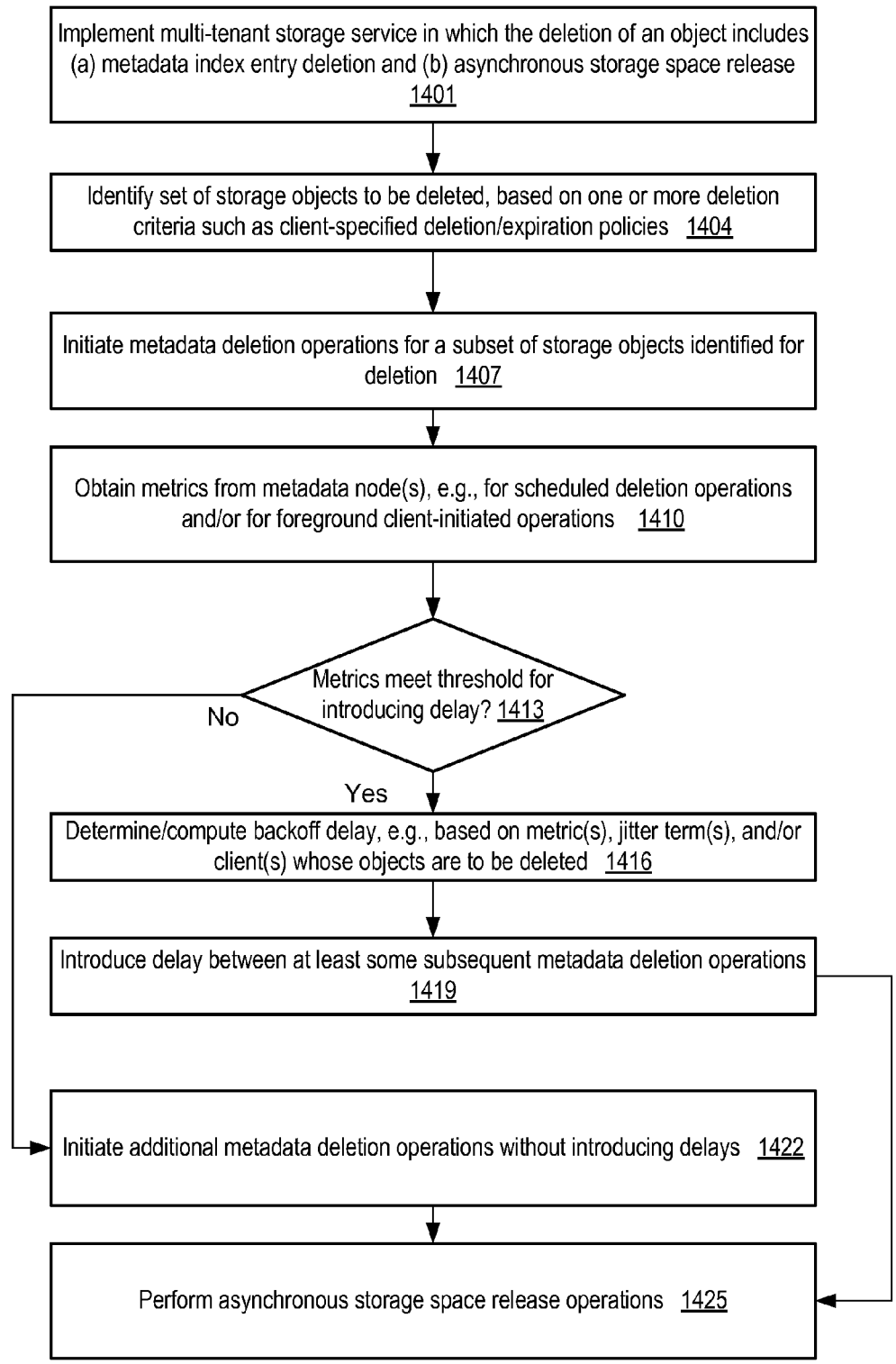
FIG. 14 is a flow diagram illustrating aspects of operations performed to implement backoff-based scheduling of metadata deletion operations for storage objects, according to at least some embodiments.

FIG. 14 is a flow diagram illustrating aspects of operations performed to implement backoff-based scheduling of metadata deletion operations for storage objects, according to at least some embodiments. As shown in element 1401, a multi-tenant storage service may be implemented, in which the deletion of a given storage object 133 includes at least a metadata entry deletion and a storage space release that is asynchronous with respect to the metadata entry deletion. A set of storage objects 133 to be deleted may be identified (element 1404), e.g., during a candidate discovery iteration by a job generator 130, based on one or more deletion criteria mentioned earlier. In some embodiments, as described above, the job generator may store job objects with lists of deletion candidates, as first class storage objects 133 in the service. At some point in time, e.g., at the start of a deletion execution iteration of a deletion task dispatcher 170 which may be asynchronous with respect to the identification of the deletion candidates, operations to delete metadata for at least a subset of the objects may be initiated (element 1407). The metadata to be deleted may, for example, comprise keymap entries that indicate location information for the data of the storage objects in some embodiments. The metadata deletion operations may be initiated by worker threads 471 assigned by the deletion task dispatcher in at least some implementations.

One or more metrics, such as response times, resource utilizations, error counts or error rates, may be obtained from one or more metadata node(s) to which the deletion operations were directed in the depicted embodiment (element 1410). In some embodiments the metrics may be obtained for the metadata deletion operations initiated by the worker threads, while in other embodiments metrics for foreground client-initiated operations (including, for example, both metadata reads and metadata writes) may also or instead be obtained. In at least one embodiment, metrics may be aggregated from a plurality of metadata nodes 110, such as various keymap instances, coordinators, and the like, and may not be limited to those specific metadata nodes to which the metadata deletion operations were targeted. In an embodiment in which at least some of the metadata (such as keymap entries) for a given storage object is replicated, metrics from one or more of the nodes at which metadata is replicated may be collected—e.g., metrics need not necessarily be gathered from all the replicas. The metrics may correspond to the scheduled metadata deletions and/or to other operations such as foreground client-requested operations (e.g., response times for foreground or background metadata operations may be collected), or may be independent of specific types of requests (e.g., an overall CPU utilization or I/O utilization metric may be collected from the metadata node, independent of which types of operations led to the utilization), in various implementations. A determination may be made as to whether one or more of the metrics meets a threshold for introducing delays or "backing off" the rate at which metadata deletion operations are issued (element 1413). The metrics may be obtained by the deletion task dispatcher and/or the worker threads in various embodiments; similarly, the determination as to whether to back off or nor may also be made by the deletion task dispatcher and/or the worker threads in various embodiments. If a decision to introduce delays is made, the backoff delay (i.e., the amount of time by which metadata deletion operations are to be delayed) may be computed. In some implementations, the delay may be computed as a function of, or based at least in part on, the metrics obtained and/or one or more jitter factors that may be intended to introduce random variations in the delays (element 1416). In at least one embodiment, the delay may be determined based at least in part on the clients whose storage objects are to be deleted—e.g., in some embodiments, a different delay D1 may be used before metadata deletion operations of one client C1 than the delay D2 that is used before metadata deletion operations of another client C2. Such a client-based backoff technique may be used, for example, based on service level agreements that may differ from client to client. In one implementation, delays may be varied for different clients in an effort to ensure that "small" clients' metadata deletes (i.e., deletes being initiated for clients that have relatively fewer scheduled deletes than other clients) can make progress even if "large" large clients have far more deletion-eligible objects—thus, in such an implementation, a smaller delay for a small client may be one way or equitable resource allocation. The delay may then be introduced between at least some subsequent metadata deletion operations (element 1419). It is noted that the metadata deletion operations that are delayed may correspond to different tasks or job objects than the deletion operations for which metrics were gathered in at least some embodiments—e.g., job boundaries and/or task boundaries may not necessarily be considered when determining whether to introduce delays and when to implement delays. In other embodiments, delays may only be applied within the same task or job for which metrics were obtained.

If a determination is made not to introduce any delays (as also determined in element 1413), subsequent metadata deletion operations may be initiated without any deliberate delays, as indicated in element 1422. The asynchronous storage space release operations may be scheduled at some point after the metadata deletion operations (element 1425). Metrics from the metadata nodes may be gathered periodically or continually in some embodiments, and the delays may be adjusted or eliminated based on the trends observed.

Deletion Job Management

Figure 15:
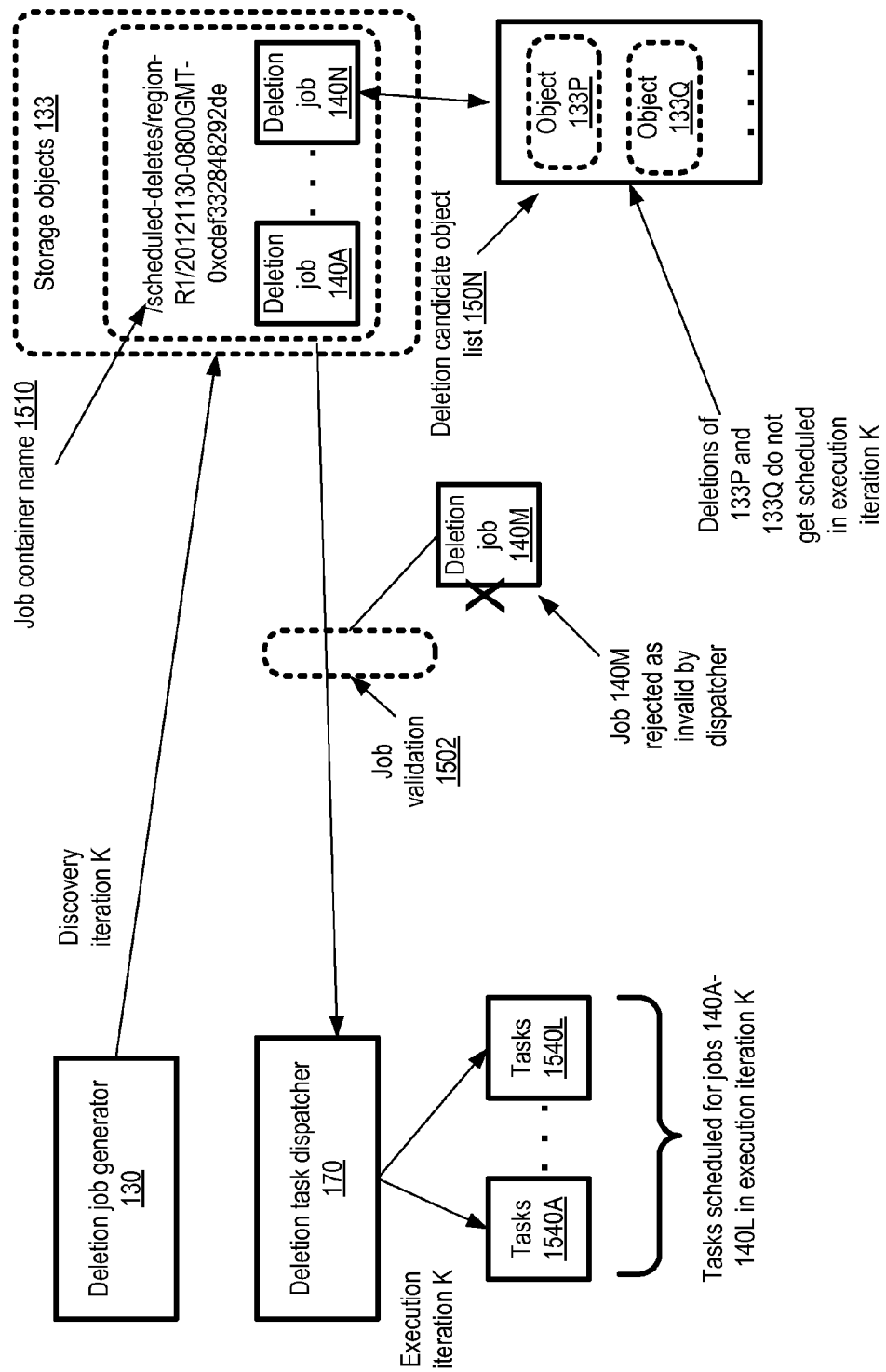
FIG. 15 and FIG. 16 illustrate examples of operations that may be performed during successive iterations of scheduled deletion operations by a deletion job generator and a deletion task dispatcher, according to at least some embodiments.
Figure 16:
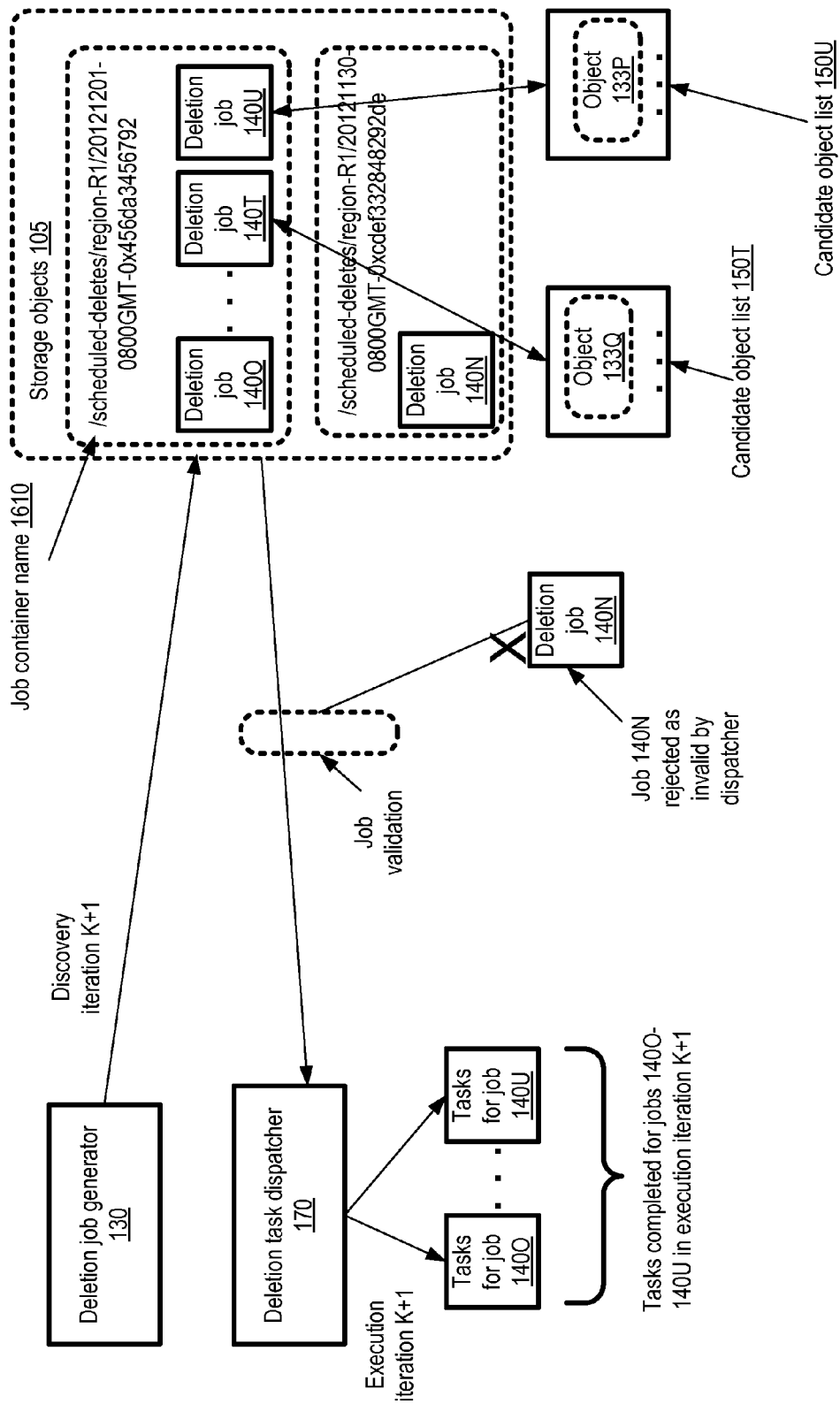

FIG. 15 and FIG. 16 illustrate examples of operations that may be performed during successive iterations of scheduled deletion operations by a deletion job generator 130 and a deletion task dispatcher 170, according to at least some embodiments. The job generator and the task dispatcher are assumed to schedule their operations independently of, and asynchronously with respect to, each other in the depicted embodiment. For ease of explanation, one deletion candidate discovery iteration by the deletion job generator is assumed to be followed, at some later time, by one deletion task execution iteration of the task dispatcher. It is noted that in at least some embodiments, such a 1:1 relationship may not hold, in that during a given time period, either component (the job generator or the task dispatcher) may implement more iterations than the other. FIG. 15 illustrates operations during a discovery iteration "K" and an execution iteration "K", while FIG. 16 illustrates operations during the next ("K+1"th) discovery and execution iterations.

As shown in FIG. 15, the deletion job generator 130 may store, within one or more specially-named logical containers of the storage service 102, a number of deletion job objects 140A-140N during discovery iteration K. The job object container name (and/or the names or keys of the job objects themselves) may in the depicted embodiment be selected using a priority-based naming scheme, i.e., the names of the job objects or their containers may encode information about the relative priority of the deletion tasks included in the jobs. In one implementation, as shown, a container name with an embedded timestamp may be used, such as "/scheduled-deletes/region-R1/20121130-0800GMT-0xcdef332848292de". The timestamp substring ("20121130-0800GMT" in this example) may indicate, for example, the time at which the discovery iteration began, the time at which the container was created, or the time at which one or more of the storage objects listed in the job objects expired. The inclusion of the "region-R1" string may help identify a physical location or region in which the identified storage objects (or at least some of the replicas of the identified storage objects) are located. The inclusion of the timestamp may help the task dispatcher 130 to identify when the deletion candidates listed in the jobs were identified as being eligible for deletion, or when the objects expired, and may thus serve as priority indicators in some embodiments. In some embodiments, job objects or containers may be named with more explicit indicators of priority—e.g., a priority value may be included in the name. In one embodiment, each job may be given a name (or key) that encodes its priority relative to other job objects. The selection of names based on priorities (indicated by timestamps or by other components of the names) may, for example, allow efficient sorting of jobs in priority order by the task dispatcher 170 in various embodiments.

During its execution iteration K, the deletion task dispatcher 170 may examine job objects in one or more containers created by the job generator 130. In the depicted embodiment, the task dispatcher may be configured to perform job validation 1502, e.g., to determine using one or more criteria whether each of the examined jobs is valid. Some jobs, such as job 140M in the example shown, may be rejected as invalid, although in at least some iterations all the jobs examined may be valid. For each job that the task dispatcher is able to validate, one or more tasks 1540 may be added to the waiting-for-execution task list 945 in the depicted embodiment—for example, using a 1:1 mapping between jobs and tasks, tasks 1540A-1540L may be inserted for jobs 140A-140L in the example shown. An operation to delete the metadata for the rejected job object itself (i.e., the metadata for the particular storage object 133 in which the job's candidate list is stored, as opposed to metadata for the storage objects identified in the list) may be initiated by the task dispatcher in some embodiments, e.g., as part of a task added to the waiting-for-execution task list 945.

In some scenarios, during execution iteration K, the deletion task dispatcher 170 may not be able to examine and perform validity checks on all the job objects that are ready. For example, in FIG. 15, job 140N, which lists (among others) objects 133P and 133Q as deletion candidates in its list 150N, may remain unexamined by the task dispatcher 170 during execution iteration K. The task dispatcher 170 may be unable to complete its examination of available jobs because of a number of factors in different embodiments. For example, in one embodiment, a maximum size limit may be enforced on the waiting-for-execution list for reasons related to memory or other resource constraints, and there may be too many deletion candidates to place all of them in the list during a time window designated for execution iteration K. Slow responsiveness of the metadata nodes to which deletion requests are directed may also result in some jobs remaining unscheduled during a given execution iteration in some embodiments. In the depicted example, execution iteration K may end with job 140N remaining unexamined by the task dispatcher 170 and/or without any corresponding tasks being generated by the task dispatcher 170, and as a result, deletion operations for objects 133P and 133Q may not be initiated during execution iteration K.

During candidate discovery iteration K+1, shown in FIG. 16, deletion job generator may again identify a set of storage objects 133 to be deleted. One or more logical containers for storing job objects of iteration K+1 may be created, such as the example container named "/scheduled-deletes/region-R1/20121201-0800GMT-0x456da3456792" shown in FIG. 16. The container name and/or the job names or keys may encode the priority (e.g., using the timestamp substring or some other mechanism) of the scheduled deletions of the listed candidates in some embodiments. Objects 133P and 133Q, which were already eligible for deletion in iteration K, may again be identified as candidates. In the example shown, object 133P may be listed in a deletion job object 140T, while object 133Q may be listed in a different deletion job object 140U. Thus, these storage objects 133P and 133Q that were identified in an earlier iteration as candidates and were included together in a single deletion job object 140N may now be mapped to different job objects 140T and 140U. The deletion job generator 130 may be stateless in the depicted embodiment, at least in the sense that it is not concerned about previously created job objects, or duplicate candidates listed in more than one job object. The job generator 130 may simply be configured, regardless of previous iterations, to find all the candidates eligible for deletion according to the applicable deletion criteria in the current iteration, determine one or more logical container names and/or job names using the applicable priority-based naming criteria, and map the candidates to job objects based on some applicable grouping criteria (such as a job size limit).

Deletion task dispatcher 170 may also be stateless in the embodiment depicted in FIG. 16, at least in the sense that it may not be concerned about what was completed during previous iterations (either its own iterations or the job generator's iterations). Instead, during a given execution iteration such as iteration K+1, the deletion task dispatcher may simply be configured to identify the job objects in some set of logical containers (e.g., those jobs stored in containers with the prefix "/scheduled-deletes/region-R1/"), validate each of the jobs according to some validation criteria, and then, for as many validated job objects as possible, create tasks for implementing the corresponding deletion operations. Accordingly, in the depicted embodiment, deletion task dispatcher 170 may examine job objects 140N, 140O, . . . 140U in turn. In the example shown, job 140N may fail to meet the validation criteria (e.g., a criterion that considers only those job objects that were created less than 24 hours earlier as being valid) and be rejected by the task dispatcher 170. Other job objects 140O-140U may be found valid, and corresponding tasks may be inserted into the waiting-for-execution lists 945. The deletion operations for objects 133P and 133Q may eventually be initiated, even though the first job object in which these objects were listed was rejected. Such stateless designs of the job generator 130 and the task dispatcher 170 may help simplify implementation and increase efficiency, avoiding some of the overhead and complexity of a more complex design in which duplicate checking or synchronization between the operations of the two components may be required.

Figure 17A:
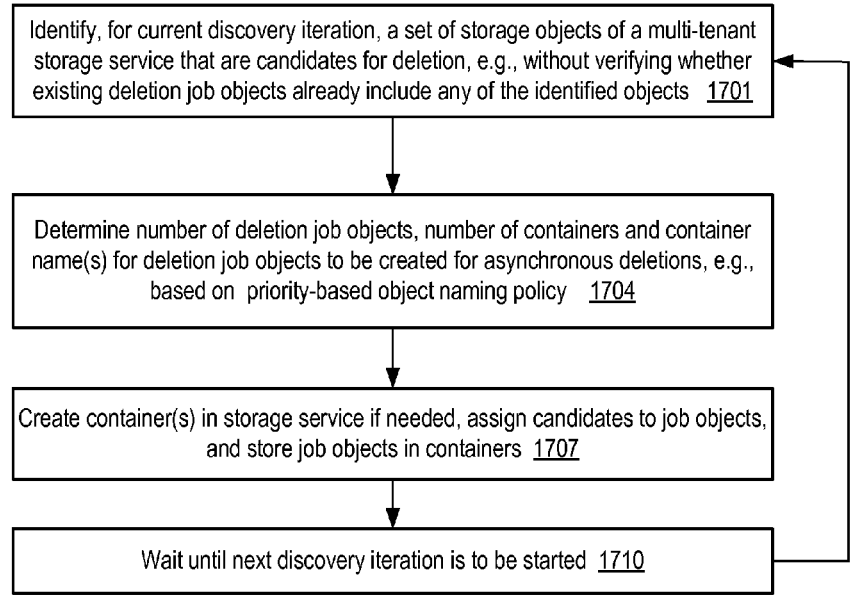
FIG. 17A is a flow diagram illustrating aspects of operations that may be performed by a deletion job generator configured to name deletion job objects using a priority-based naming policy, according to at least some embodiments.

FIG. 17A is a flow diagram illustrating aspects of operations that may be performed by a deletion job generator 130 configured to name deletion job objects using a priority-based naming policy, according to at least some embodiments. As shown in element 1701, the job generator 130 may be configured to identify, during a given discovery iteration, a set of storage objects 133 of a multi-tenant storage service 102 that are candidates for deletion based on one or more deletion criteria of the types described above. In at least some implementations, the job generator 130 may not be configured to verify whether any existing deletion job objects already include any of the candidates that it identifies, and as a result, it may be the case that more than one job object may list the same deletion candidate in the depicted embodiment. Having identified the candidates for deletion, the job generator 130 may determine the total number of job objects to be generated, the number of logical containers into which the job objects are to be distributed, and the names, identifiers or keys of the containers and the jobs (element 1704). In some implementations, a limit (which may be a tunable parameter) on the number of deletion candidates that should be included in a job may be enforced, which may determine the number of job objects to be generated. In at least some embodiments, a priority-based naming policy may be used for naming the logical containers and/or the job objects themselves, so that for example sorting the jobs in accordance with priority may be enabled. In one implementation, the priority of a set of jobs may be indicated by including a timestamp in the name of a logical container, where the timestamp may for example indicate an expiration time of one or more of the deletion candidates, or a time at which the candidate discovery iteration was performed or initiated, or a target completion time for the deletion operations for the candidates indicated in the job. In such an implementation, an earlier timestamp may indicate a higher priority. In other implementations, priority may be indicated more directly in the names of the containers or the job objects, e.g., using explicit priority values or levels.

The job generator 130 may create the containers if they do not already exist, assign the deletion candidates to the job objects, and store the job objects in the containers (element 1707). In some embodiments, as in the examples shown in FIGS. 15 and 16, new containers may be created in each iteration; in other embodiments, containers may be reused at least at some level within the container hierarchy. Various techniques may be used to assign deletion candidates to jobs, to assign job objects to containers, and/or to determine the order in which candidates are listed within a given job object in different embodiments. In some implementations, deletion candidates may be randomly distributed among job objects, while in other implementations, factors such as locality may be used for assigning candidates to jobs. In some embodiments, the deletion job generator may be implemented using a plurality of threads of execution searching for candidates in parallel, and creating job objects in parallel. After the job objects with the deletion candidate lists have been stored in the containers, the job generator 130 may enter a sleep state or a dormant state until the next discovery iteration is to be started, e.g., according to a predetermined schedule.

Figure 17B:
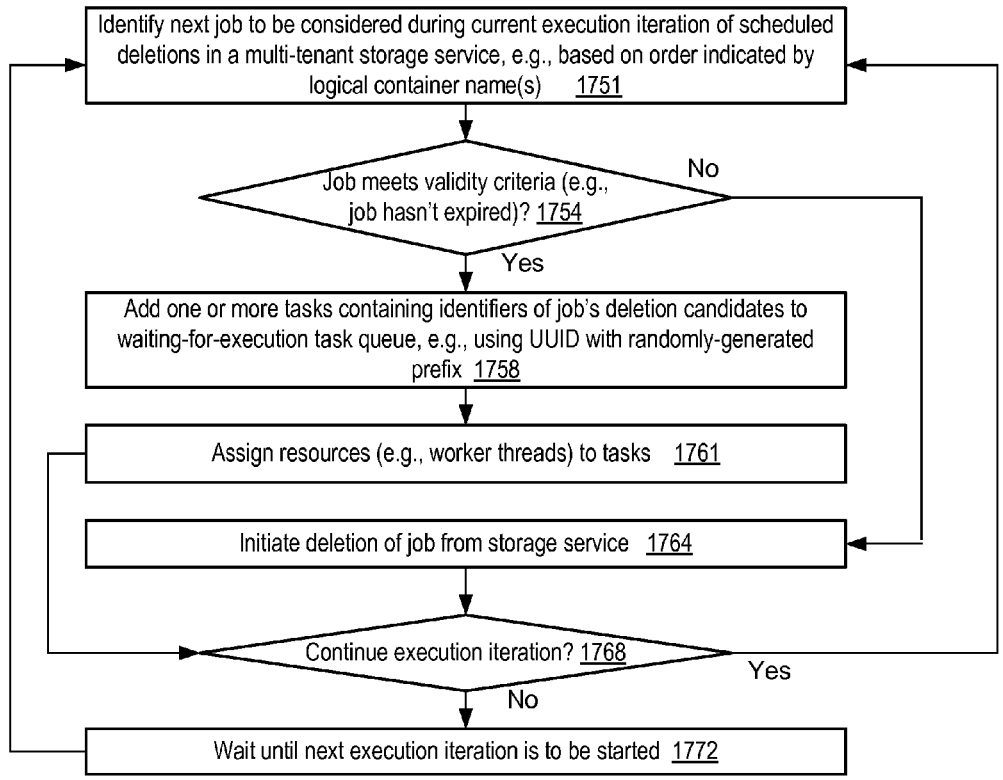
FIG. 17B is a flow diagram illustrating aspects of operations that may be performed by a deletion task dispatcher configured to reject job objects that do not meet a validation criterion, according to at least some embodiments.

FIG. 17B is a flow diagram illustrating aspects of operations that may be performed by a deletion task dispatcher 170 configured to reject job objects that do not meet a validity criterion, according to at least some embodiments. As shown in element 1751, during a given task execution iteration, the dispatcher 170 may be configured to identify the next job object to be considered. The order in which job objects are selected may be based at least in part on the logical container names and/or the job names or keys selected by the job generator in the depicted embodiment—e.g., the priority indicators used for naming may also be used for determining the order. The dispatcher may check whether the job object meets one or more validity criteria (element 1754)—for example, in one implementation, a job expiration period may be enforced according to which only jobs that have been generated in the last X hours or days are to be considered valid, while older jobs are to be rejected as invalid. If the job object is valid, one or more tasks containing identifiers or keys of the candidates indicated in the job object may be inserted in a waiting-for-execution task list 945 (element 1758). In some implementations a universally-unique identifier (UUID) may be generated for each task, e.g., with a randomly-generated prefix, and the UUID may be used to select the position within the waiting-for-execution list at which the task is inserted. In some implementations all the deletion candidates of a given job object may be included in a single task, while in other implementations the candidates of a given job may be distributed among multiple tasks, or the candidates of multiple jobs may be included within a single task. In one embodiment, tasks (unlike job objects) may be temporary or in-memory objects that are not stored as persistent, first-class objects 133 within the storage service. A task may comprise a pointer or identifier of the corresponding job(s) in some implementations. The task dispatcher may be configured to assign resources, such as worker threads (which may be selected from one or more pools using the equitable resource allocation policies described earlier) to the tasks as needed in the depicted embodiment (element 1761). For example, as described below, a worker thread may be assigned a particular task, or be notified that tasks on a given waiting-for-execution list are available, in response to a get-task request in some implementations. In some embodiments, resources other than worker threads, such as CPU time slots, may be assigned instead of or in addition to worker threads.

If the job object was rejected on the basis of the validity criteria (as also determined in element 1754), the deletion of the job object itself from the storage service may be initiated (element 1764). For example, in one implementation the identifier or key of the job object may be added to one of the tasks by the task dispatcher. In some embodiments, the duration of a given execution iteration may be limited to a certain amount of time, while in other embodiments, the iteration may be allowed to continue until all the outstanding jobs have been examined. If, after assigning the resources (or rejecting the job as invalid), the iteration is to continue (as determined in element 1768), and job objects remain to be examined, the next job object may be selected, and the operations corresponding to elements 1751 onwards may be repeated for the next job object. Otherwise, the deletion task dispatcher may be configured to wait or sleep until the next iteration is to begin (element 1772).

Figure 18:
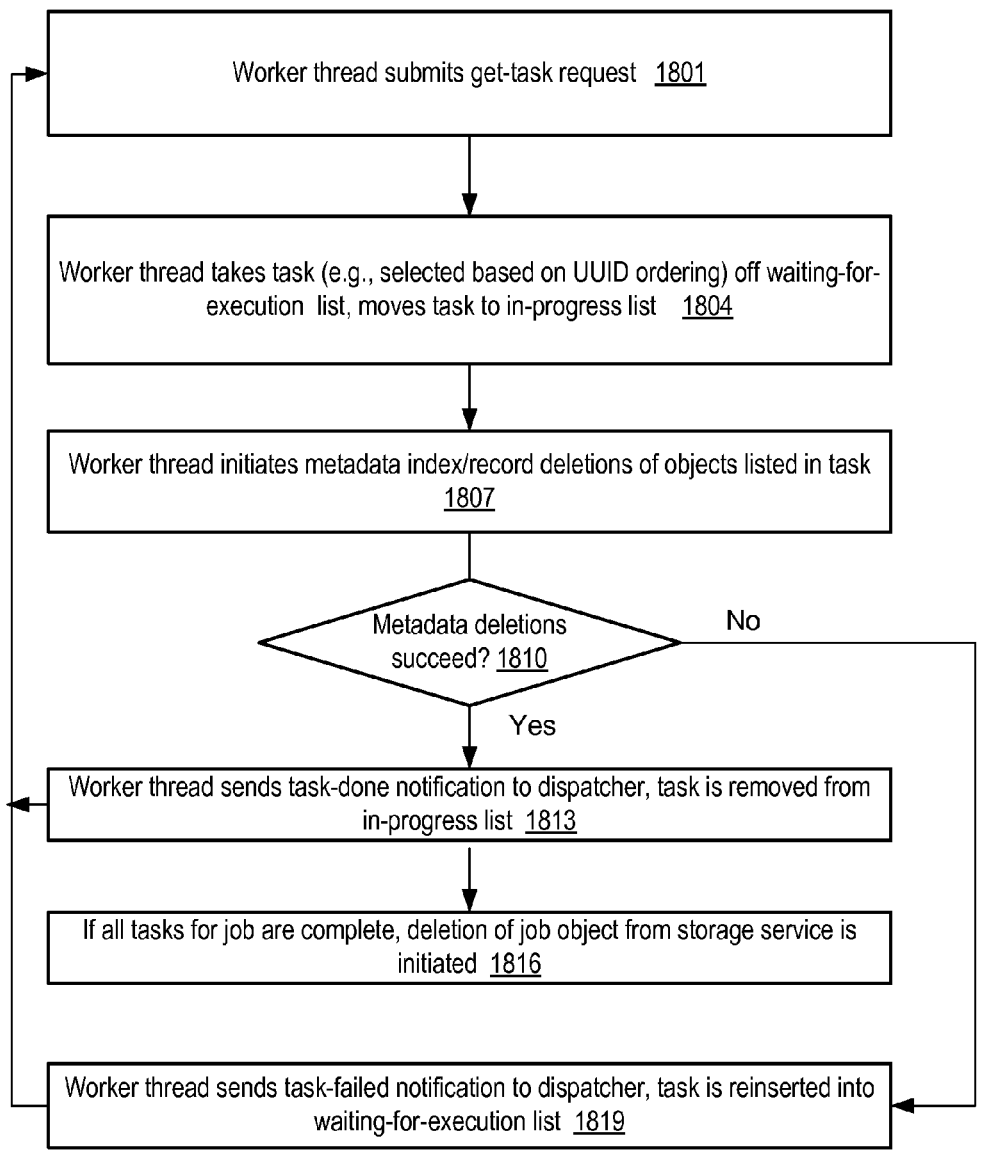
FIG. 18 is a flow diagram illustrating aspects of operations that may be performed by a worker thread configured to initiate metadata deletion operations, according to at least some embodiments.

FIG. 18 is a flow diagram illustrating aspects of operations that may be performed by a worker thread 471 configured to initiate metadata deletion operations, according to at least some embodiments. As shown in element 1801, a worker thread 471 in the depicted embodiment may submit a get-task request to the task dispatcher 170. The task dispatcher 170 may respond by assigning a particular task or by identifying a particular waiting-for-execution list 945 from which the worker thread is expected to pick the next task for execution. The worker thread 471 may take the task off the waiting-for-execution list and place the task in an in-progress list (element 1804). In some embodiments, as noted above, UIIDs generated by the task dispatcher may be used to order the tasks in the waiting-for-execution list(s), and hence the order in which the worker thread takes the tasks off the list(s). The worker thread may then initiate deletion of one or more metadata entries for storage objects 133 indicated in the task (element 1807), e.g., by issuing a particular web services request (such as a PUT) to a particular coordinator 420 of the storage service. Depending on the number of replicas of the object, in some embodiments the delete may be propagated to several metadata nodes 110, and in some embodiments a quorum of nodes may be required for the metadata entry deletion to be considered successful, as described earlier.

If all the metadata deletion operations for a given task succeed (as determined in element 1810), the worker thread 471 may send a task-done notification to the task dispatcher, and the task may be removed from the in-progress list and deleted (element 1813). If all the tasks for a given job object are completed, the deletion of the job object from the storage service may be initiated, e.g., by the task dispatcher 170 (element 1816). If at least some of the metadata deletions failed, the worker thread may send a task-failed notification to the task dispatcher 170 (element 1819). The task dispatcher may re-insert the task into the waiting-for-execution list in some embodiments, so that it may eventually be assigned again to a worker thread. In some implementations, the contents of the failed task may be modified before it is reinserted into the waiting-for-execution list, e.g., those candidates whose metadata has been successfully deleted may be removed. After the worker thread has processed a task, in the depicted embodiment the worker thread may again submit a get-task request (regardless of whether the task it was assigned completed successfully or not), and the operations of elements 1801 onwards may be repeated. When the execution iteration ends, in some embodiments the worker thread may also enter a dormant or sleep state until the next iteration starts. In some implementations the task dispatcher may be configured to ping or otherwise communicate with each worker thread periodically to ensure that the worker thread remains active, and if such a communication results in a determination that the worker thread is unresponsive, the task assigned to that thread may be reinserted into the waiting-for-execution list.

Conditional Deletes

As noted earlier, in at least some embodiments, storage objects 133 of a multi-tenant storage service 102 may be replicated, for any of a variety of reasons such as to increase durability or availability. In such embodiments, a client request to read or modify a given storage object 133 may be directed to any of the replicas of the object. First, an attempt to direct the request to a particular replica may be made, but if for some reason that replica is unresponsive, a different replica may be selected by the storage service (e.g., by a particular coordinator component 420). In the case of a modification (such as a PUT request submitted by a client to change the data content of a storage object), the changes requested by the client may be propagated to other replicas as described above with reference to FIG. 8A, and a reconciliation process may be used as described with reference to FIG. 8B to achieve consistency among the replicas. In some embodiments, as described earlier, sequence numbers associated with modifications may be used to resolve update conflicts among replicas.

In some scenarios in which scheduled deletions are supported, object replication may potentially lead to unexpected results. Consider an implementation in which a client may indicate an expiration period for a given storage object 133 identified by a key K, where the expiration period is specified relative to the time at which the object was last modified. For example, the client may specify, as a deletion criterion, that the object identified by key K is to be deleted if D days have passed since it was last modified. Storage service components (such as the deletion job generator 130) may identify the object as a deletion candidate in accordance with the specified criteria, and initiate a deletion of its metadata such as a keymap entry at a particular metadata node 110. A deletion sequence number may be assigned, indicative of a time when the metadata deletion occurs, and an indication of the deletion sequence number may be retained (e.g., within a keymap entry 548 as described earlier). It is possible that, independently of the scheduled deletion, the client may have decided to insert some new data value for the same key K at about the same time as the scheduled deletion, and that this modification request is handled initially at a different replica than the one at which the scheduled metadata deletion occurred. If the client receives a response indicating that the modification succeeded, the client may naturally expect that the value specified will be retained for D more days; however, depending on the sequence number assigned to the deletion, the data may actually be deleted (e.g., during reconciliation), resulting in data loss from the point of view of the client. The possibility of such a data loss is illustrated via a timeline below, and a solution designed to eliminate or reduce the probability of such a data loss suing special deletion sequence numbers is illustrated via a second timeline.

Figure 19:
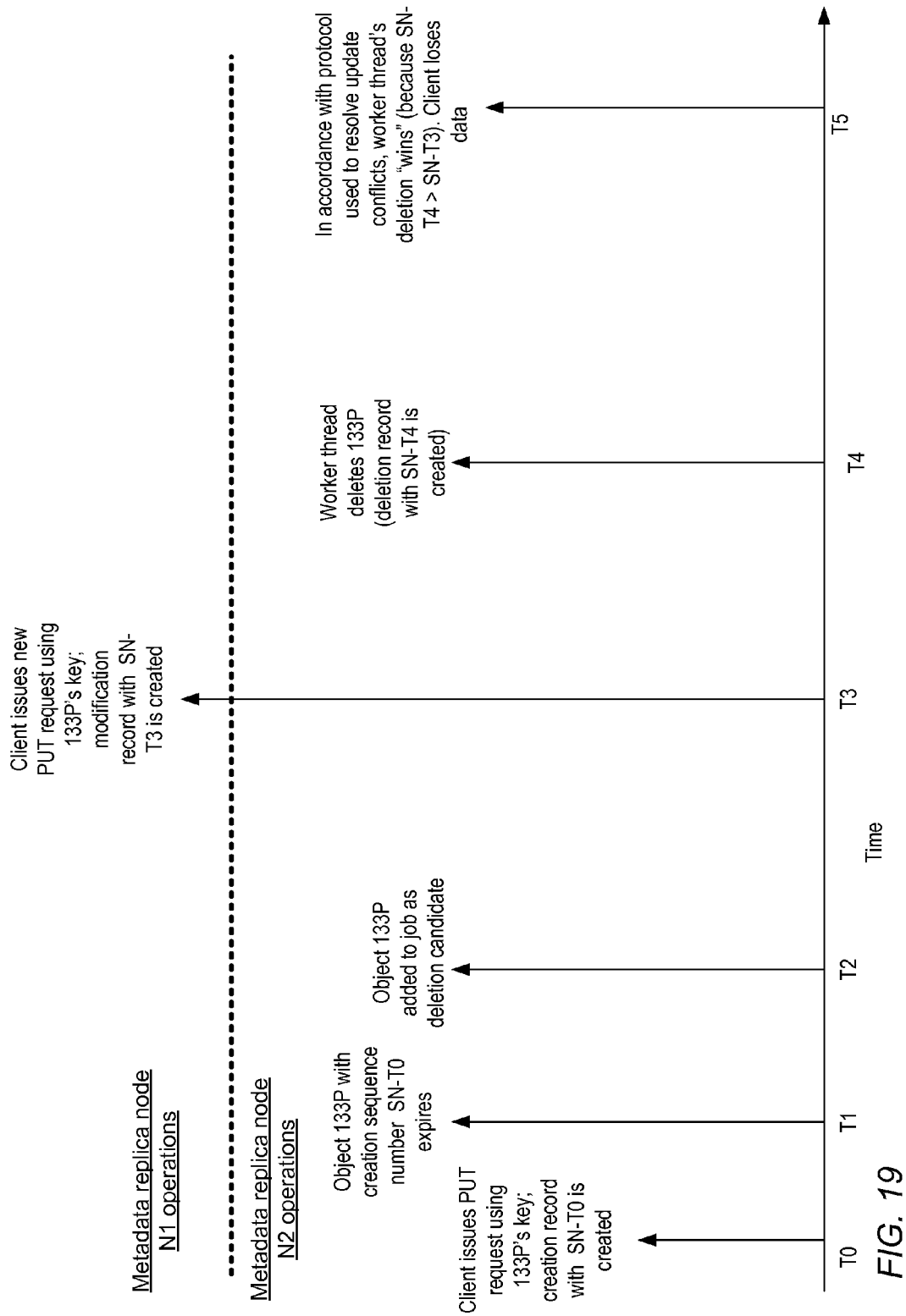
FIG. 19 is an example timeline in which a client request to modify a storage object conflicts with a scheduled deletion of the object, according to at least some embodiments.

FIG. 19 is an example timeline in which a request to modify a storage object conflicts with a scheduled deletion of the object, according to at least some embodiments. A distributed multi-tenant storage service may be implemented in the depicted embodiment, in which a reconciliation protocol based at least in part on respective sequence numbers associated with modification operations is used to resolve update conflicts. The sequence numbers may be derived at least in part from timestamps for the corresponding modification operations in the depicted embodiment, and may be obtained from one or more sequence number generators implemented by the storage service. A timeline showing events at two different metadata nodes N1 and N2 that each store a respective replica metadata entry for the same object 133P is shown, with time increasing from left to right. It is noted that the time differences shown (e.g., the difference between T1 and T0 versus the difference between T4 and T3) are not drawn to scale, but are chosen simply to indicate relative ordering between events.

At time T0, a client issues a PUT request to create the object 133P, and a creation record with a sequence number SN-T0 is created for the object and stored within a keymap entry 588 at node N1. At time T1, object 133P expires and becomes eligible for scheduled deletion in accordance with a policy approved by the object's owner (e.g., that the data be retained for a period equal to T1-T0 after creation). At time T2, the object 133P is added as a deletion candidate to a deletion job object, e.g., by a deletion job generator 130 as described earlier. At time T3, the client issues another PUT request with the same key; this request succeeds at metadata replica node N2, and a modification record with a sequence number SN-T3 is generated at node N2. Note that the job remains in the storage service; the job object at node N1 is not affected by the client's PUT request. At time T4, a worker thread eventually initiates a deletion for the metadata entry of object 133P, e.g., as a result of being assigned a task by a deletion task dispatcher 170 as described above. The metadata deletion succeeds at node N1, and a deletion sequence number SN-T4 is generated for it. Later, at time T5, during processing in accordance with a protocol that relies on sequence numbers to resolve update conflicts (such as reconciliation operations similar to those described above with respect to FIG. 8B), the sequence numbers SN-T4 (corresponding to the scheduled deletion) and SN-T3 (corresponding to the client's latest PUT) are compared, and the deletion operation is selected as the "winner" because SN-T4 exceeds SN-T3. The metadata and data of object 133P is therefore removed from the storage service. The client, who expected that the data apparently successfully stored at T3 would remain available for at least the expiration period relative to T3, thus loses data. Such data losses, although typically expected to occur only rarely (because in most cases the probability that a client's PUT is rejected because of a later scheduled delete may be quite small), may nevertheless lead to justifiable client dissatisfaction. Accordingly, in at least some embodiments, a technique to prevent such data loss may be implemented.

Figure 20:
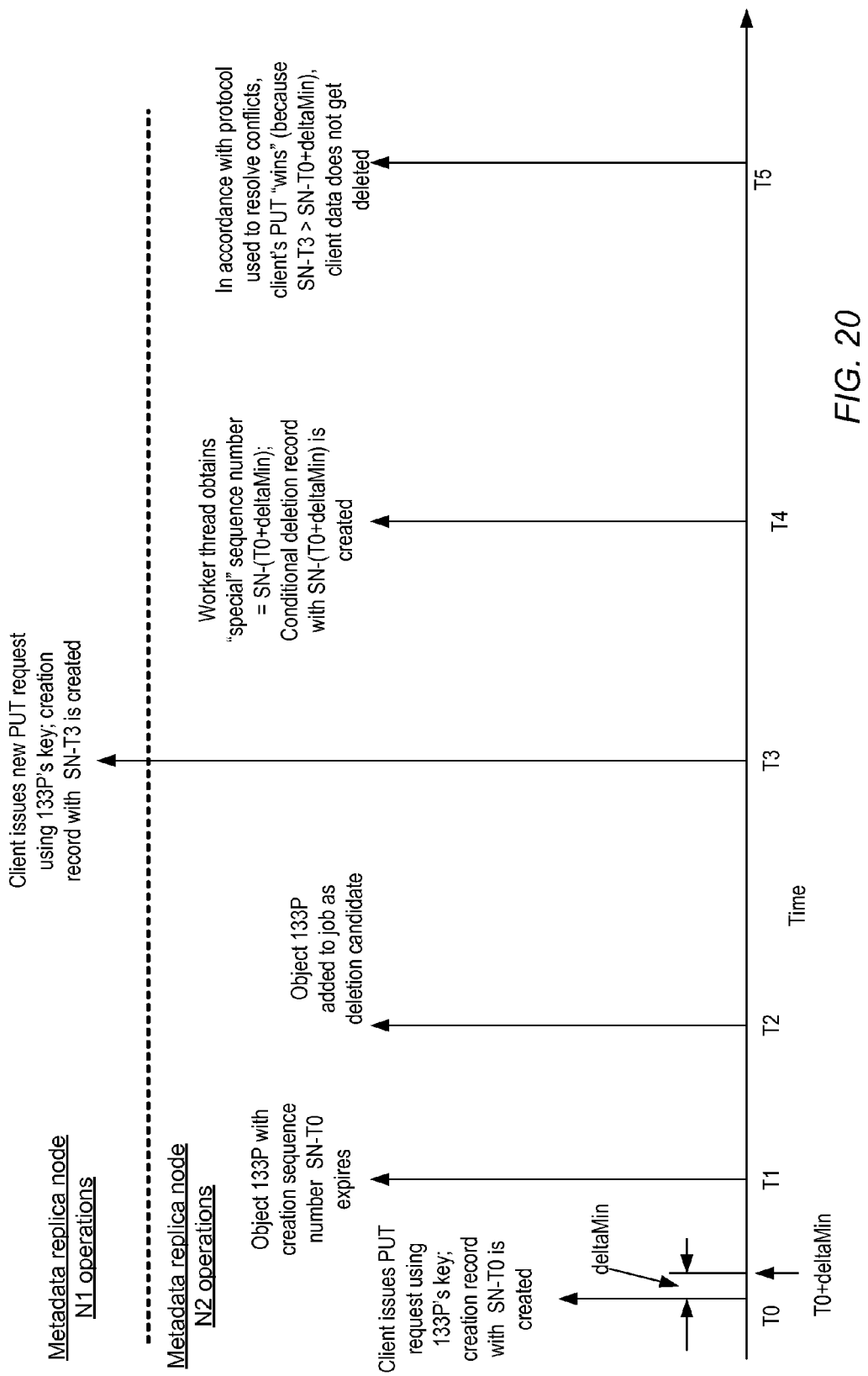
FIG. 20 is an example timeline in which a special deletion sequence number may be used in an effort to ensure that newly-created client data is not lost as a result of a scheduled deletion, according to at least some embodiments.

FIG. 20 is an example timeline in which a special deletion sequence number may be used in an effort to ensure that newly-created client data is not lost as a result of a scheduled deletion, according to at least some embodiments. The illustrated technique may rely on the fact that the scheduled delete operations are performed by internal components of the storage service, which may be able to obtain special sequence numbers that cannot be obtained for operations initiated by external clients. In particular, sequence numbers may be assigned in the depicted embodiment for external client requests such that, no matter how soon after one client request R1 another client request R2 is received, the respective sequence numbers SN-R1 and SN-R2 for the two client requests must differ by at least a particular value (which may be termed "deltaClient" herein). Thus, for example, if integers are used for sequence numbers, the smallest difference allowed for two sequence numbers assigned for client requests may be 1000 in one implementation. In contrast, sequence numbers assigned for operations performed by internal components of the service, such as worker threads 471, may differ from other sequence numbers by smaller amounts, such as "deltaMin". DeltaMin may be set to 1 in the scenario in which client sequence numbers must differ by 1000, for example.

FIG. 20 illustrates a similar sequence of events (prior to update conflict resolution) as those that were illustrated in FIG. 19. The same deletion criteria may be used, for example, as were used in the example of FIG. 19, and the scheduled metadata deletion at node N1 may occur at the same time T4. However, in the embodiment depicted in FIG. 20, instead of assigning the sequence number SN-T4 to the deletion at time T4, a special deletion sequence number SN-(T0+deltaMin) is assigned to the scheduled deletion. That is, a sequence number that appears to indicate that the scheduled deletion occurred at a time very close to the creation time of the object 133P may be used. Because any client PUT that occurred after T0 must have a sequence number that differs by at least delta-client from T0 in the depicted embodiment, and delta-Min is less than deltaClient, this effectively means that in update conflict resolution operations subsequent to T0, any client PUT that occurs after T0 would "win", and as a result the type of data loss illustrated in FIG. 19 would not occur. At time T4 in FIG. 20, a "conditional" deletion record may be generated and stored in the keymap instance of node N1, with the special timestamp. The record may be termed conditional because the deletion would only take effect in the depicted embodiment if no conflicting client-initiated update occurred after the creation of the object 133P.

Figure 21:
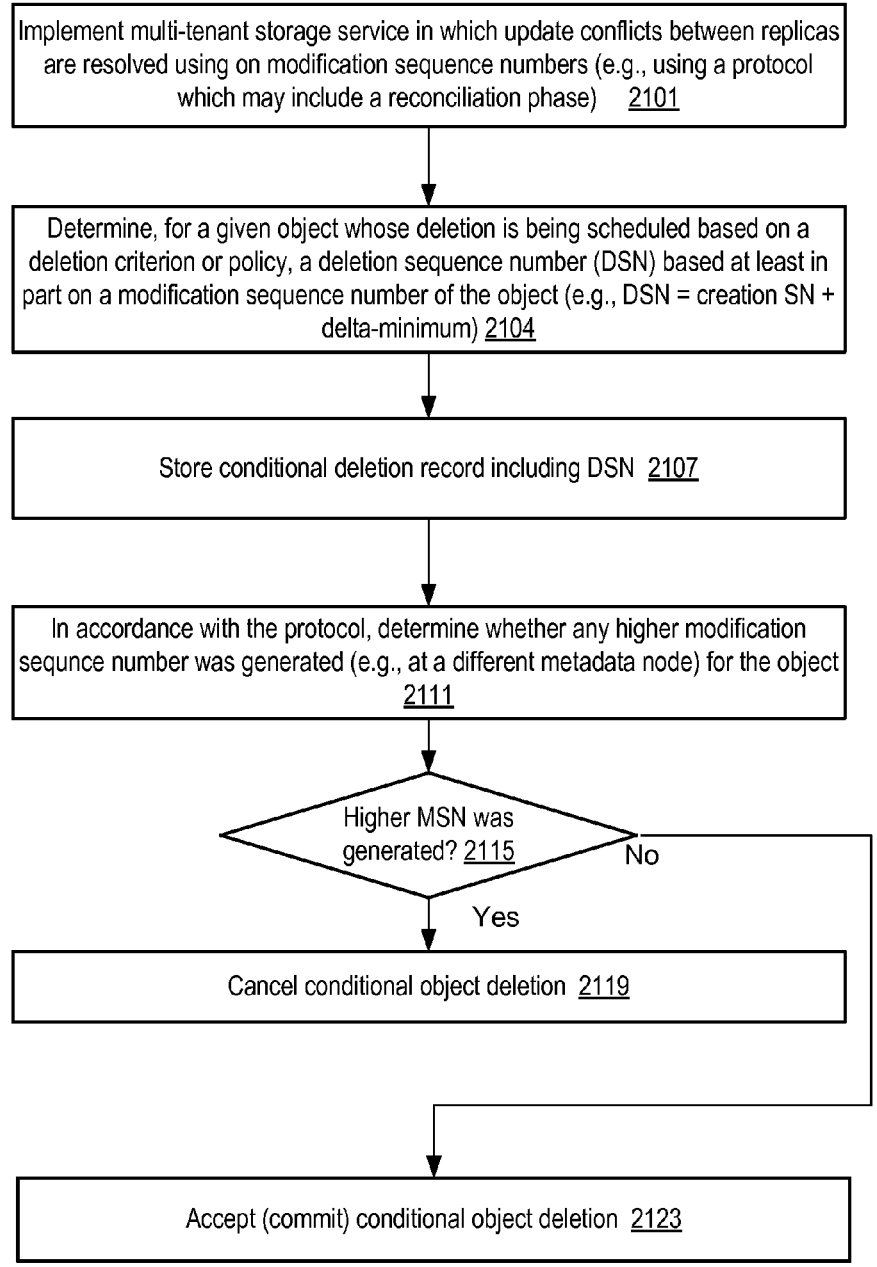
FIG. 21 is a flow diagram illustrating aspects of operations that may be performed to support conditional deletion of storage objects, according to at least some embodiments.

FIG. 21 is a flow diagram illustrating aspects of operations that may be performed to support conditional deletion of storage objects, according to at least some embodiments. As shown in element 2101, a multi-tenant storage service in which update conflicts between replicas are resolved using a protocol employing modification sequence numbers may be implemented. In some embodiments, the protocol may be invoked during normal operations at a given node of the storage service (e.g., when deciding whether to accept or "commit" a given update), and/or during eventual inter-node reconciliation processing similar to that illustrated in FIG. 8B. When a deletion operation (such as a keymap entry deletion) is scheduled for a storage object with a particular key, in accordance with a specified deletion criterion or policy of the kinds described above, a special deletion sequence number (DSN) may be obtained (element 2104). The special DSN may be derived from a modification sequence number of the object in the depicted embodiment, e.g., by adding a small delta to the creation sequence number of the object as illustrated in FIG. 20. The DSN may be stored in a conditional deletion record associated with the key (element 2107), e.g., at one of the metadata nodes 110. In some embodiments an instance of a sequence number generator used to obtain the DSN (and/or client-obtained sequence numbers) may be implemented at the same metadata node at which the conditional deletion record is stored, while in other embodiments sequence number generators may be implemented at other components of the storage service.

Subsequently, during operations performed in accordance with the update conflict resolution protocol, a determination may be made as to whether a modification sequence number higher than the DSN was generated (element 2111), e.g., in response to a client PUT received at a different metadata node as illustrated in FIG. 20. If such a higher sequence number was generated (as determined in element 2115), the conditional deletion may be canceled (element 2119); otherwise, the deletion may be committed or approved (element 2123). It is noted that at least in some embodiments, it may be possible for two deletion requests to be initiated for the same key, e.g., by two different worker threads or even by the same worker thread. Such a scenario may arise, for example, due to the listing of the same candidate object in two different tasks or job objects, or due to various types of race conditions. In embodiments in which the DSN for a conditional deletion record is generated based on the candidate object's creation time and the special "deltaMin" value as described above, the DSNs generated for such duplicate deletion requests would be identical (i.e., the same deltaMin value may be added to the same creation sequence number to obtain the DSN, regardless of which worker thread initiated the deletion request). As a result, two different conditional deletion records with the same DSN may be generated for the key. During conflict resolution, the two DSNs may be compared in such embodiments, and upon determining that the DSNs are equal, one of the two deletion records may be discarded or ignored. Thus, the technique based on using deltaMin described above may render duplicate deletion requests idempotent, avoiding any negative consequences to the service regardless of how many duplicate scheduled deletion requests are initiated for the same key. The conflict resolution operations described above may be initiated, for example, by the metadata node at which the conditional deletion record is stored, or by any of the metadata nodes at which replicas of the metadata entries (e.g., keymap entries) of the storage object are stored. In some cases the conflict resolution may be part of reconciliation processing, while in other cases the conflict may be resolved prior to reconciliation. As described earlier with respect to FIG. 8B, reconciliation operations may be scheduled based on any of several factors in different embodiments, such as an amount of time (a predetermined interval or a randomly determined interval) that has elapsed since a previous reconciliation operation, the number of metadata entry accesses that have occurred since the previous reconciliation operation, etc. In some implementation, when N replicas of the storage object's metadata are maintained at respective metadata nodes, a given metadata node may select one of the other (N−1) metadata nodes for a reconciliation operation using random selection, and communicate with the selected node (e.g., by providing at least a portion of a partition index) to initiate the reconciliation. Eventually, reconciliation may be performed with each of the other metadata nodes associated with replicas of the storage object.

Several of the techniques and approached outlined earlier may be used in embodiments in which conditional deletes are supported. For example, deletion criteria for conditional deletes may also be based on time elapsed since object creation, last modification, or access, or based on frequency of access in various embodiments, deletion policies or criteria may be specified by clients via a programmatic interface and stored as first-class storage objects within the storage service as described above with reference to FIG. 9. Each deletion operation may correspond to one or more metadata entry deletions, and storage space release operations that are asynchronous with respect to the metadata deletions. Reconciliation processing may be initiated by one metadata node (such as a coordinator 420) randomly selecting another metadata node and exchanging keymap information with it in some embodiments, as described with reference to FIG. 8B. Job generators 130 and task dispatchers 170 may perform their iterations asynchronously and independently, as described earlier, in embodiments in which conditional deletes are supported.

It is noted that in various embodiments, some of the operations shown in the flow diagrams of FIG. 2A, 2B, 8A, 8B, 12, 14, 17A, 17B, 18, or 21 may be omitted or performed in a different order than that shown. In at least some embodiments, at least some of the operations shown in the flow diagrams may be performed in parallel instead of sequentially; for example, both the deletion job generator 130 and the deletion task dispatcher 170 may be implemented as multi-threaded applications in some implementations. Multiple instances of the various components of the storage eservice 102 may be implemented in various embodiments. Any combination of appropriate types of storage device technologies, storage hardware, storage software and/or storage protocols may be used to store data and metadata for storage objects 133 in various embodiments, including any of various types of disks, disk arrays, disk appliances, flash memory devices, tape devices, and the like.

Use Cases

The techniques described above, of supporting scheduled deletions of storage objects in multi-tenant storage services, may be useful for numerous clients whose data sets continue to grow over time, potentially resulting in expenses for unused or rarely-used storage objects. The equitable assignment of resources to deletion operations of different clients may help to retain high level of customer satisfaction regardless of the data set size (and hence the deletion candidate set sizes) of any given client. The overhead associated with scheduled deletions, and the impact on foreground client operations, may both be minimized using the backoff-based scheduling approach, as well as the stateless design of the job generators and the task dispatchers described herein. Conditional deletion support may reduce the chances of unintended loss of client data because of system-generated scheduled deletions substantially.

Illustrative Computer System

Figure 22:
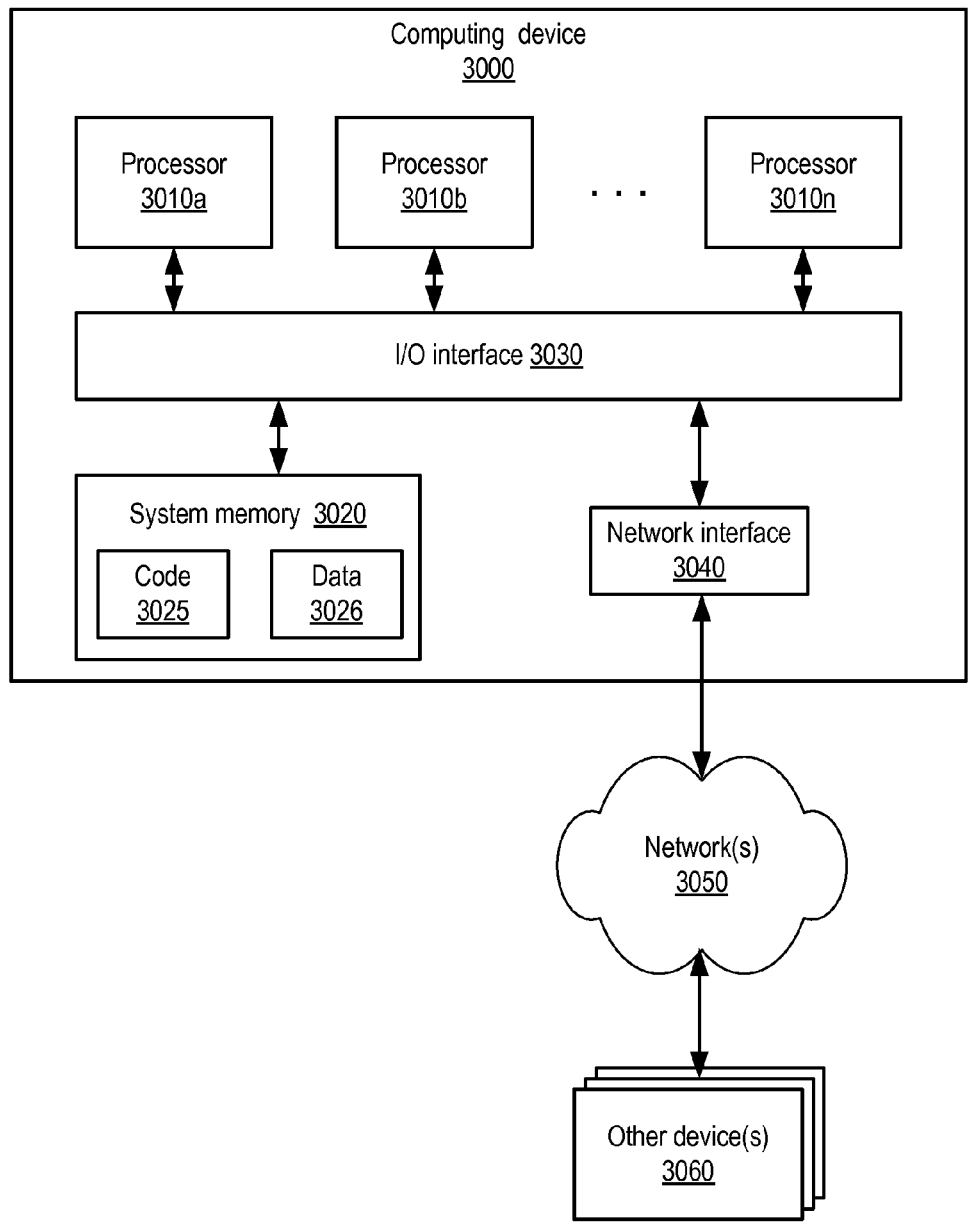
FIG. 22 is a block diagram illustrating an example computing device that may be used in at least some embodiments.

In at least some embodiments, a server that implements a portion or all of one or more of the technologies described herein, including the techniques to implement the various components of a storage service 102, may include a general-purpose computer system that includes or is configured to access one or more computer-accessible media. FIG. 22 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIG. 1 through FIG. 21, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-accessible medium configured to store program instructions and data as described above for FIG. 1 through FIG. 21 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 3000 via I/O interface 3030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computing device 3000 as system memory 3020 or another type of memory. Further, a computer-accessible medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 22 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising one or more computing devices configured to:
   implement a network-accessible multi-tenant storage service for storage objects owned by a plurality of clients;
   identify a set of storage objects of the storage service to be deleted in accordance with an object retention policy;
   store, within the storage service in accordance with a priority-based object naming policy, a plurality of deletion job objects, wherein each deletion job object of the plurality of deletion job objects comprises an indication of a subset of the set of storage objects;
   determine, based at least in part on a job validity criterion, whether one or more deletion operations corresponding to a particular deletion job object of the plurality of deletion job objects are to be scheduled, wherein the job validity criterion includes an indication of an expiration period for the particular deletion job object;
   in response to a determination that the one or more deletion operations are to be scheduled,
      add, to a collection of task objects awaiting implementation, a task object indicating at least one storage object indicated in the particular deletion job object, and
      implement a respective at least one deletion operation for the at least one storage object indicated in the task object; and
   in response to a determination that the one or more deletion operations are not to be scheduled, initiate removal of the particular deletion job object to avoid scheduling redundant deletion job objects that indicate one or more same storage objects that are to be deleted in accordance with the object retention policy.

2. The system as recited in claim 1, wherein the particular deletion job object comprises an indication of a particular storage object to be deleted, wherein the one or more computing devices are further configured to:
   store, within the storage service, in accordance with the deletion criterion, a second deletion job object indicating that the particular storage object is to be deleted, without determining whether deletion operations corresponding to the particular deletion job object were scheduled.

3. The system as recited in claim 1, wherein in accordance with the priority-based object naming policy, the particular deletion job object is stored in a logical container whose name comprises an indication of an expiration time of at least one storage object indicated in the particular deletion job object.

4. The system as recited in claim 1, wherein the one or more computing devices are further configured to:
   in response to a determination that the deletion operations are not to be scheduled, initiate a removal of the particular deletion job object from the storage service.

5. A method, comprising:
   implementing a network-accessible multi-tenant storage service for storage objects owned by a plurality of clients;
   identifying a set of storage objects of the storage service to be deleted;

storing, within the storage service, a plurality of deletion job objects, wherein each deletion job object of the plurality of deletion job objects comprises an indication of a subset of the set of storage objects;

determining, based at least in part on a job validity criterion, whether one or more deletion operations corresponding to a particular deletion job object of the plurality of deletion job objects are to be scheduled, wherein the job validity criterion includes an indication of an expiration period for the particular deletion job object;

in response to determining that the one or more deletion operations are to be scheduled, initiating a respective at least one deletion operation for at least one storage object indicated in the particular deletion job object; and in response to determining that one or more deletion operations for another deletion job object are not to be scheduled, initiating removal of the other deletion job object to avoid scheduling redundant deletion job objects that indicate one or more same storage objects that are to be deleted in accordance with the object retention policy.

6. The method as recited in claim 5, wherein the particular deletion job object comprises an indication of a particular storage object to be deleted, further comprising:

storing, within the storage service, in accordance with a deletion criterion, a second deletion job object indicating that the particular storage object is to be deleted, without determining whether deletion operations corresponding to the particular deletion job object were scheduled.

7. The method as recited in claim 5, wherein said storing the one or more deletion job objects in the storage service comprises:

storing the particular deletion job object in a logical container whose name comprises an indication of an expiration time of at least one storage object indicated in the particular deletion job object.

8. The method as recited in claim 5, further comprising:

determining, based at least in part on the job validity criterion, whether deletion operations corresponding to a different deletion job object of the plurality of deletion job objects are to be scheduled; and in response to determining that the deletion operations corresponding to the different deletion job object are not to be scheduled, initiating a deletion of the different deletion job object from the storage service.

9. The method as recited in claim 5, wherein said initiating a deletion operation for at least one storage object indicated in the particular deletion job object comprises inserting a task object in a collection of task objects awaiting execution.

10. The method as recited in claim 9, wherein the collection of task objects comprises an ordered list of task objects, wherein said inserting the task object comprises:

inserting the task object in a particular position in the ordered list selected in accordance with a task execution sequencing criterion.

11. The method as recited in claim 10, wherein the ordered list is ordered based at least in part on a respective universally unique identifier (UUID) assigned to each task object of the ordered list, further comprising:

generating a particular UUID for the task object, wherein at least a portion of the UUID is computed using a random object generator.

12. The method as recited in claim 9, further comprising:

prior to initiating the deletion operation for the at least one storage object indicated in the particular deletion job object, removing, by a worker thread, the task object from the collection of task objects awaiting execution, and inserting the task object in a collection of in-progress task objects.

13. The method as recited in claim 12, wherein said inserting the task object in the collection of task objects awaiting execution is performed by a task dispatcher, further comprising:

notifying the task dispatcher, by the worker thread, that a deletion of a metadata entry of the at least one storage object has been completed; and in response to said notifying, the task dispatcher determining whether to initiate a deletion of the particular deletion job object from the storage service.

14. A non-transitory computer-accessible storage medium storing program instructions that when executed on one or more processors:

identify, during a particular deletion execution iteration, a particular deletion job object of a plurality of deletion job objects stored in a multi-tenant storage service, wherein the particular deletion job object indicates a collection of storage objects that are eligible for deletion from the storage service in accordance with one or more deletion criteria;

determine, based at least in part on a job validity criterion, whether one or more deletion operations corresponding to the particular deletion job object of the plurality of deletion job objects are to be scheduled, wherein the job validity criterion includes an indication of an expiration period for the particular deletion job object;

in response to a determination that the one or more deletion operations are to be scheduled, initiate a respective at least one deletion operation for at least one storage object indicated in the particular deletion job object; and in response to a determination that the one or more deletion operations are not to be scheduled, initiate removal of the particular deletion job object to avoid scheduling redundant deletion job objects that indicate one or more same storage objects that are to be deleted in accordance with the object retention policy.

15. The non-transitory computer-accessible storage medium as recited in claim 14, wherein the instructions when executed on the one or more processors:

determine, based at least in part on the job validity criterion, whether deletion operations corresponding to a different deletion job object of the one or more deletion job objects are to be scheduled; and in response to a determination that the deletion operations corresponding to the different deletion job object are not to be scheduled, initiate a deletion of the different deletion job object from the storage service.

16. The non-transitory computer-accessible storage medium as recited in claim 14, wherein the instructions when executed on the one or more processors:

in response to a determination that the deletion operations are to be scheduled, insert a task object in a collection of task objects awaiting execution.

17. The non-transitory computer-accessible storage medium as recited in claim 16, wherein the collection of task objects comprises an ordered list of task objects, wherein the instructions when executed on the one or more processors:

insert the task object in a particular position in the ordered list selected in accordance with a task execution sequencing criterion.

18. The non-transitory computer-accessible storage medium as recited in claim 17, wherein the ordered list is ordered based at least in part on a respective universally unique identifier (UUID) assigned to each task object of the ordered list, wherein the instructions when executed on the one or more processors:

generate a particular UUID for the task object using a random object generator.

19. The non-transitory computer-accessible storage medium as recited in claim 16, wherein the instructions when executed on the one or more processors:

in response to a request for a task assignment from a worker thread, provide an indication of the task object to the worker thread.

20. The non-transitory computer-accessible storage medium as recited in claim 19, wherein the instructions when executed on the one or more processors:

in response to a determination that at least one deletion operation indicated in the task object has not been completed, remove the task object from an in-progress task collection into which the task object was placed by the worker thread, and re-insert the task object in the collection of task objects awaiting execution.

21. The non-transitory computer-accessible storage medium as recited in claim 14, wherein the particular deletion job object is stored in a particular logical container of the storage service, wherein the name of the particular logical container comprises an indication of a priority of a deletion of at least one storage object listed in the particular deletion job object.

* * * * *